Dec. 1, 1970   S. LATTIMORE ETAL   3,544,968
AUTOMATIC CONTROL OF MACHINING OPERATIONS
Filed Aug. 16, 1967   51 Sheets-Sheet 28

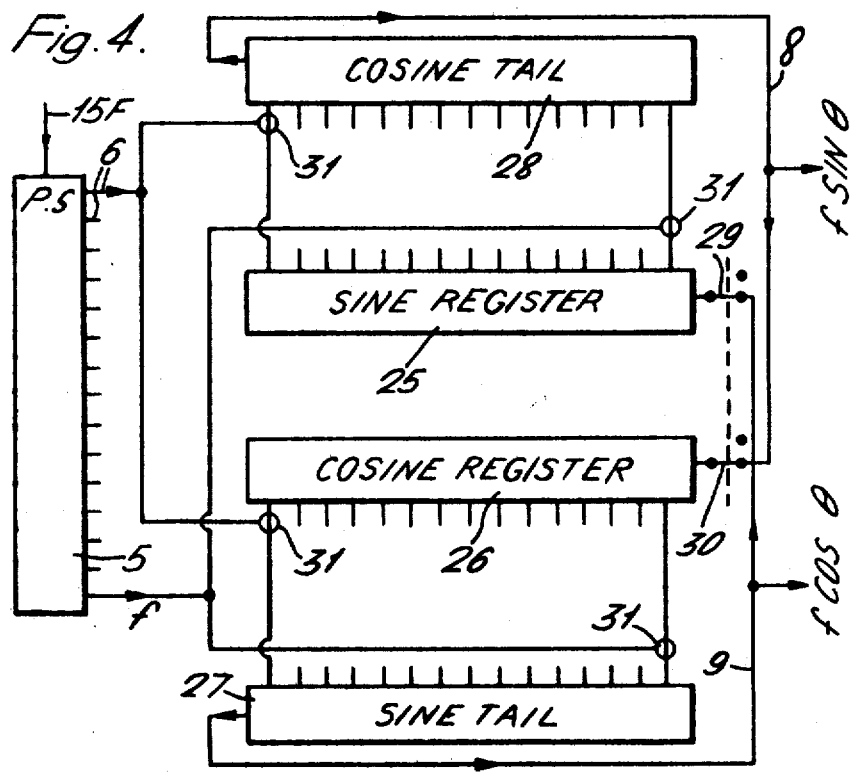
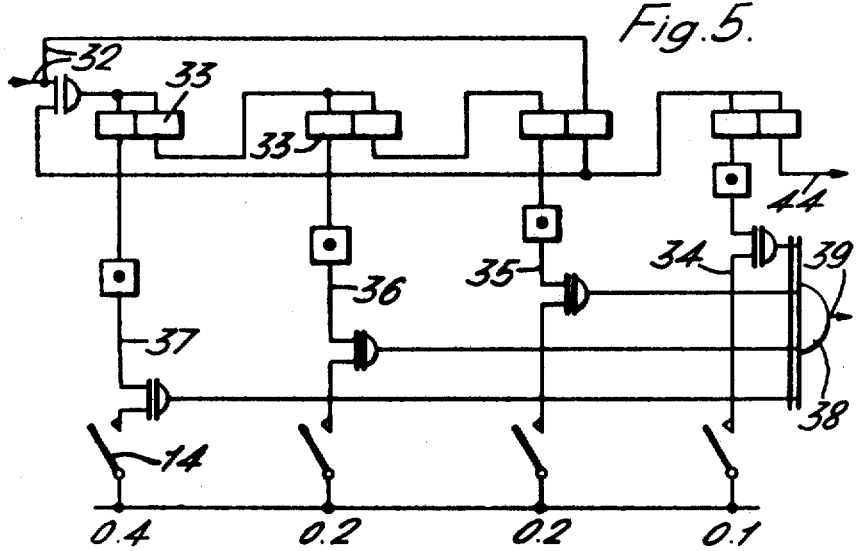

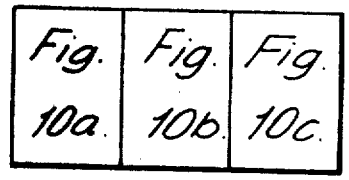
Fig. 10.
Fig. 10a.
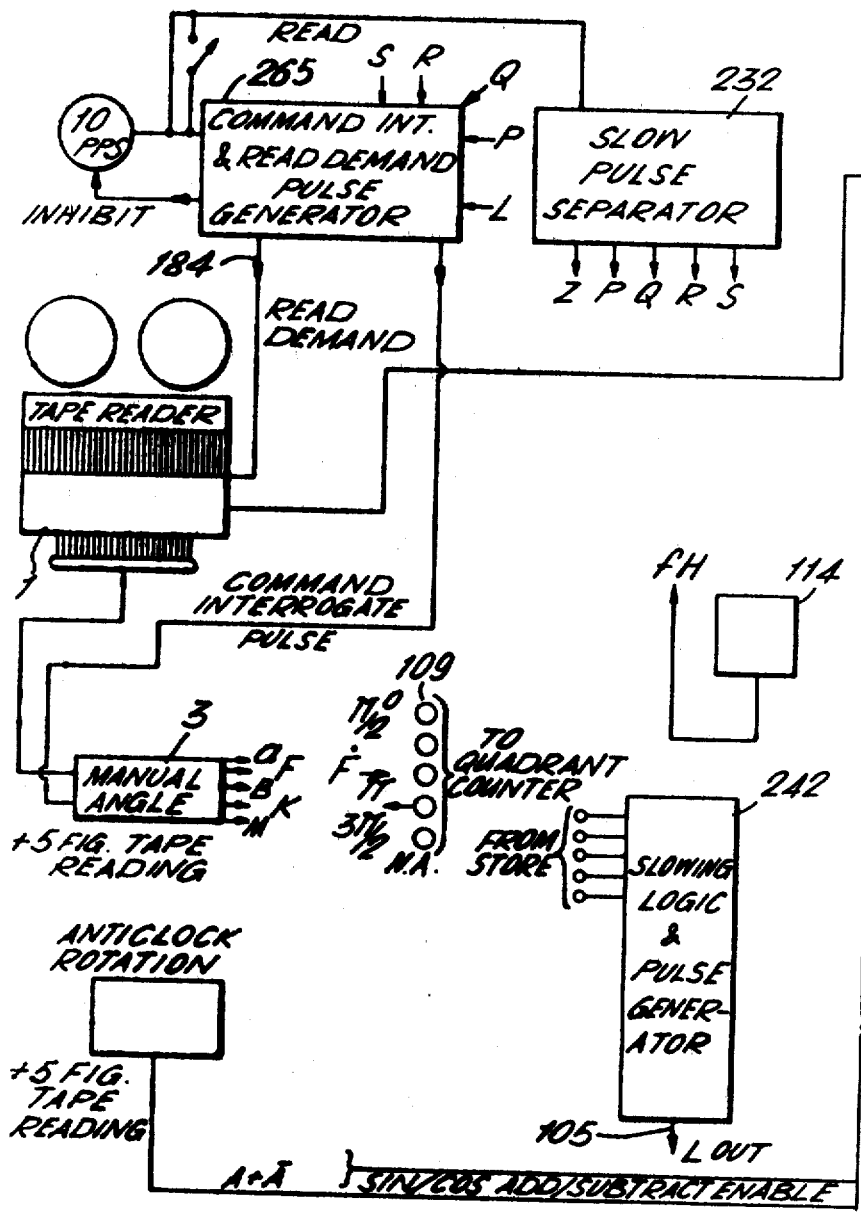

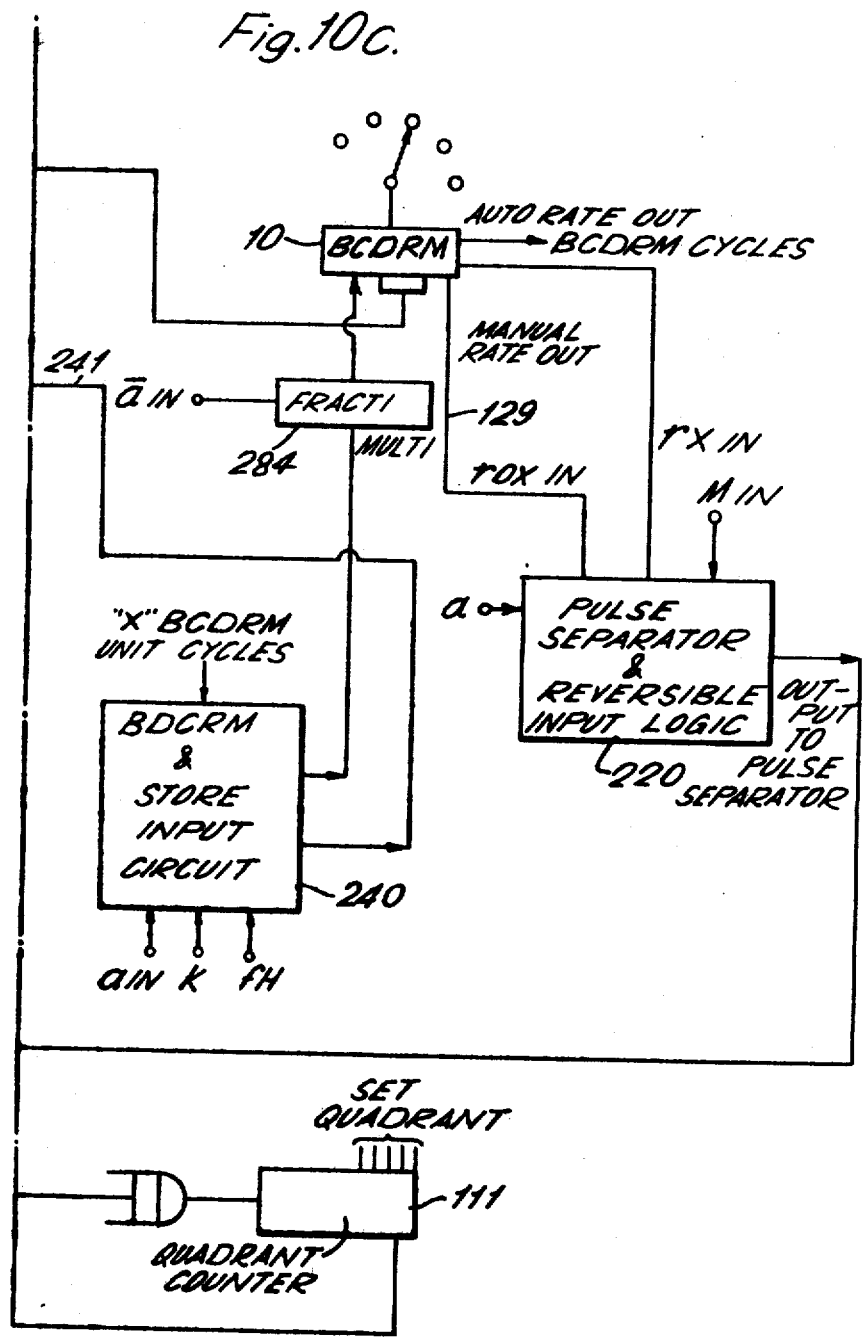

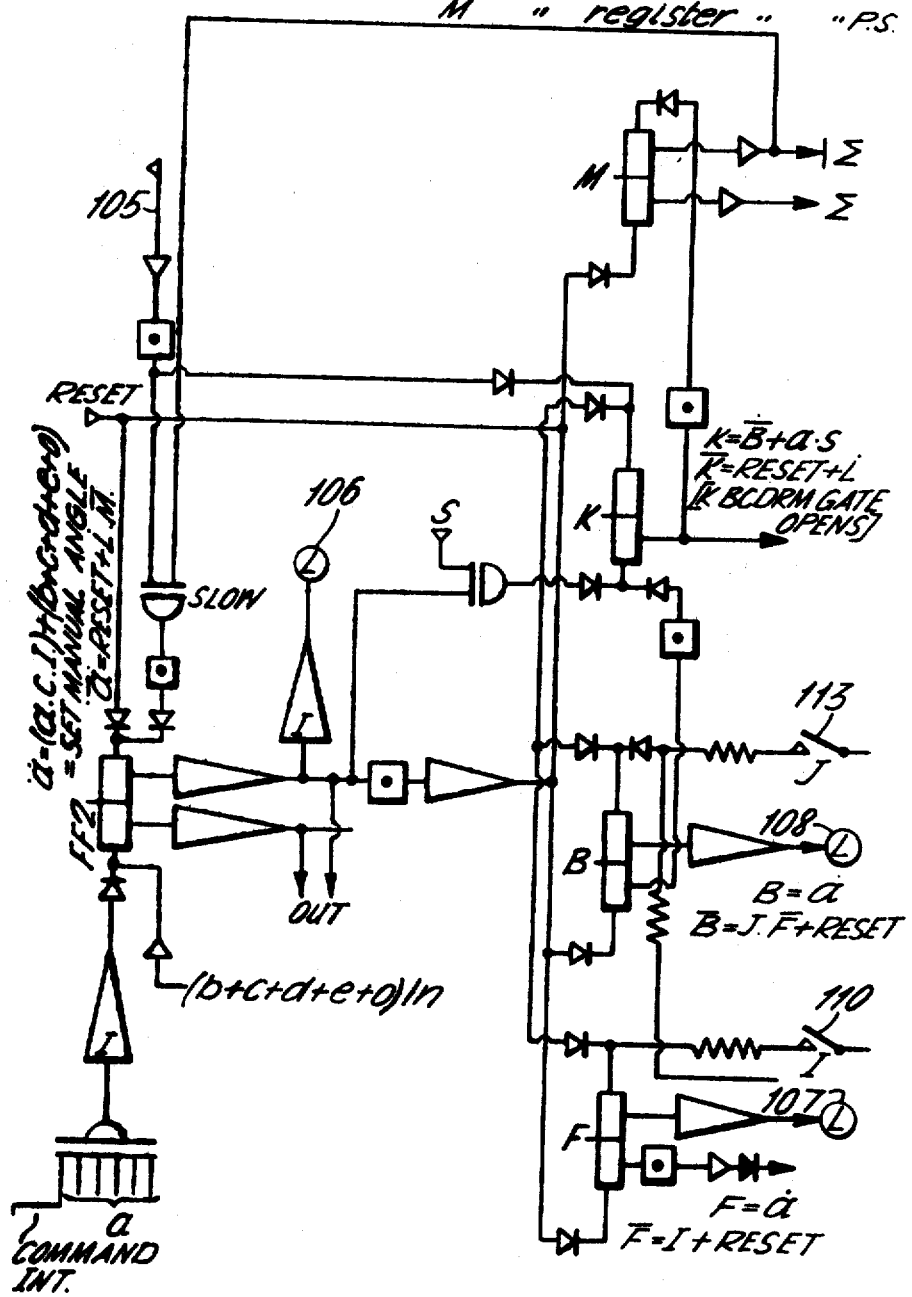

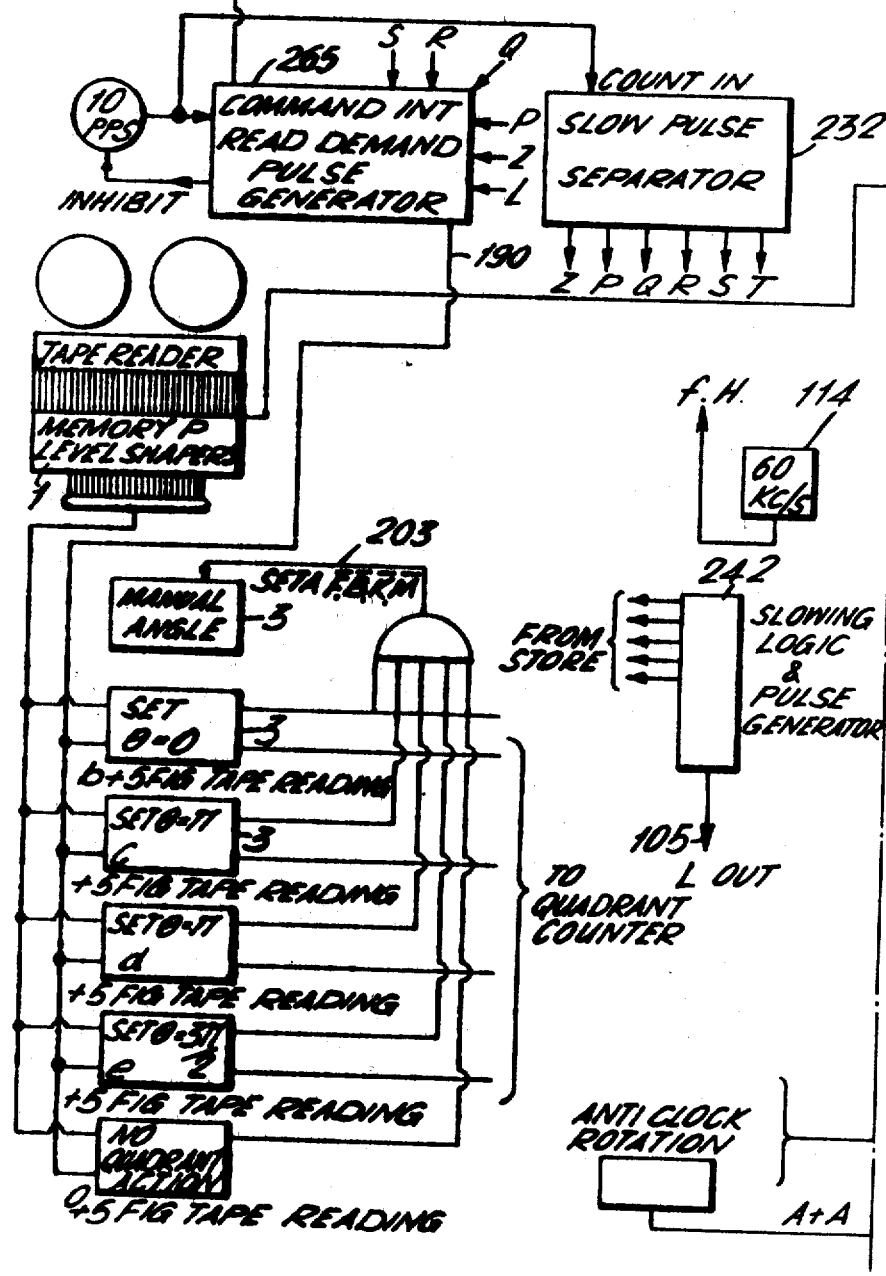

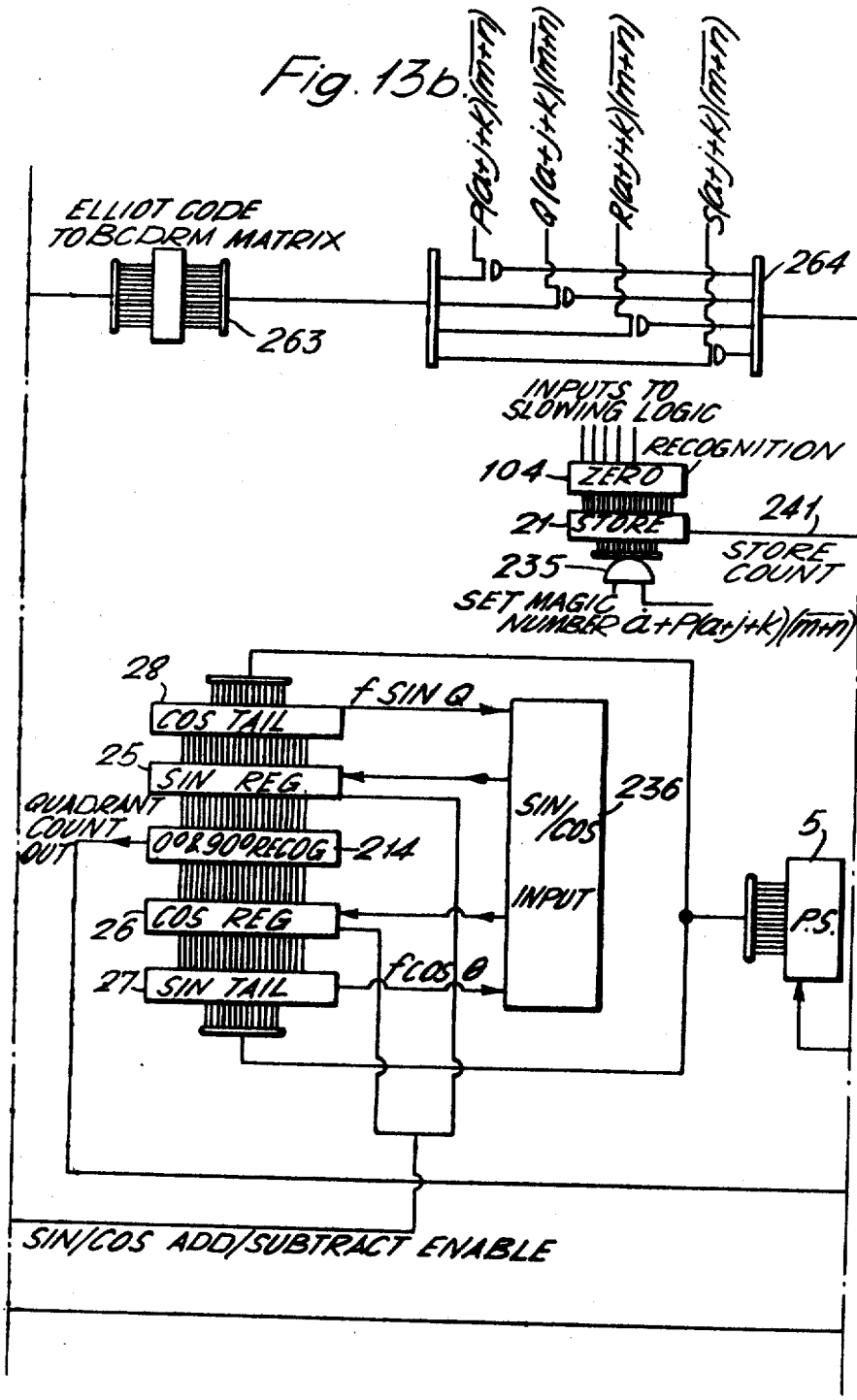

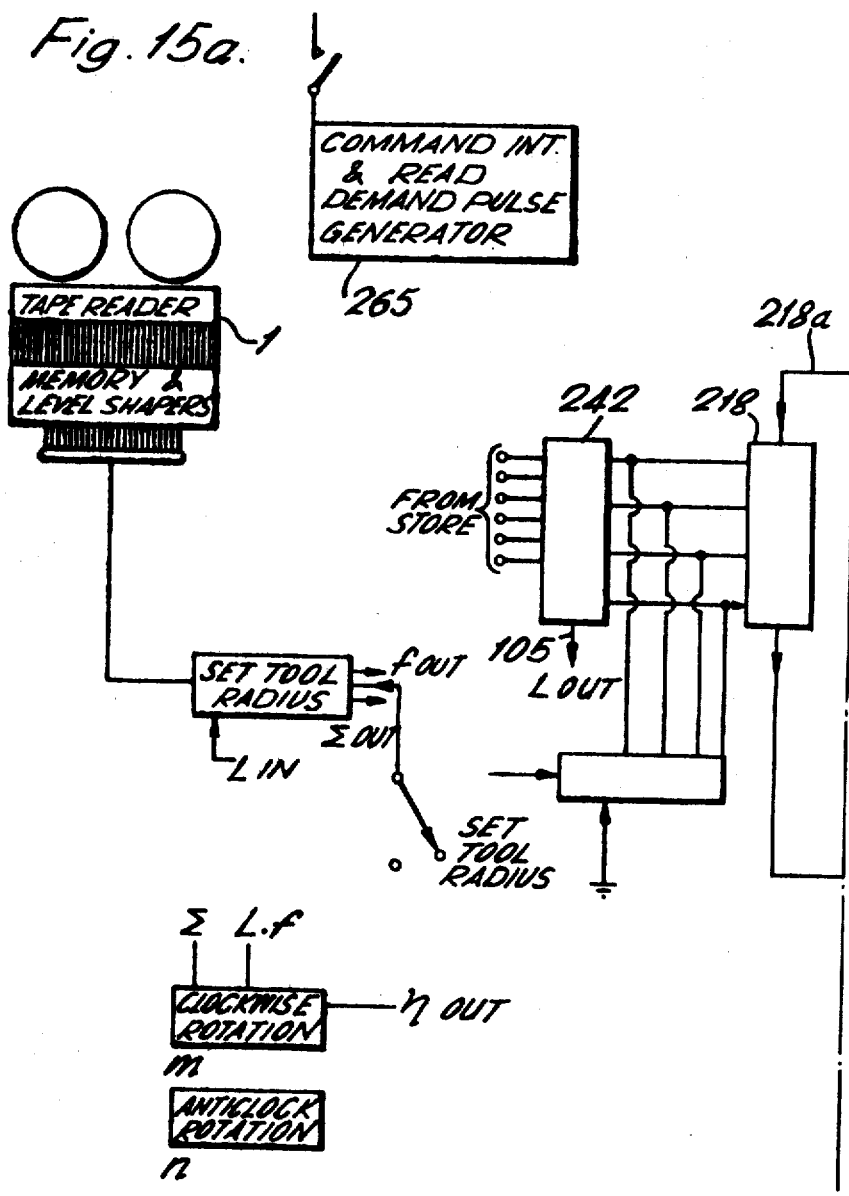

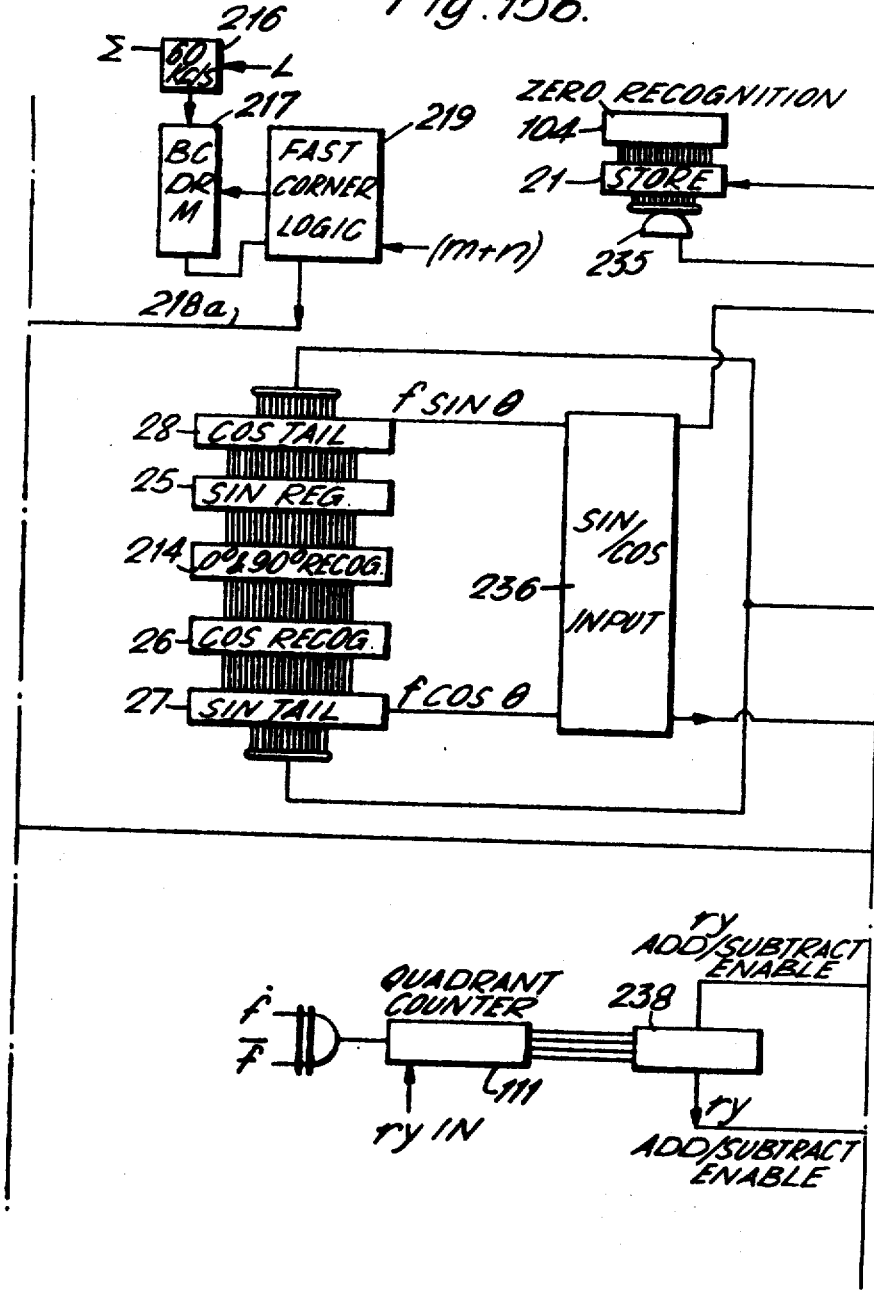

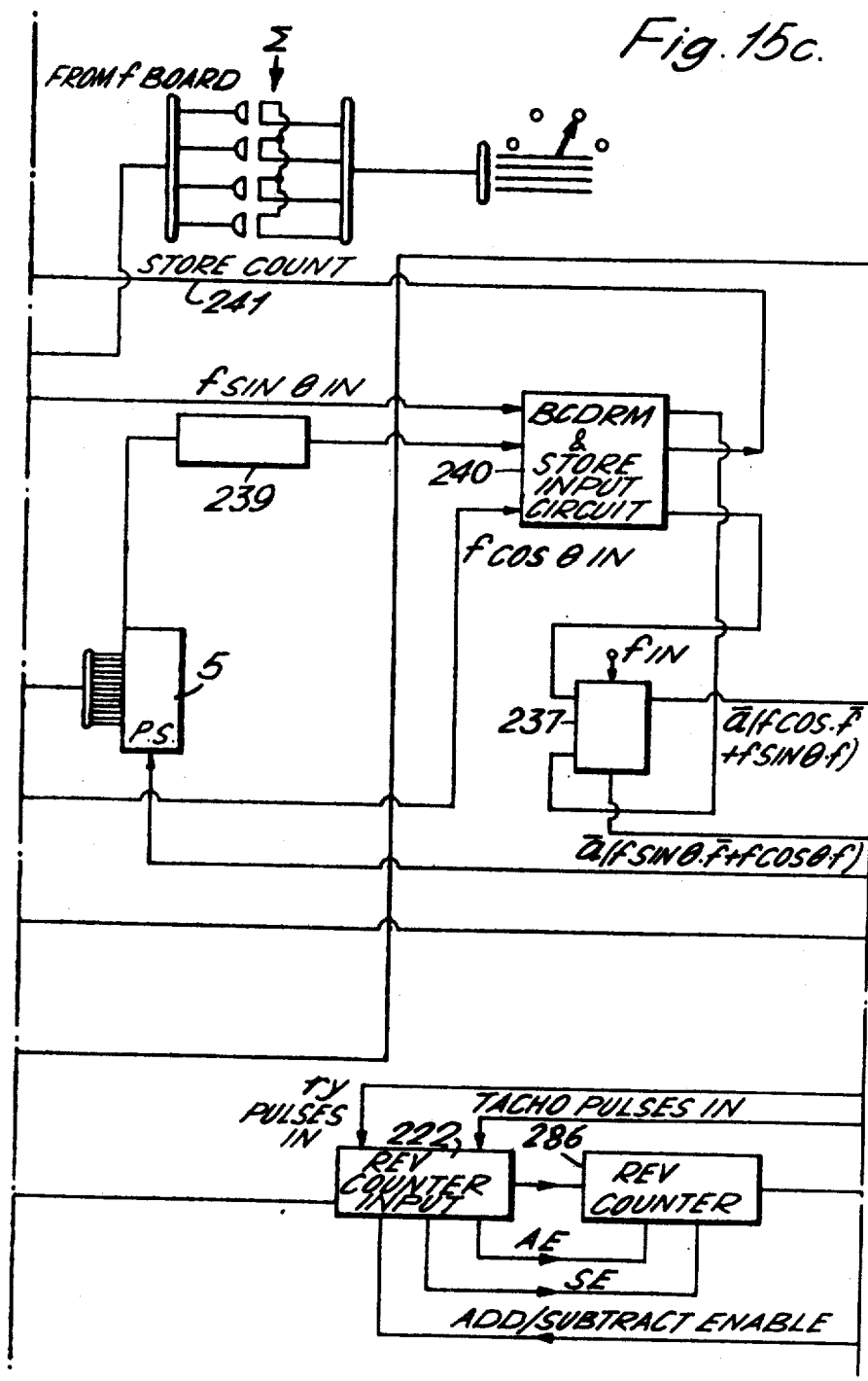

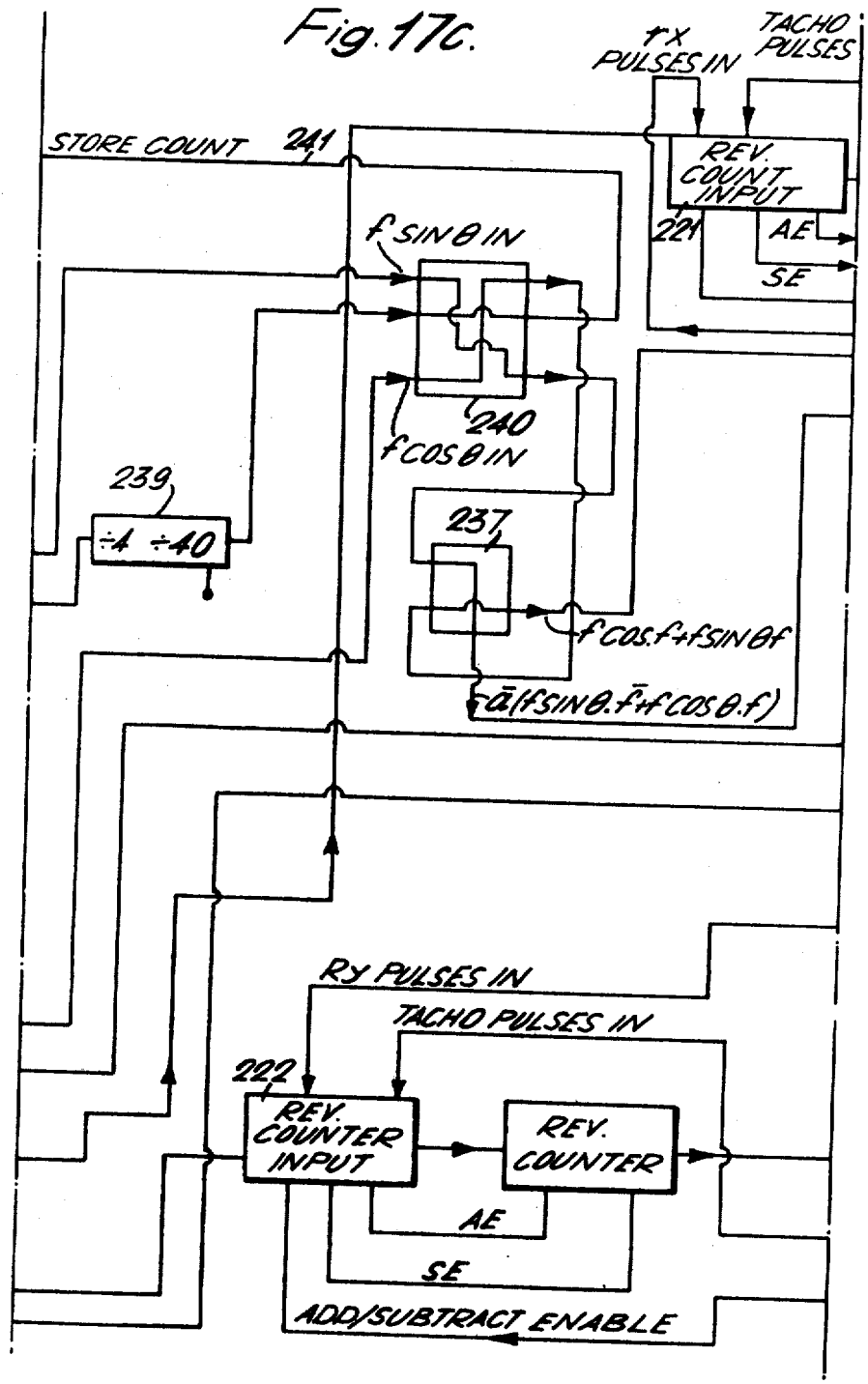

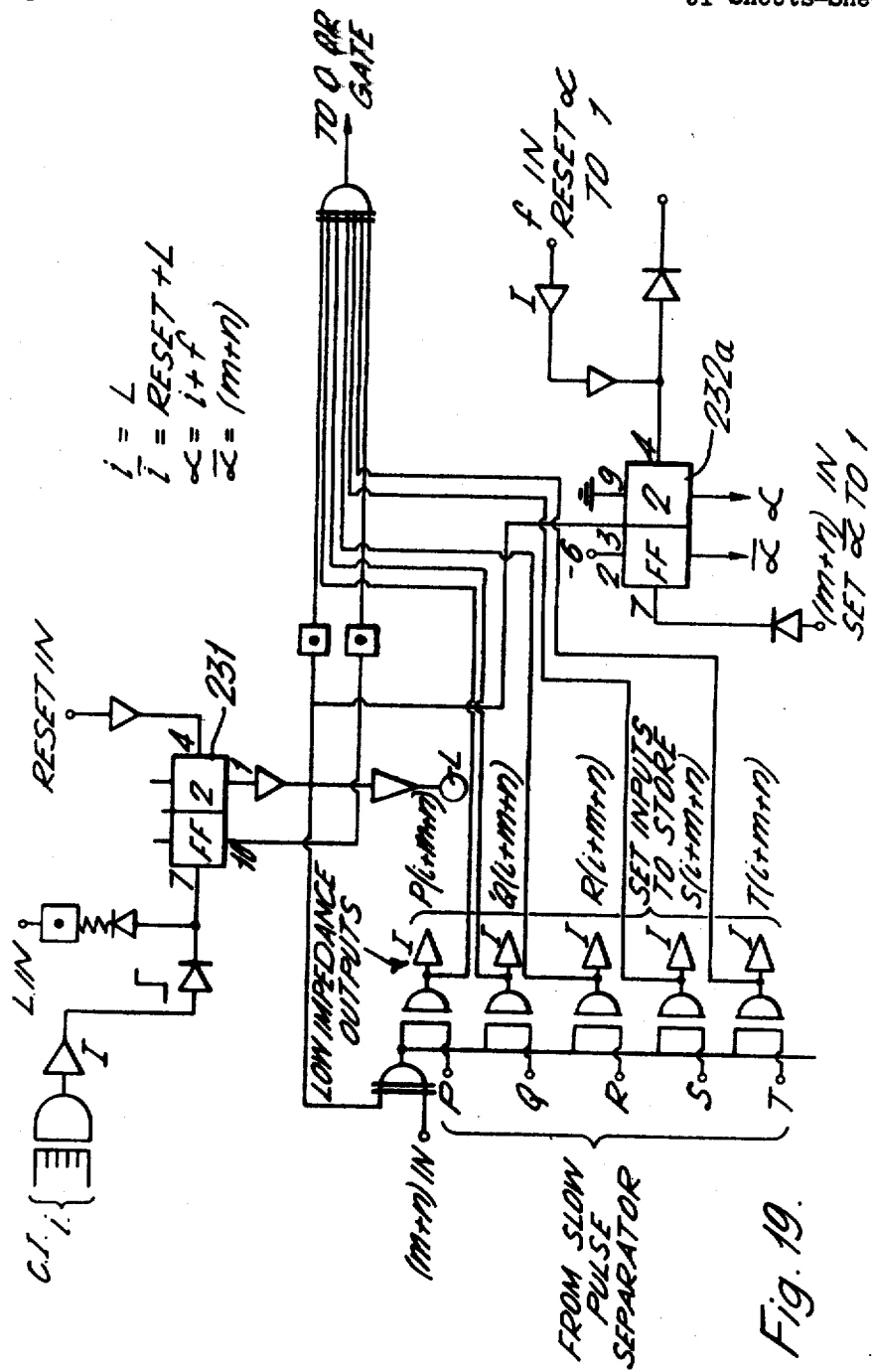

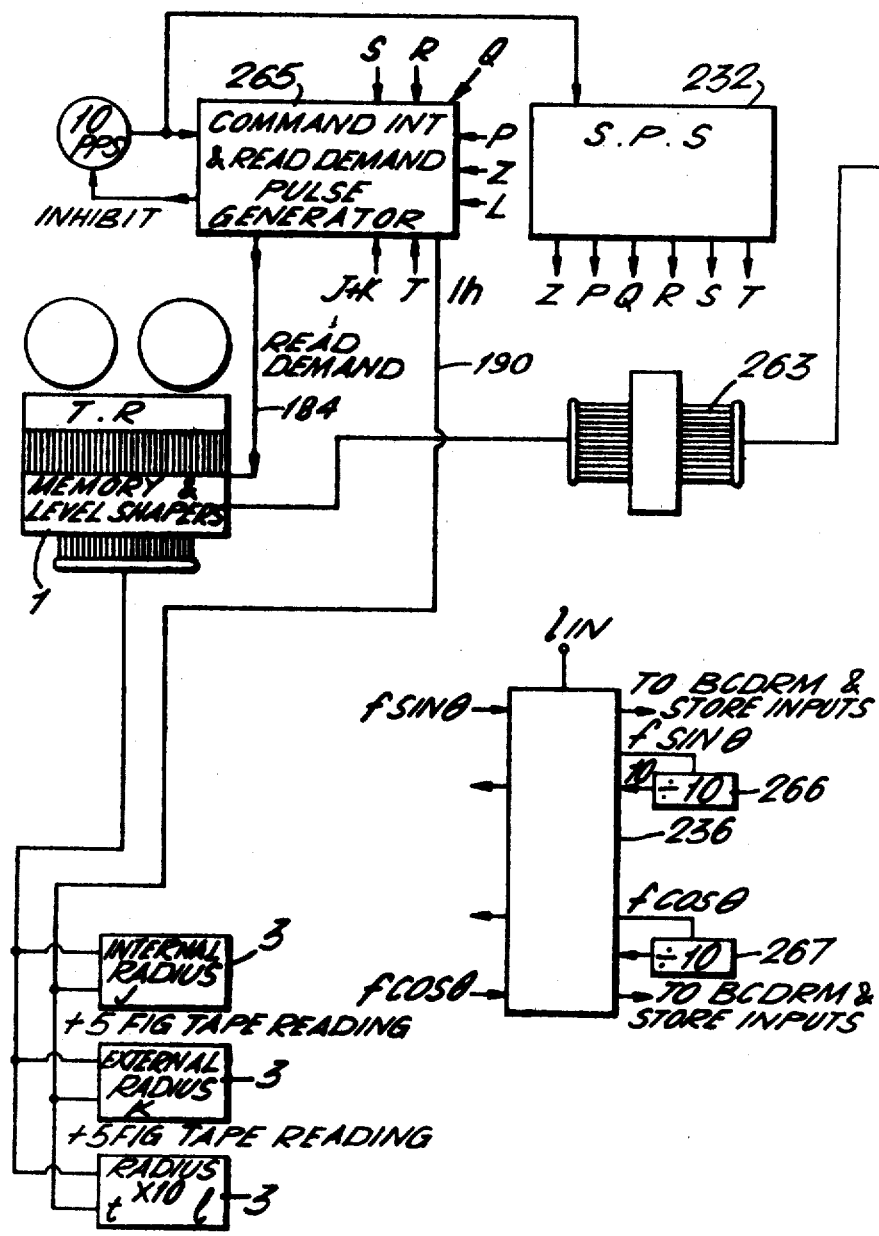

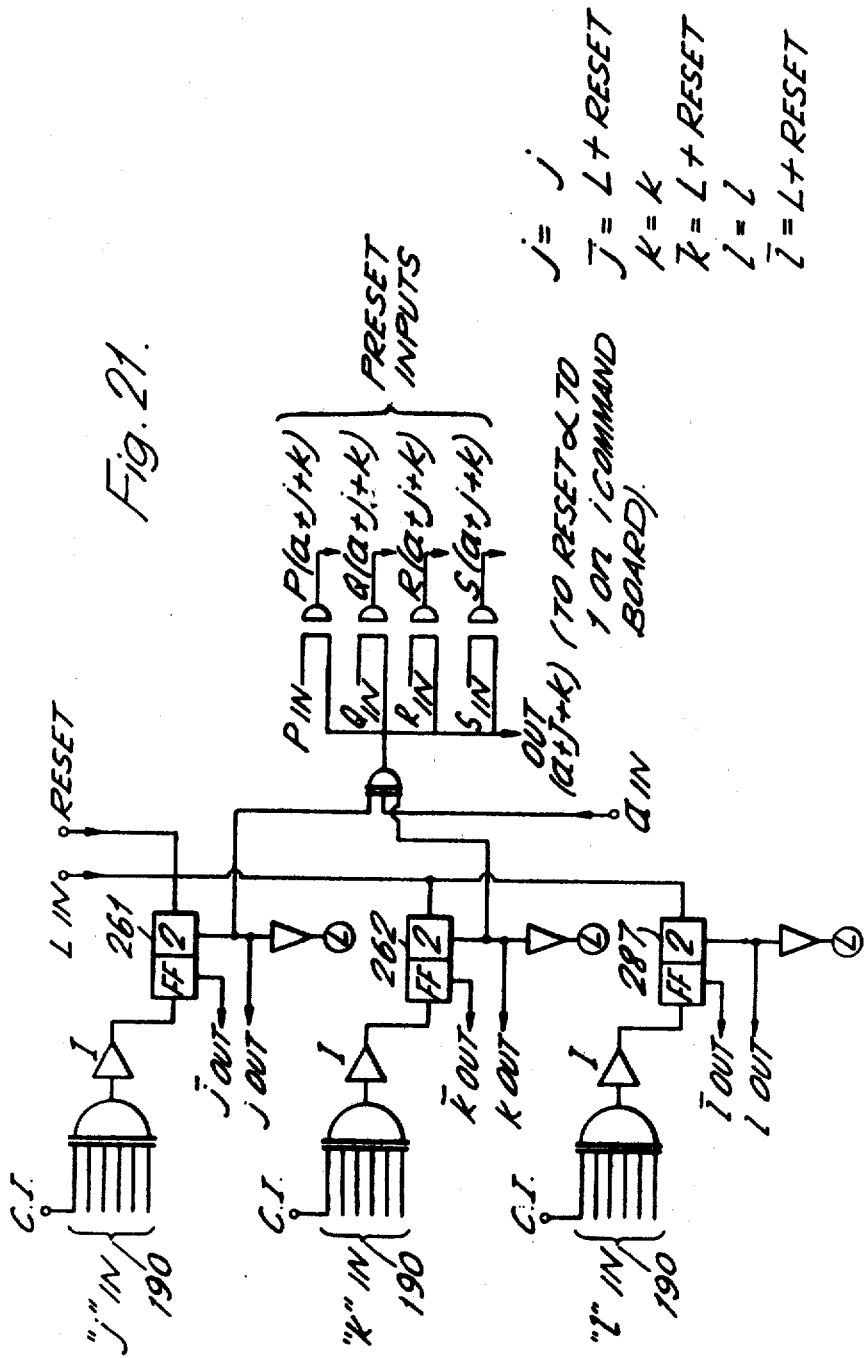

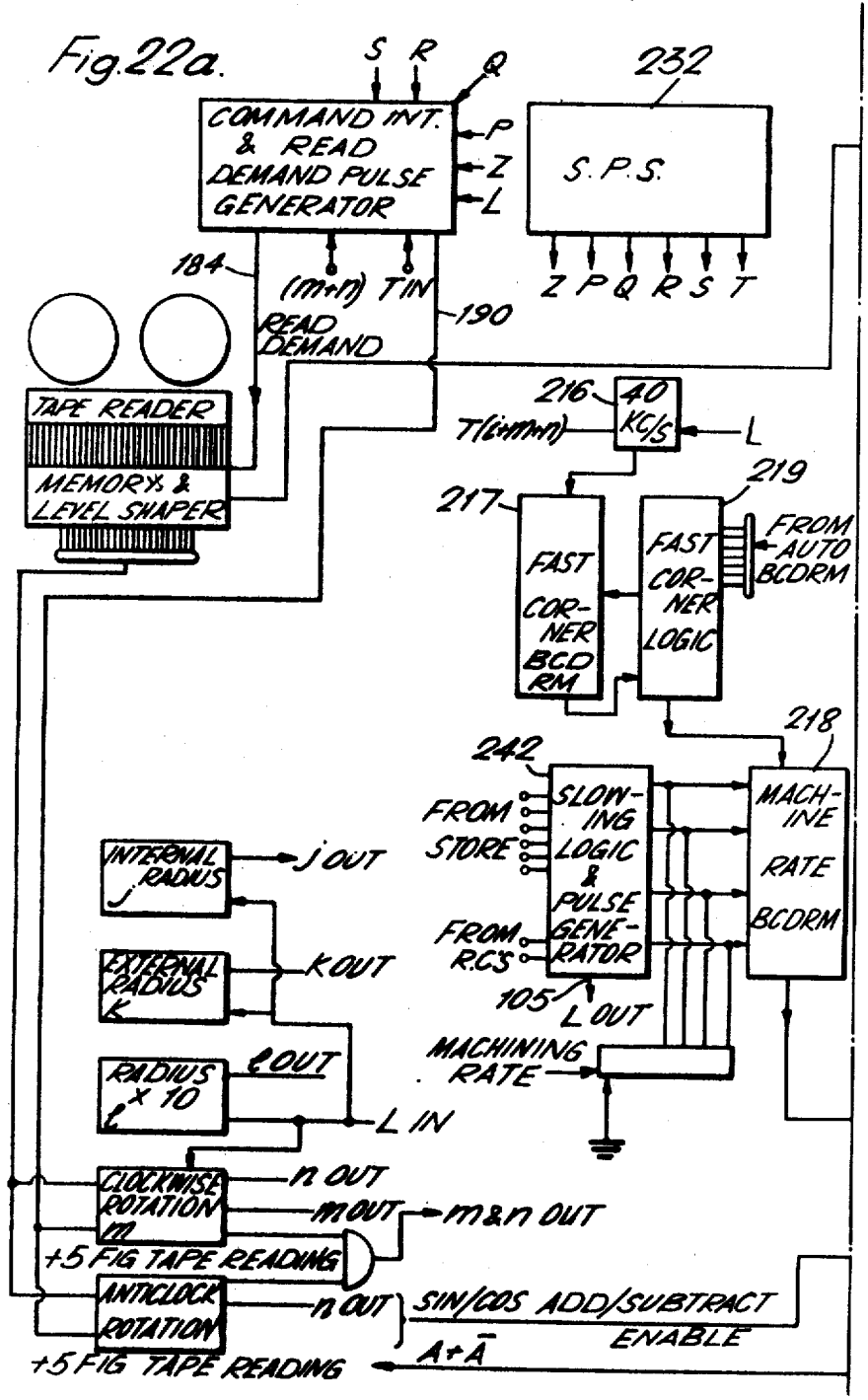

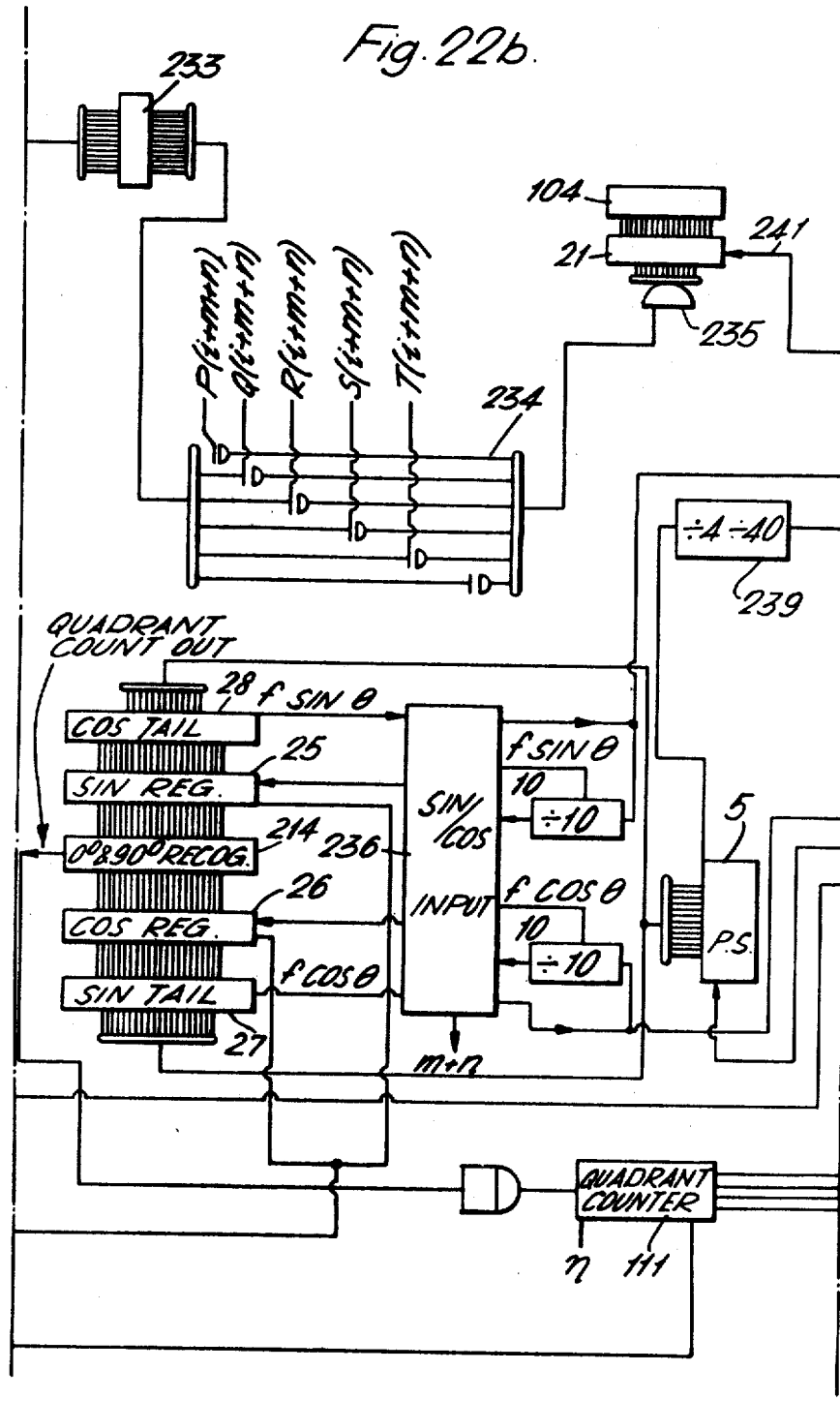

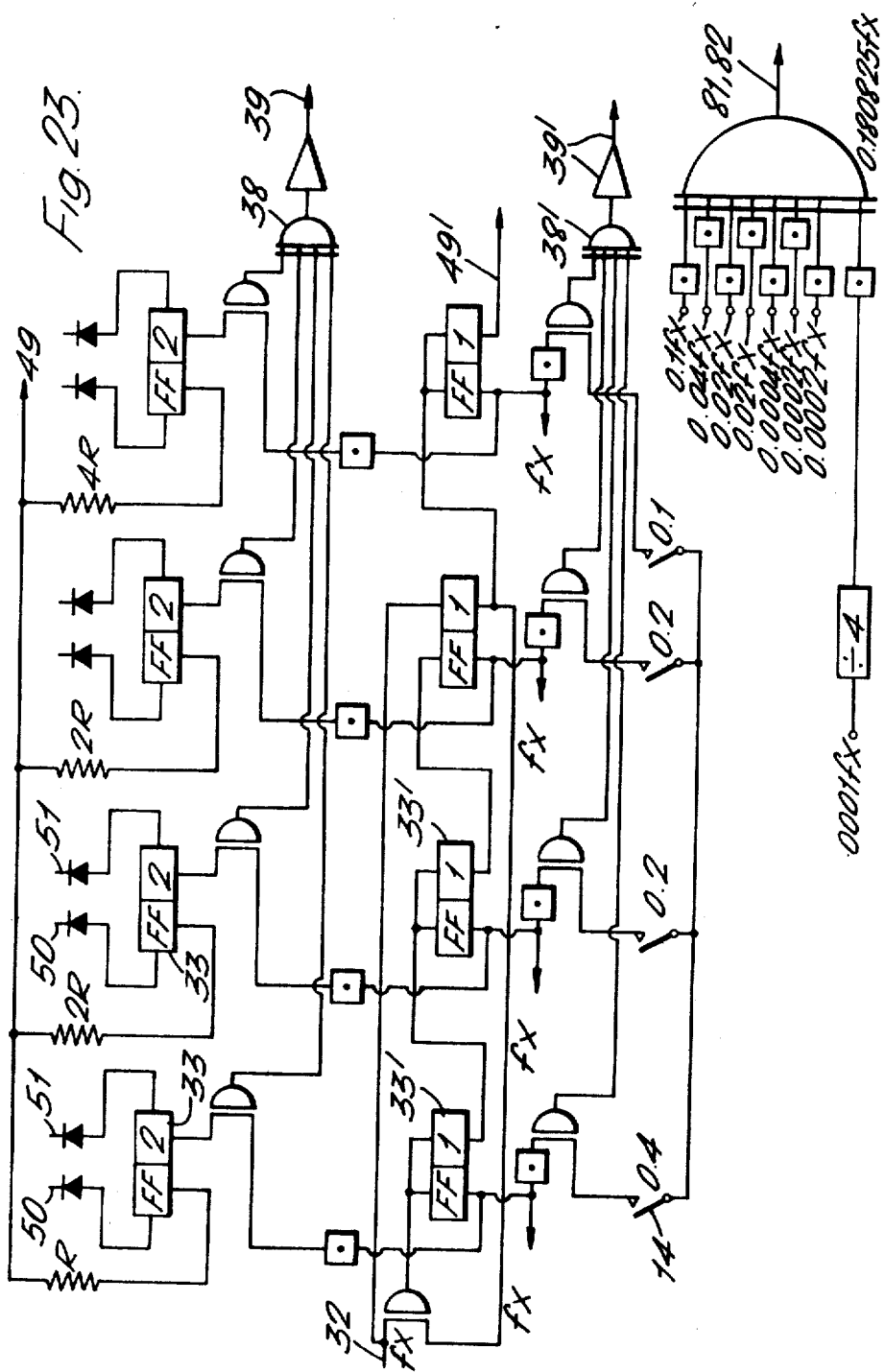

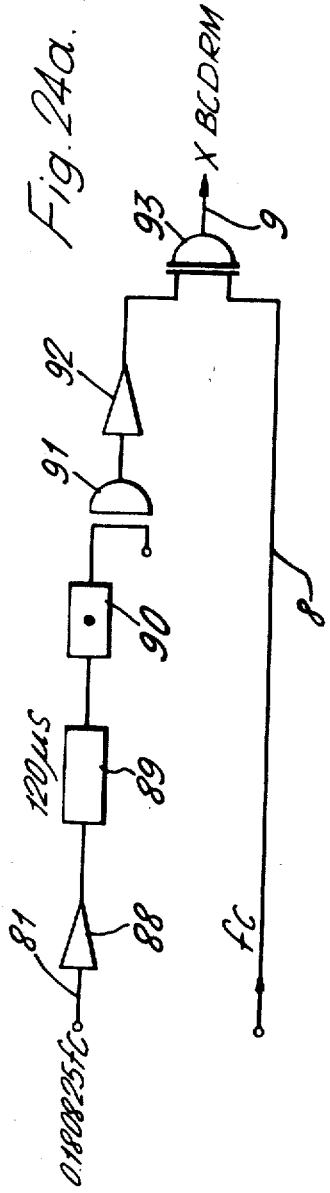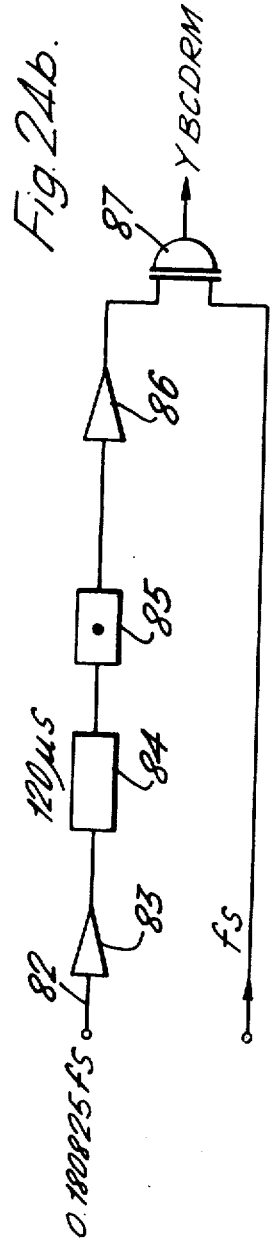

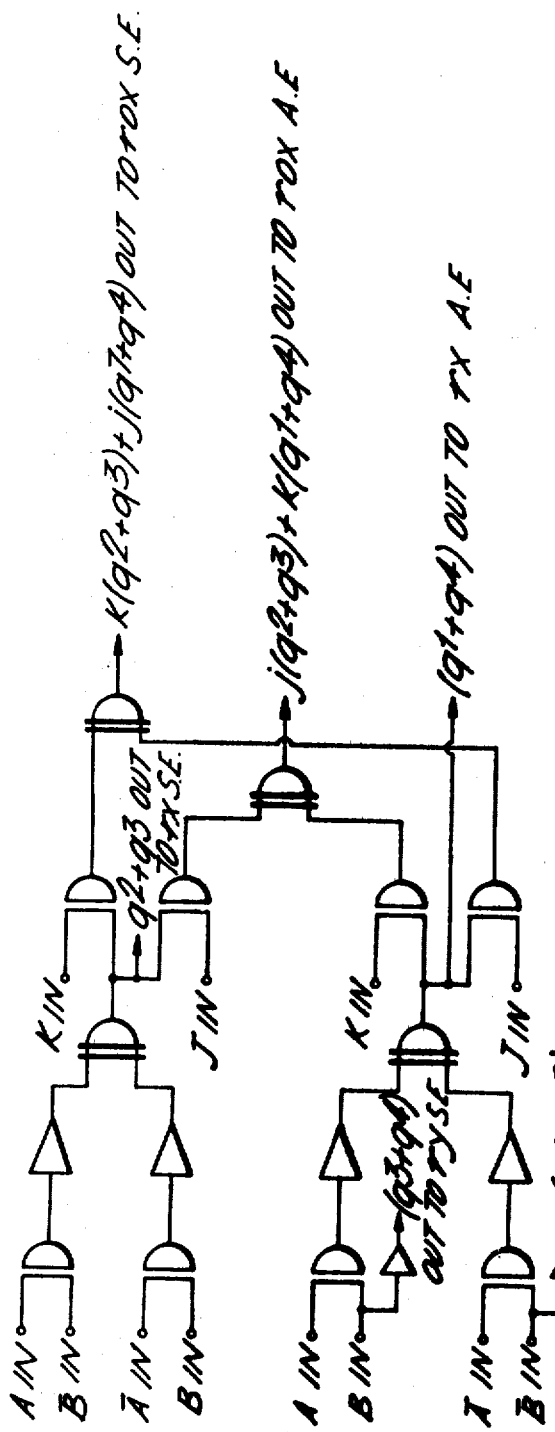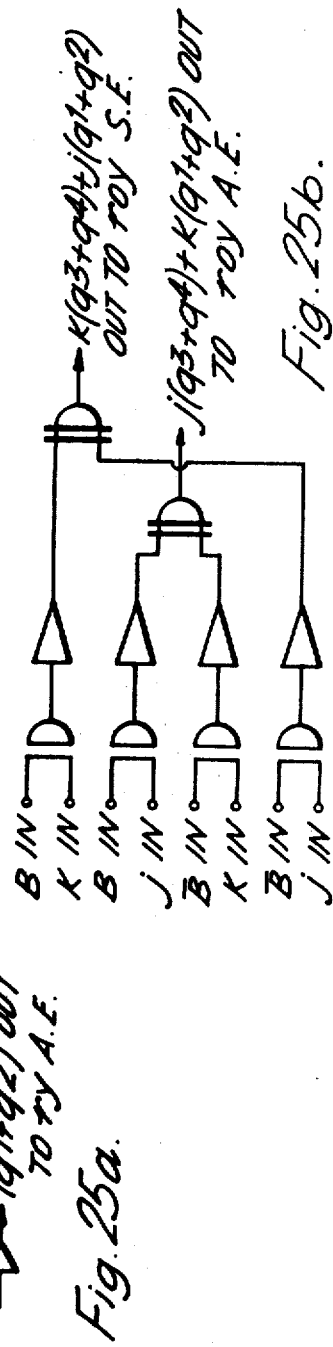
Fig. 25a.
Fig. 25b.

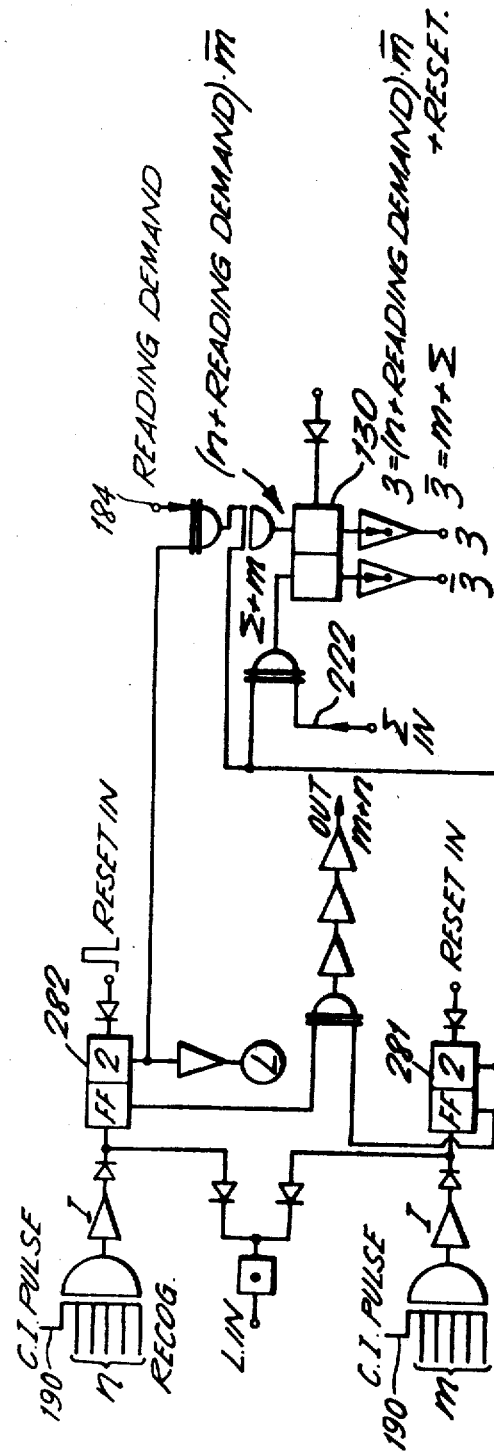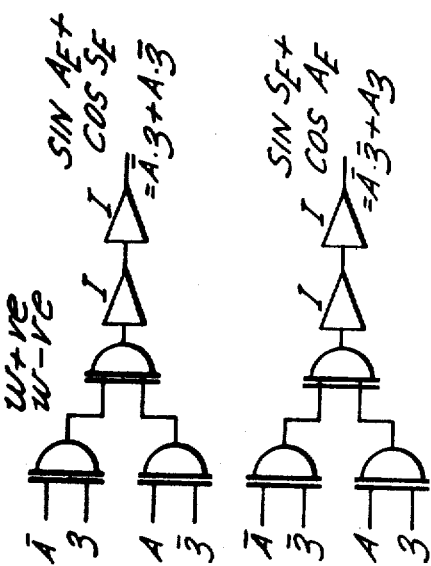
Fig. 26a.
Fig. 26b.

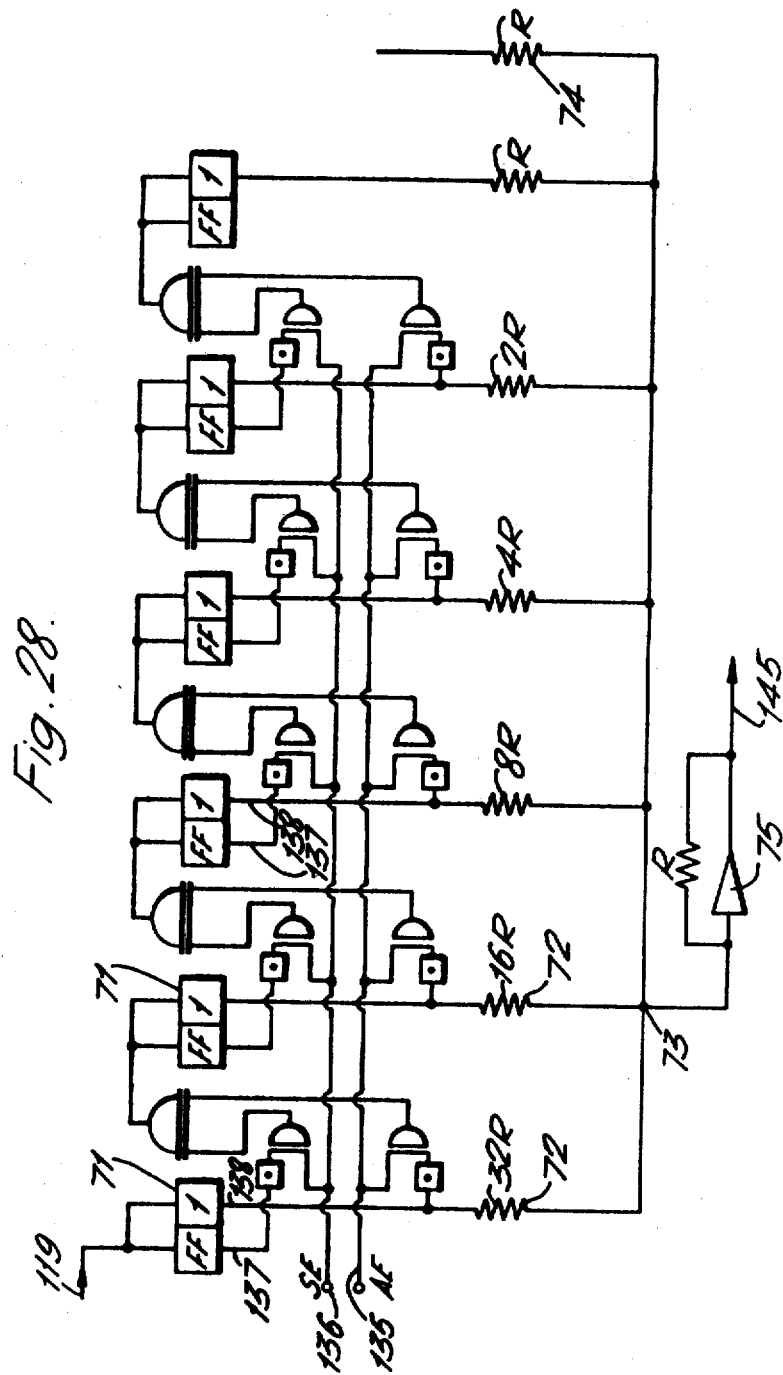

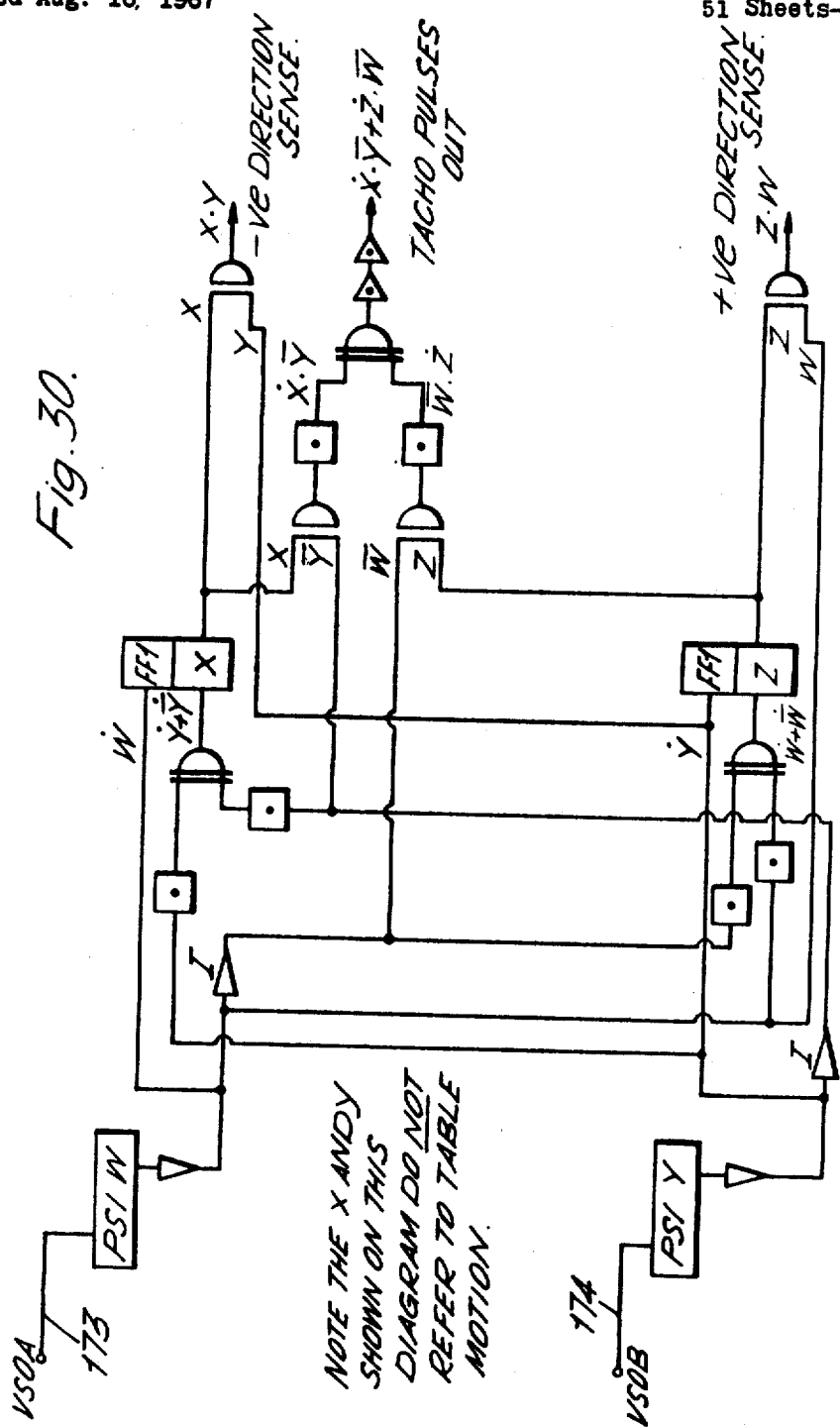

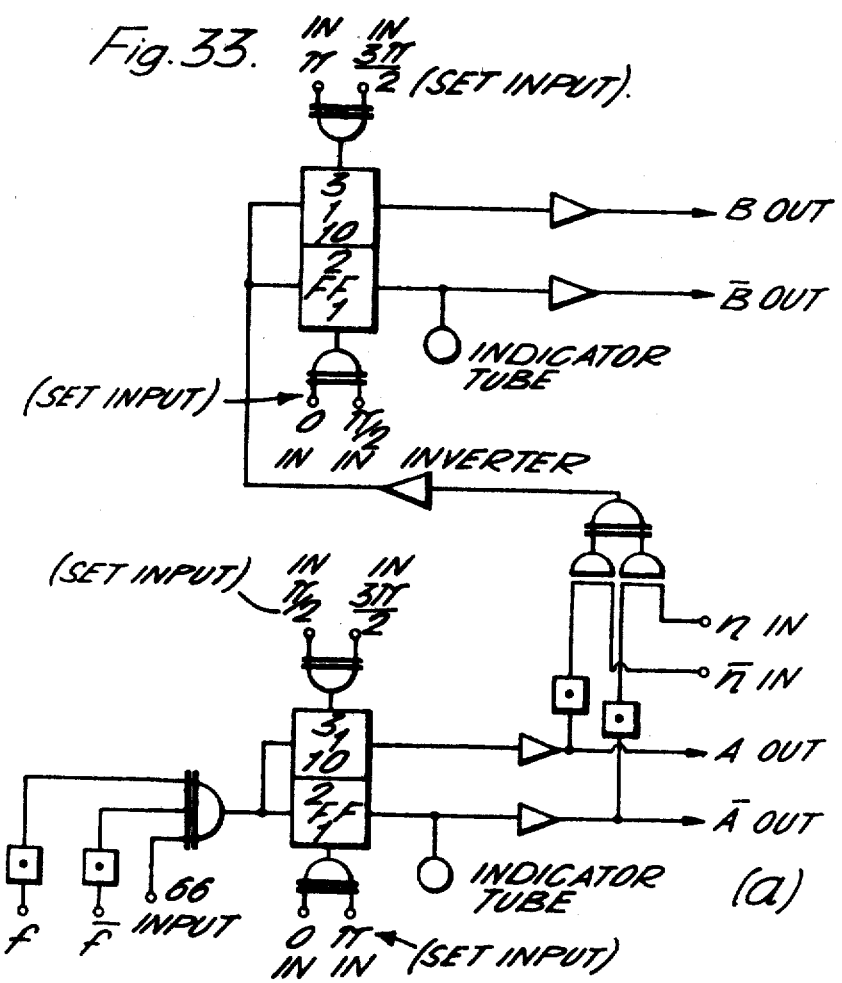
Fig. 33.
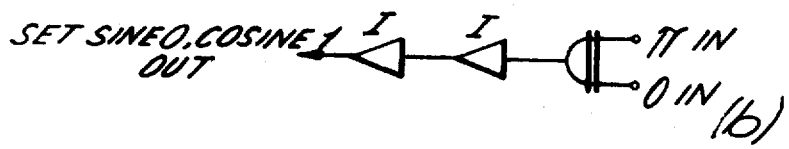
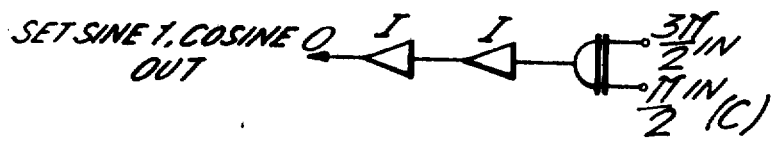

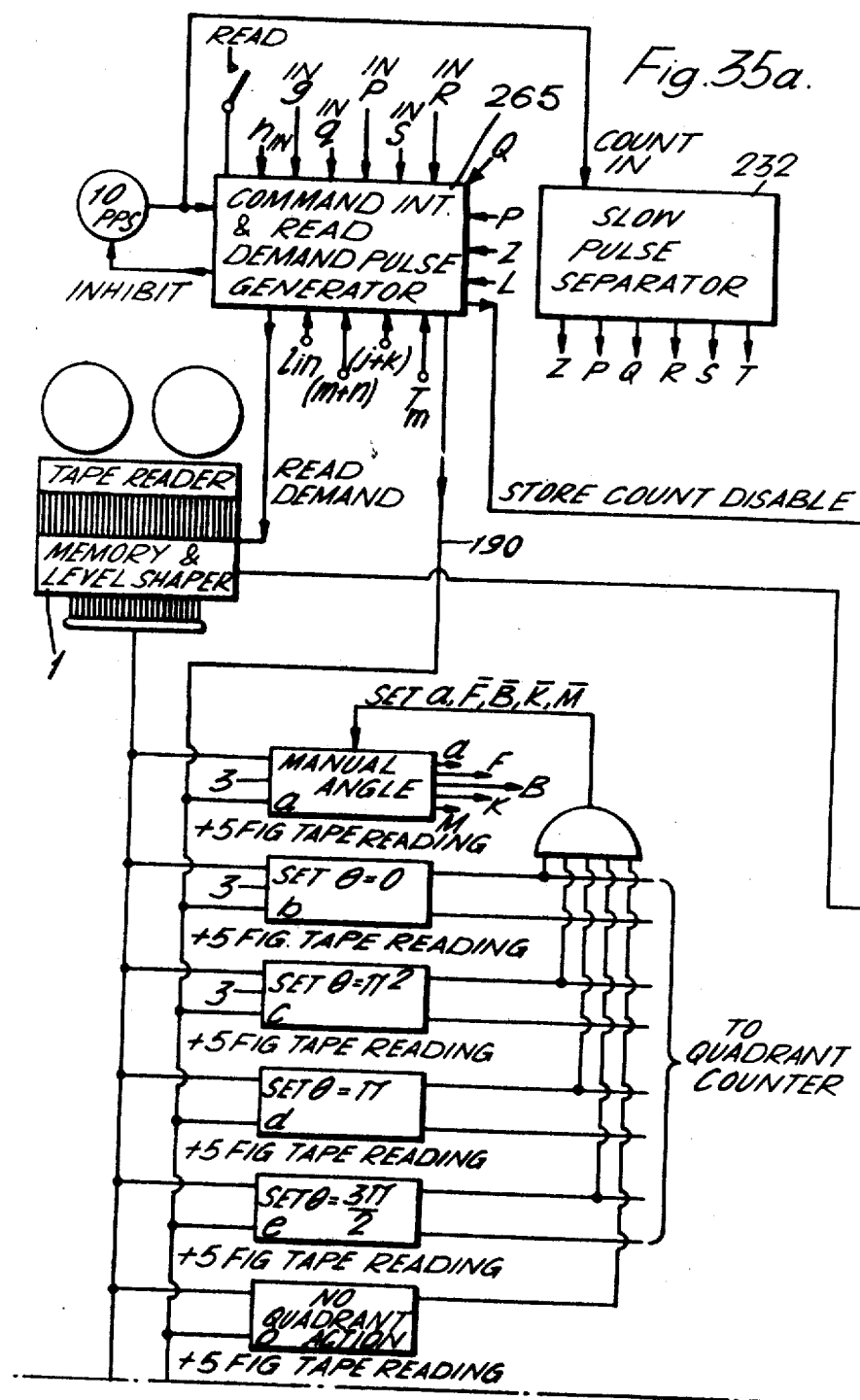

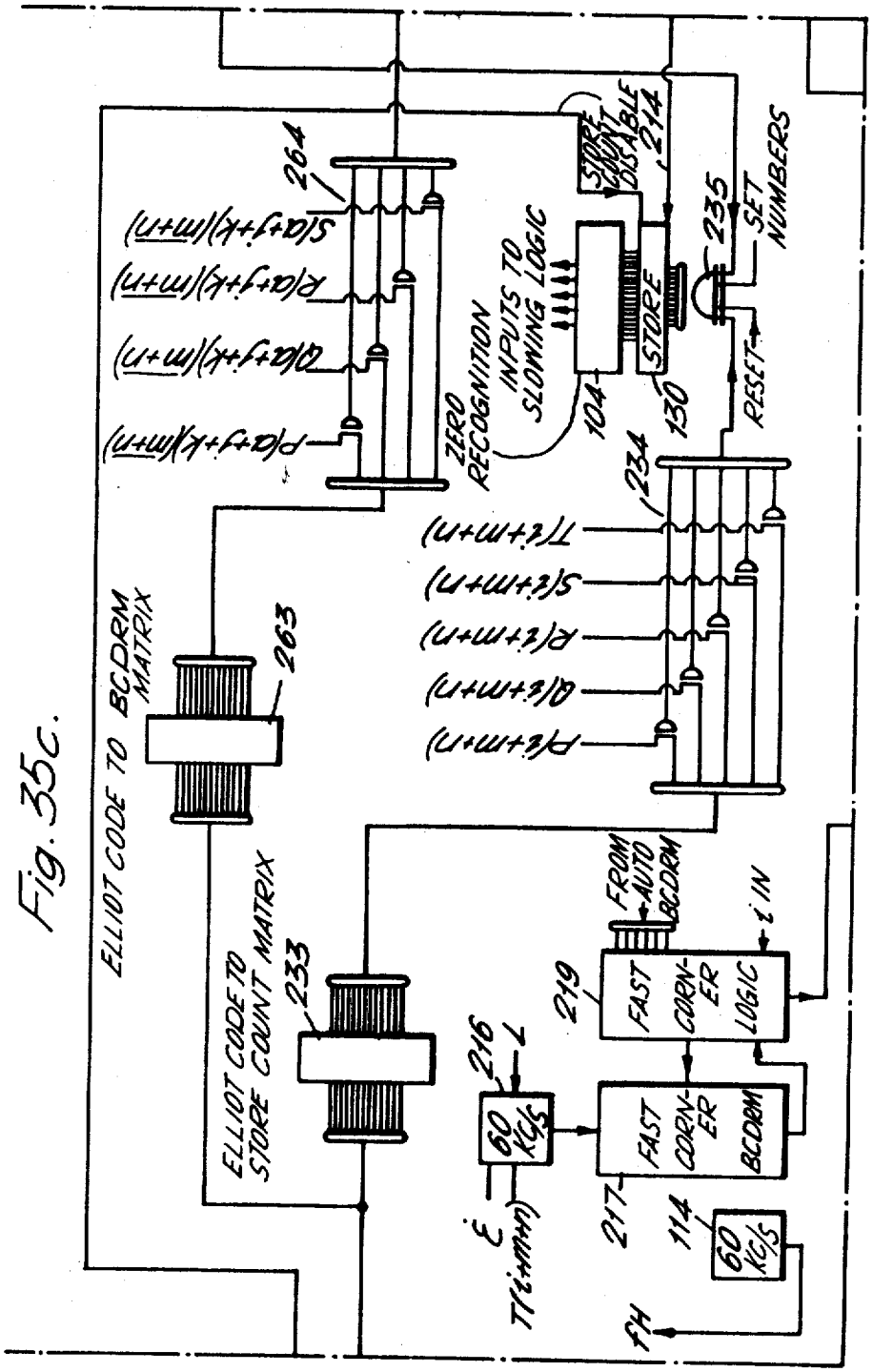

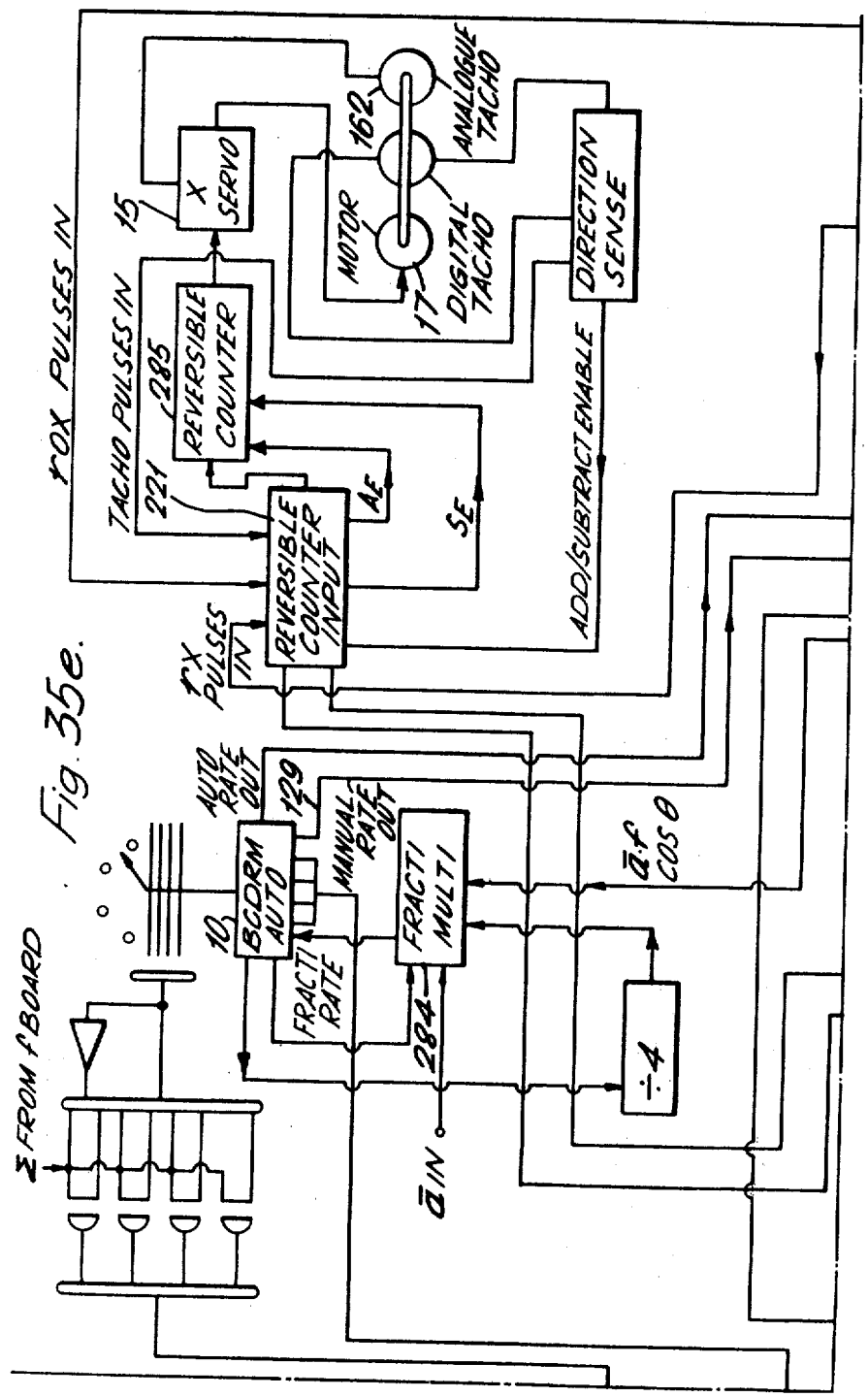

United States Patent Office 3,544,968
Patented Dec. 1, 1970

3,544,968
AUTOMATIC CONTROL OF MACHINING OPERATIONS
Samuel Lattimore, Carrum, Victoria, Australia, and Richard A. Morris, Lower Hutt, North Island, New Zealand, assignors to The New Zealand Government Property Corporation, Wellington, North Island, New Zealand, a body corporate of New Zealand
Filed Aug. 16, 1967, Ser. No. 661,032
Int. Cl. G05b *19/24*
U.S. Cl. 340—172.5                                22 Claims

ABSTRACT OF THE DISCLOSURE

A motion control for deriving distance and velocity control of a machine from a digitally stored program. Instructions are translated into a pulse train with the number of pulses representative of distance between two successive points. A sine/cosine generator converts said pulse train into two pulse trains which represent the component of said motion along two coordinate axes by successively adding binary representations of the sine and cosine of the angle of motion to binary representations of the cosine tail and sine tail respectively, associated with said angle of motion and passed additions. Means are provided for changing the sine and cosine representations to obtain curved motions and for multiplying the pulse output of the sine/cosine generator to control velocity.

---

This invention relates to a system of automatic or numerical machining control, i.e., a system where relative movement between an object or workpiece to be machined and the machining tool is controlled according to a predetermined programme written on tape.

A novel sine and cosine frequency generator is disclosed together with a novel frequency fractional multiplier. Both are applied in a control system for a departure command (contour controlled) machine tool operation in two dimensions. Information in Algol language on paper tape is read and used, for example, to control X axis and Y axis movement of the workpiece table of a milling machine. The linear or angular velocities of the table are controlled by series of pulses which cause servomotors to drive the table in X and Y directions at velocities proportional to the desired unresolved table velocity and the cosine or sine of the angle the velocity must make with the drive directions. The sine/cosine generator converts an input frequency, which is variable to control cutting velocity, into two pulse trains with output frequencies proportioned to the sine and cosine of an angle which may be fixed for straight cuts or varied for arcuate cuts. The sine and cosine of angle are recorded in multi-stage reversible binary counters. These two pulse trains may be passed through binary coded decimal rate multipliers from which pulse trains, which are a fractional frequency of the input can be taken, thus enabling the radius of an arcuate cut to be varied. A pulse counter connected to the input of the sine/cosine generator determines the length of the cut. In addition two pulse trains of suitable frequency are derived from the BCDRM's to cater for finite tool radius and are delayed and added to the other trains and used to drive servomotors controlling table movement. A frequency fractional multiplier is used to increase the input frequency to the BCDRM's to simplify the programming of radii. A series of pulses produced by vane switched oscillators operated by rotatable slotted discs on the motor shafts are fed back to a difference counter which corrects any discrepancy between demanded and actual table position.

The present state of the art in broad terms is that two basic classes of movement control have been developed. In one class the control data is expressed as a number of coordinates—usually cartesian and the object is moved (in the case of a milling machine), relative to the tool (rather than the reverse which is usually not so convenient) from point to point by increments of length which are usually equal. Thus, if a straight line is to be machined the number of reference points will be controlled by the length of the line and the size of the length increment. This class requires a mass of data to be provided to the system controlling tool or workpiece movement and necessitates the use of magnetic tape to allow rapid reading of such data and generally a computer to calculate the coordinates. The above class is therefore a system based on absolute commands, all measurements being referred back to one origin established on the workpiece.

In the other class departure commands are used. In this class, in the case of a milling machine, the workpiece is told to move past the tool in a straight line or in an arc of a circle. When the tool reaches a certain point a new command is given to control workpiece movement from that point which thus is the new origin. It is within this latter class that the present invention belongs.

The main object of the present invention is to achieve a simpler programming of such a machining operation.

A particular object is to provide a system wherein the radius of cut may be easily programmed by the use of binary coded decimal rate multipliers from which pulse trains having frequencies which are fractions of the input frequencies may be derived.

Another object is to allow the operator to be able to select the tool he desires to use, to measure the diameter of the tool and manually to make allowance for the tool diameter in the BCDRM's so that the programme on tape need take no account of the tool radius.

A yet further object is to enable the angle of cut for a straight cut to be easily programmed by the use of BCDRM's.

A yet further object is to provide an improved means of generating pulse trains with frequencies proportional to the sine and cosine of a selected angle.

One preferred form of the invention as applied to a milling machine to effect movement of a workpiece mounted on a movable table in relation to a stationary but rotatable cutting tool will now be described with reference to the accompanying drawings in which:

FIG. 4 shows in broad outline the sine/cosine generator, FIG. 5 shows a block diagram of a stage of a binary coded decimal rate multiplier (BCDRM).

FIG. 11 shows a block diagram of "Manual Angle" Circuits,

Figure 12A:
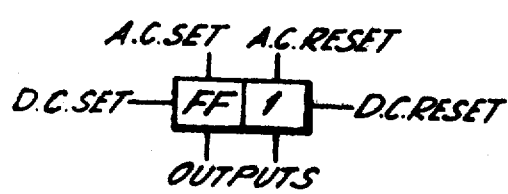
Figure 12B:
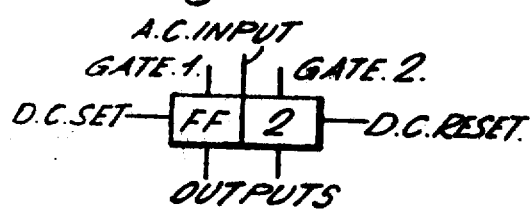
Figure 12C:
Figure 12D:
Figure 12E:
Figure 12F:
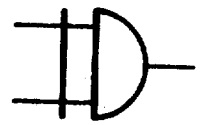
Figure 12G:
Figure 12H:
Figure 12I:
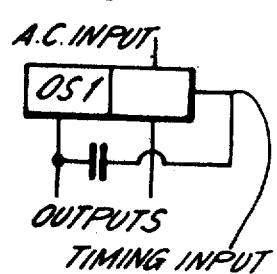
Figure 13C:
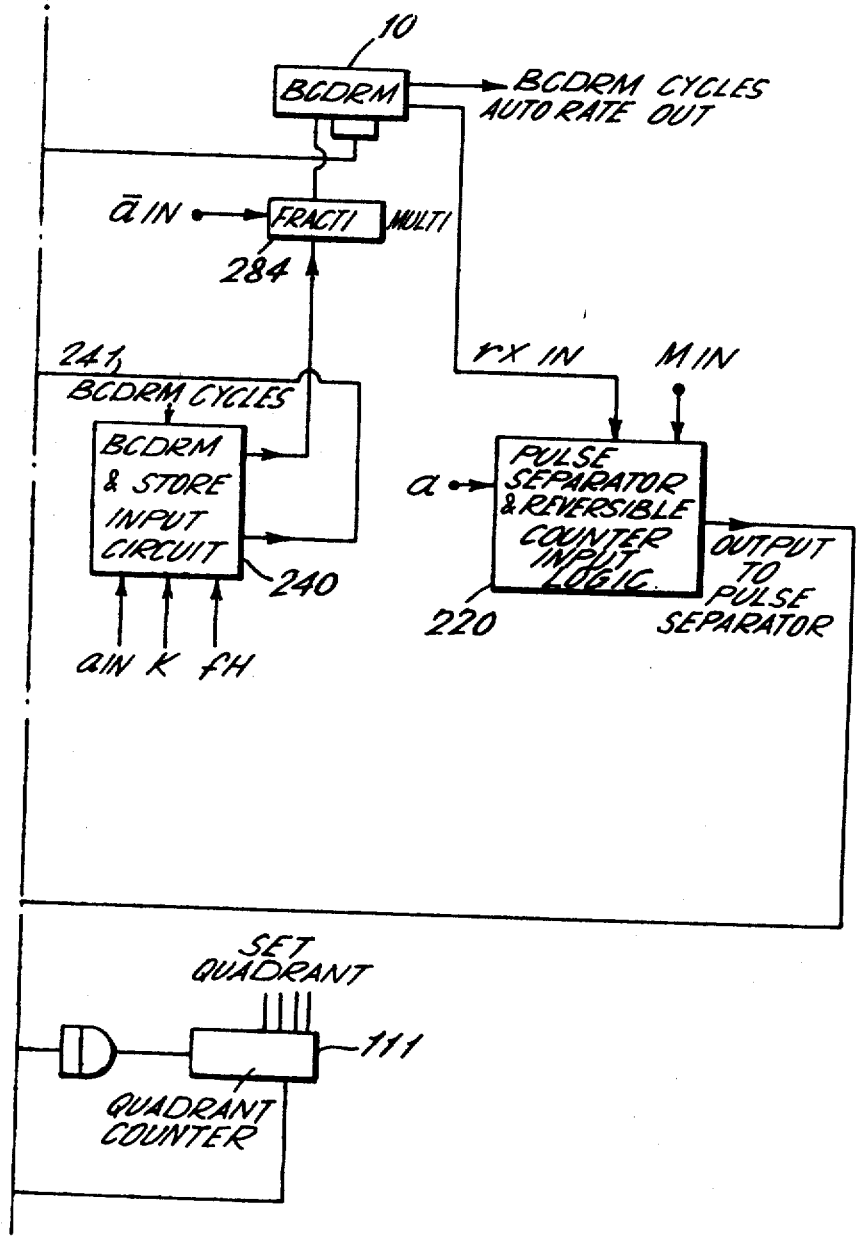
Figure 14:
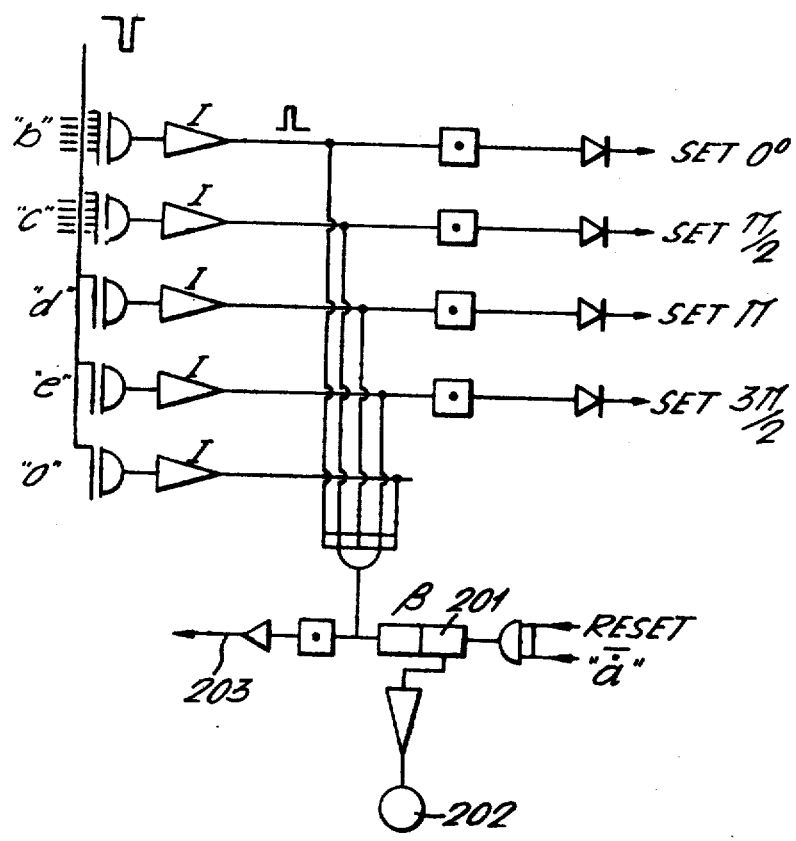
Figure 15D:
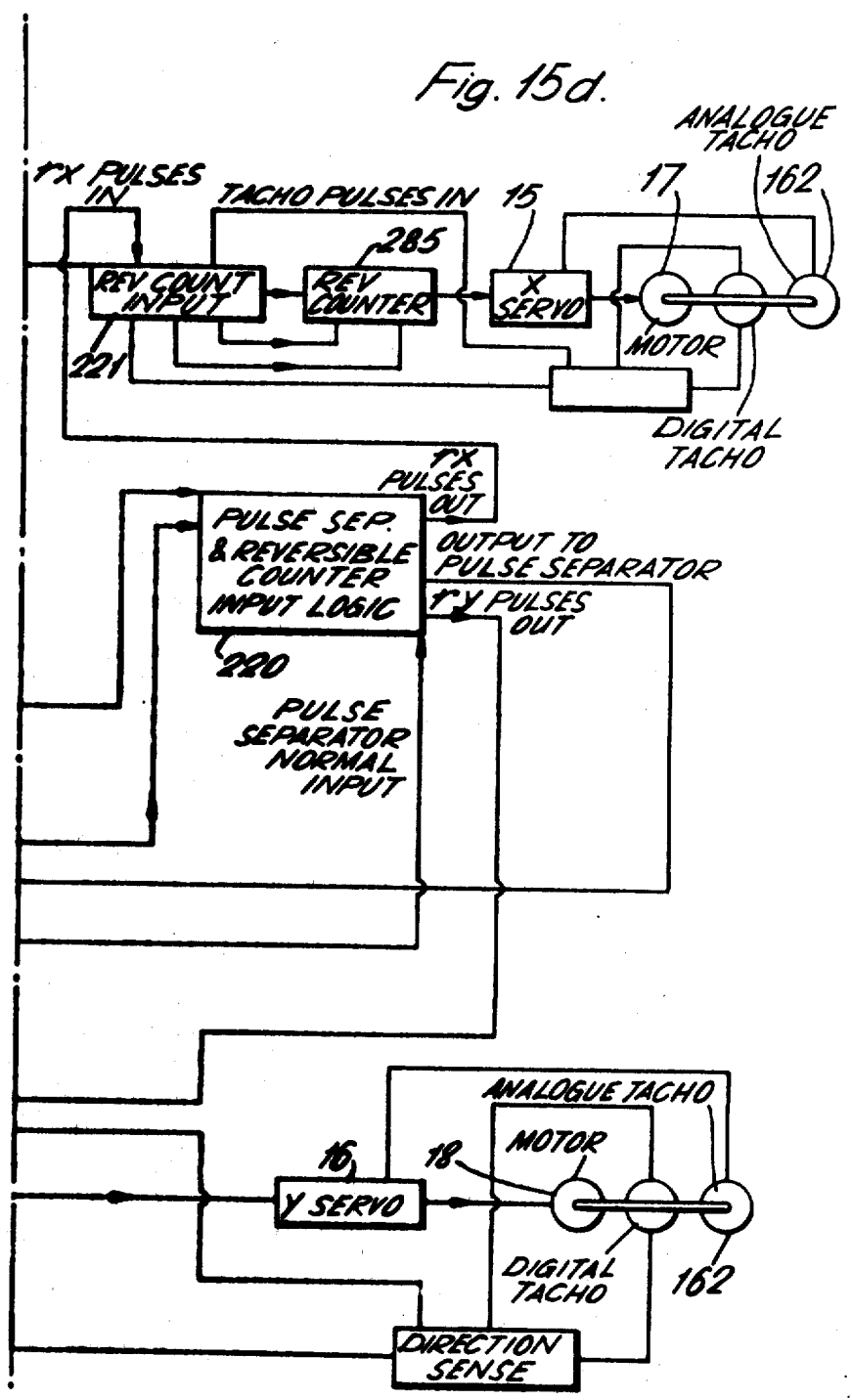
Figure 16:
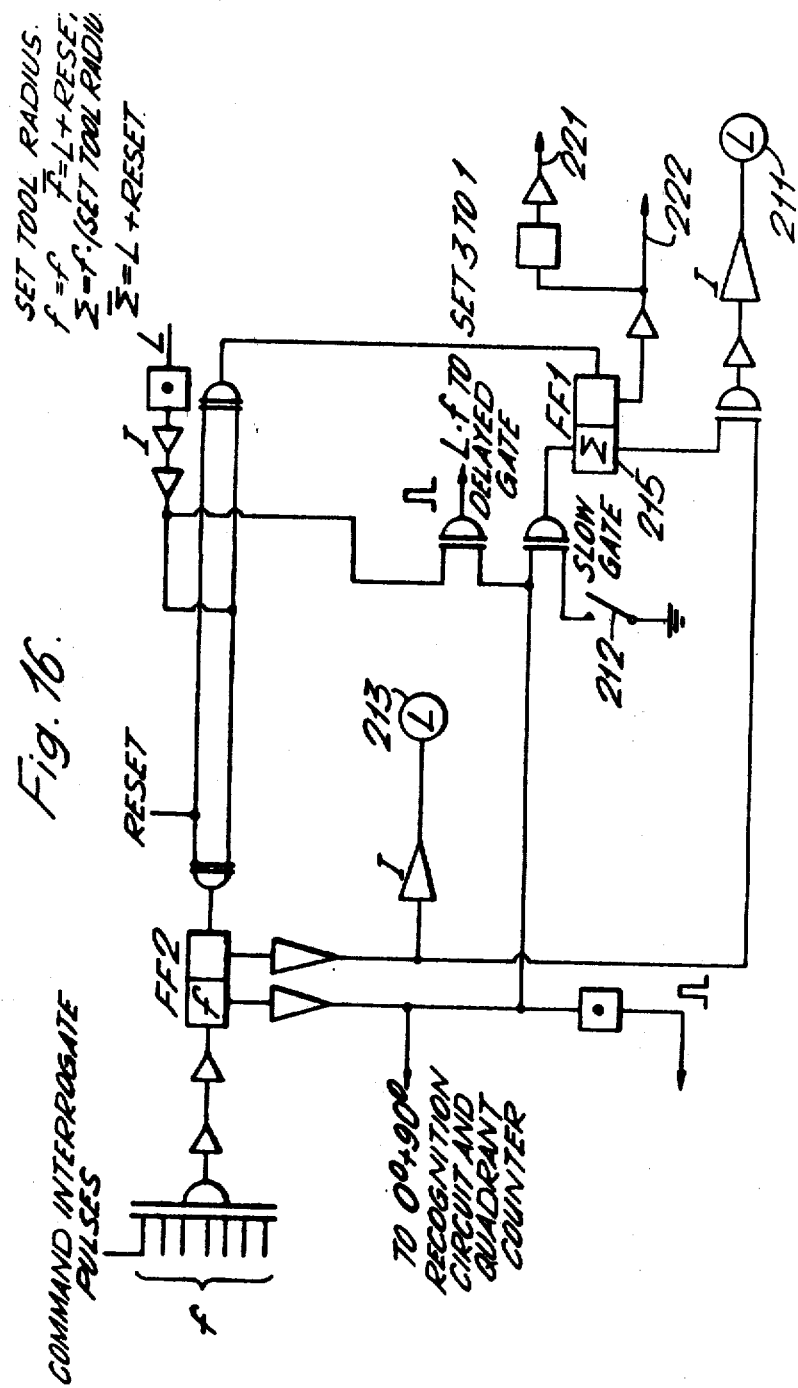
Figures 17, 17A:
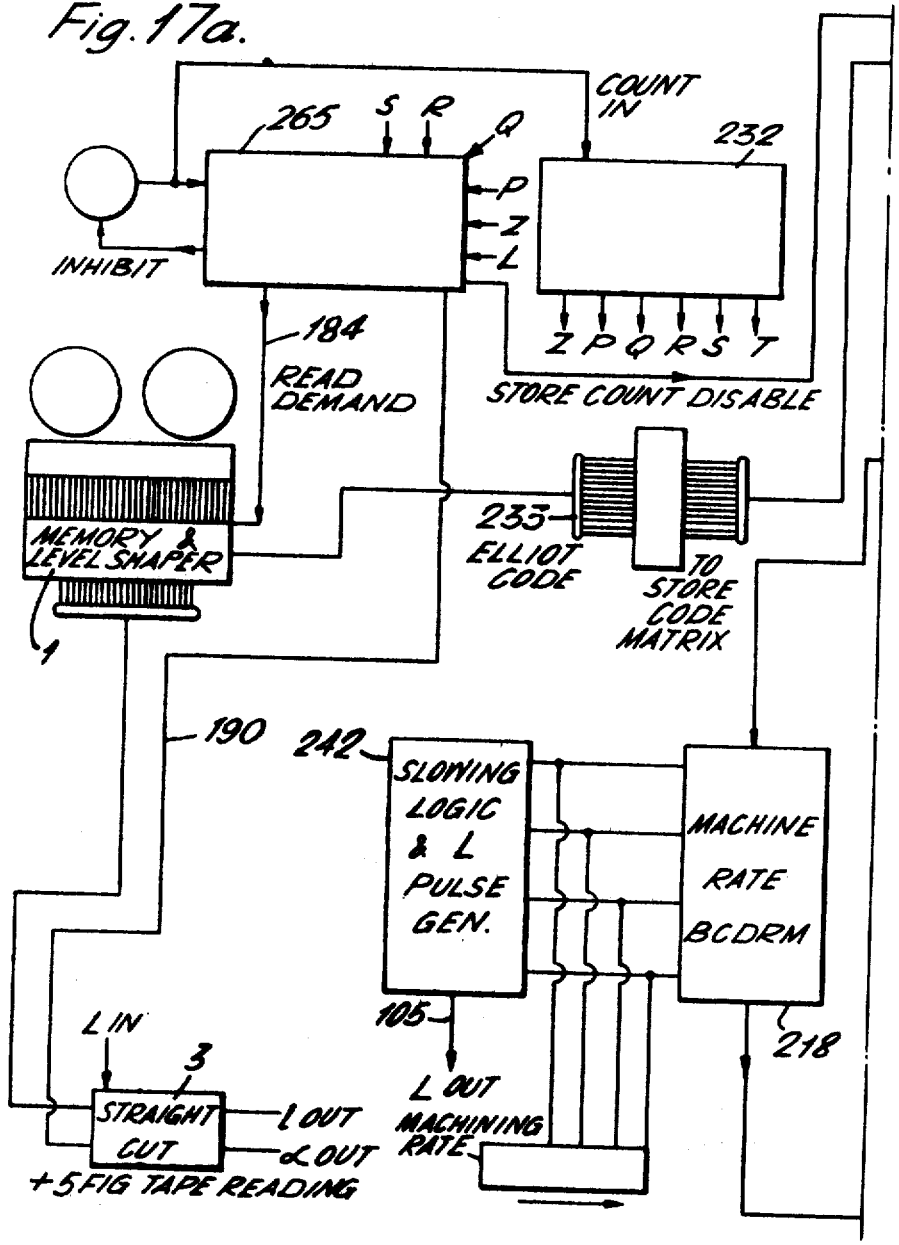
Figure 17B:
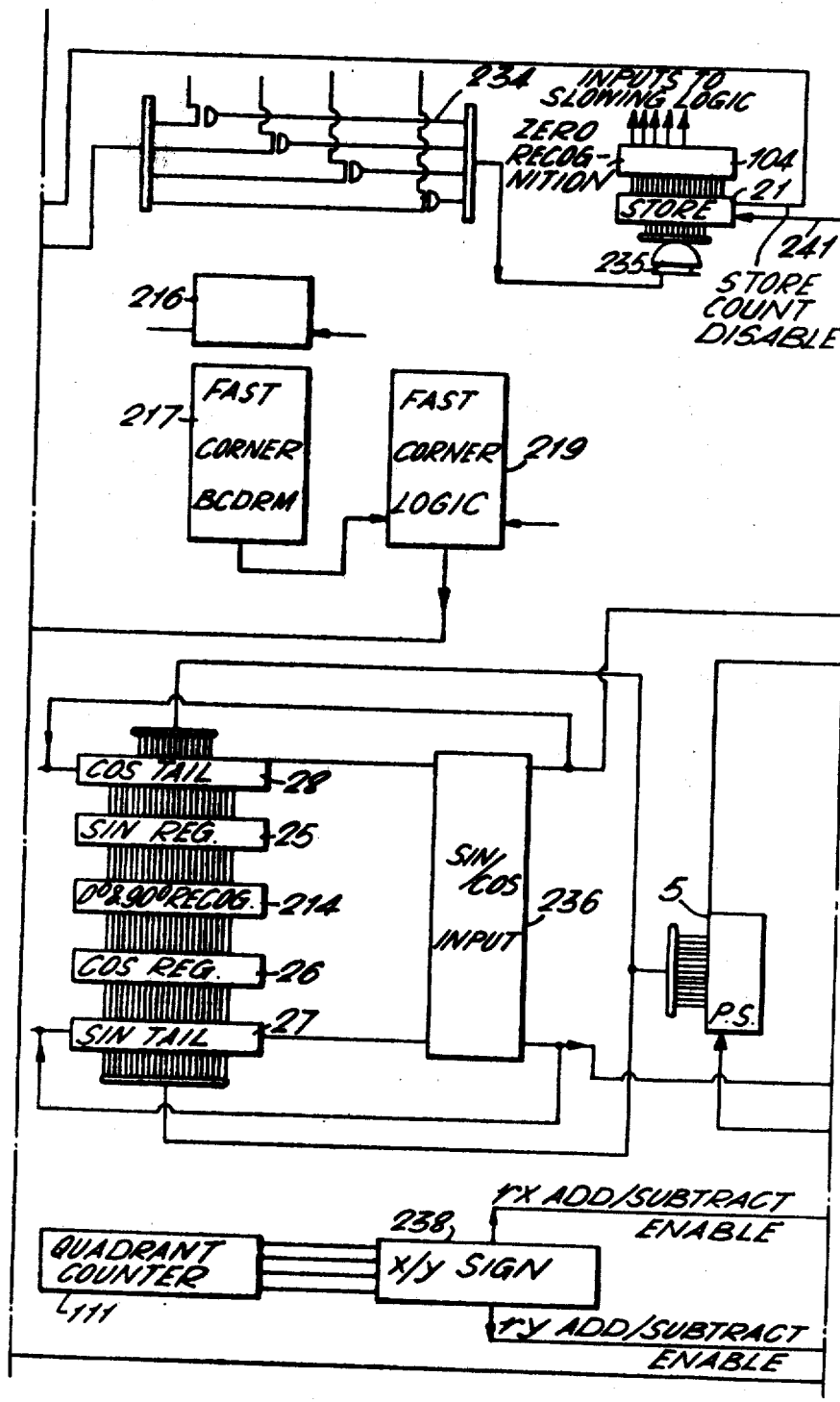
Figure 17D:
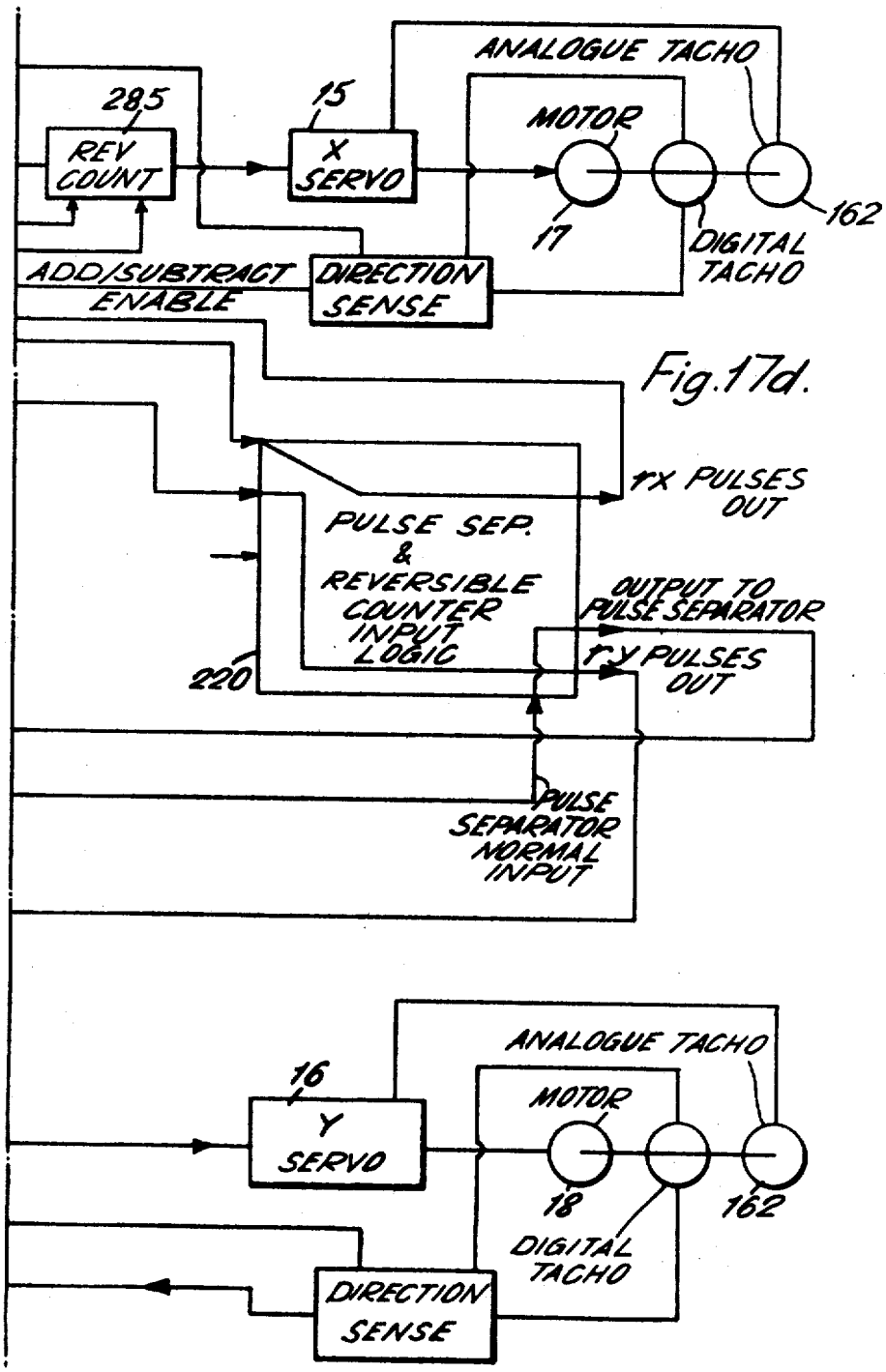
Figure 18:
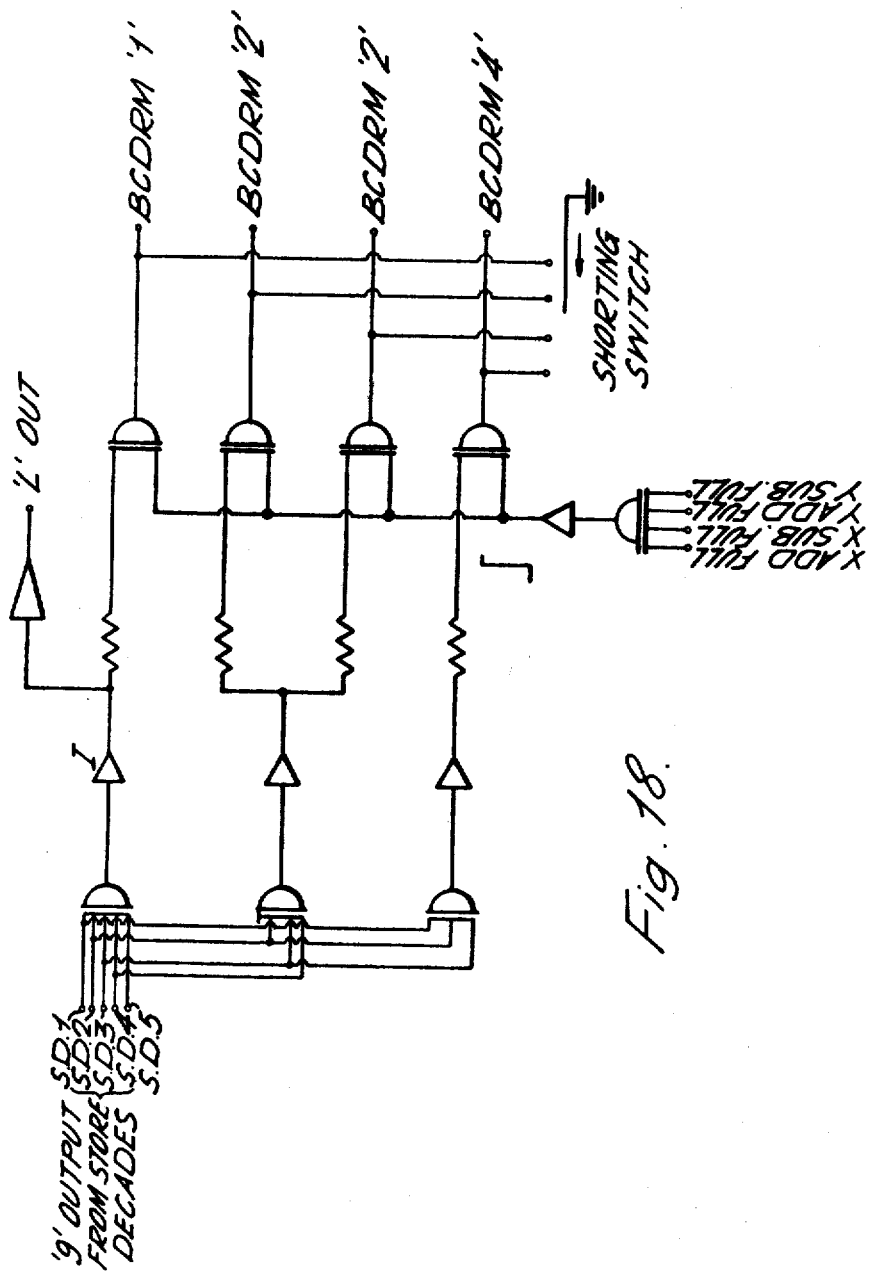
Figure 20B:
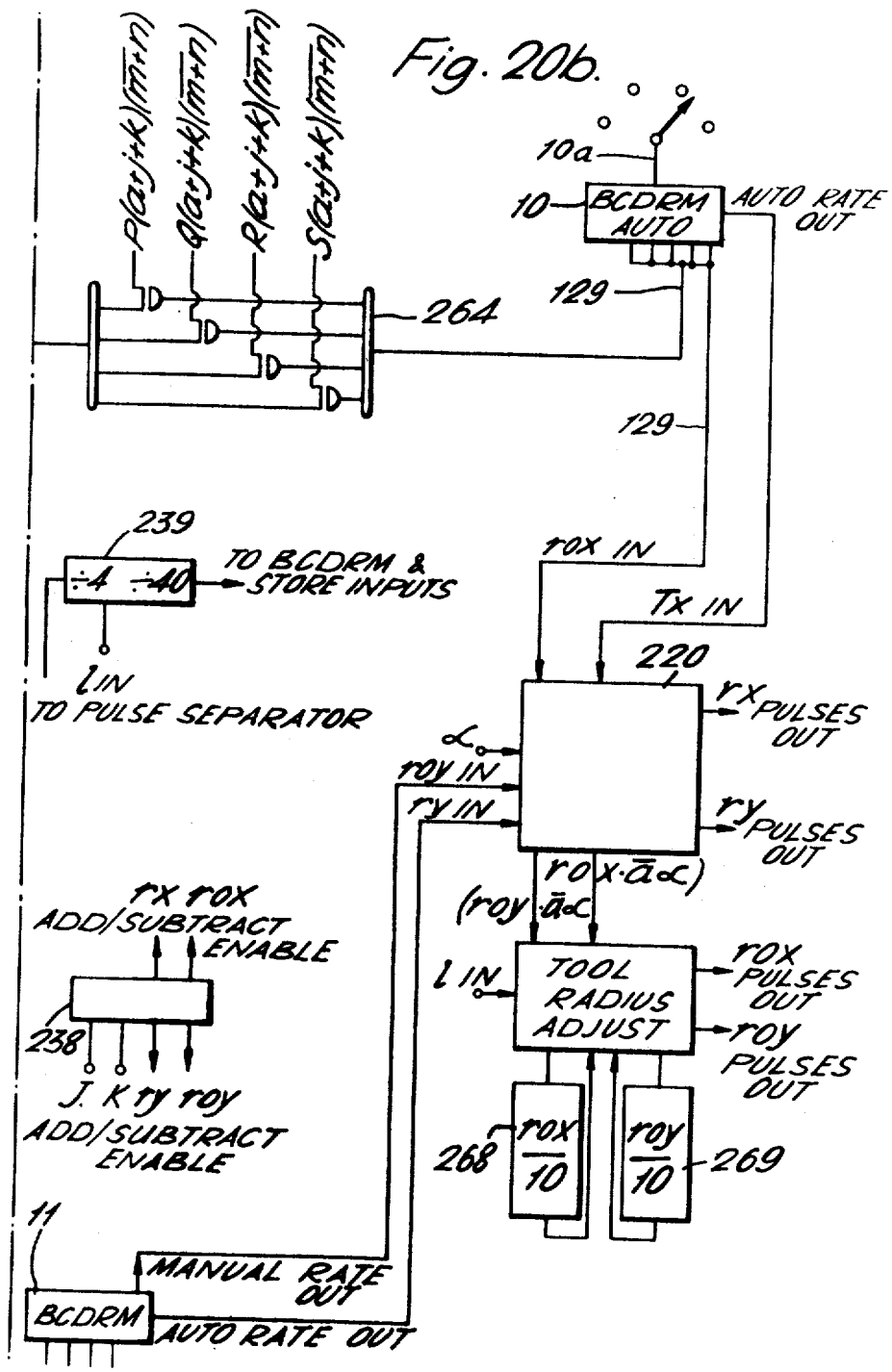
Figure 22:
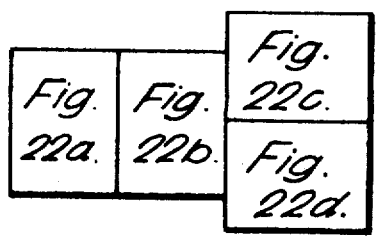
Figure 35:
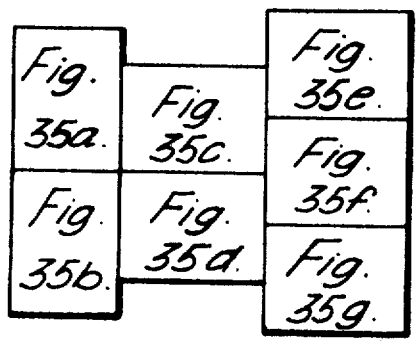
Figure 22C:
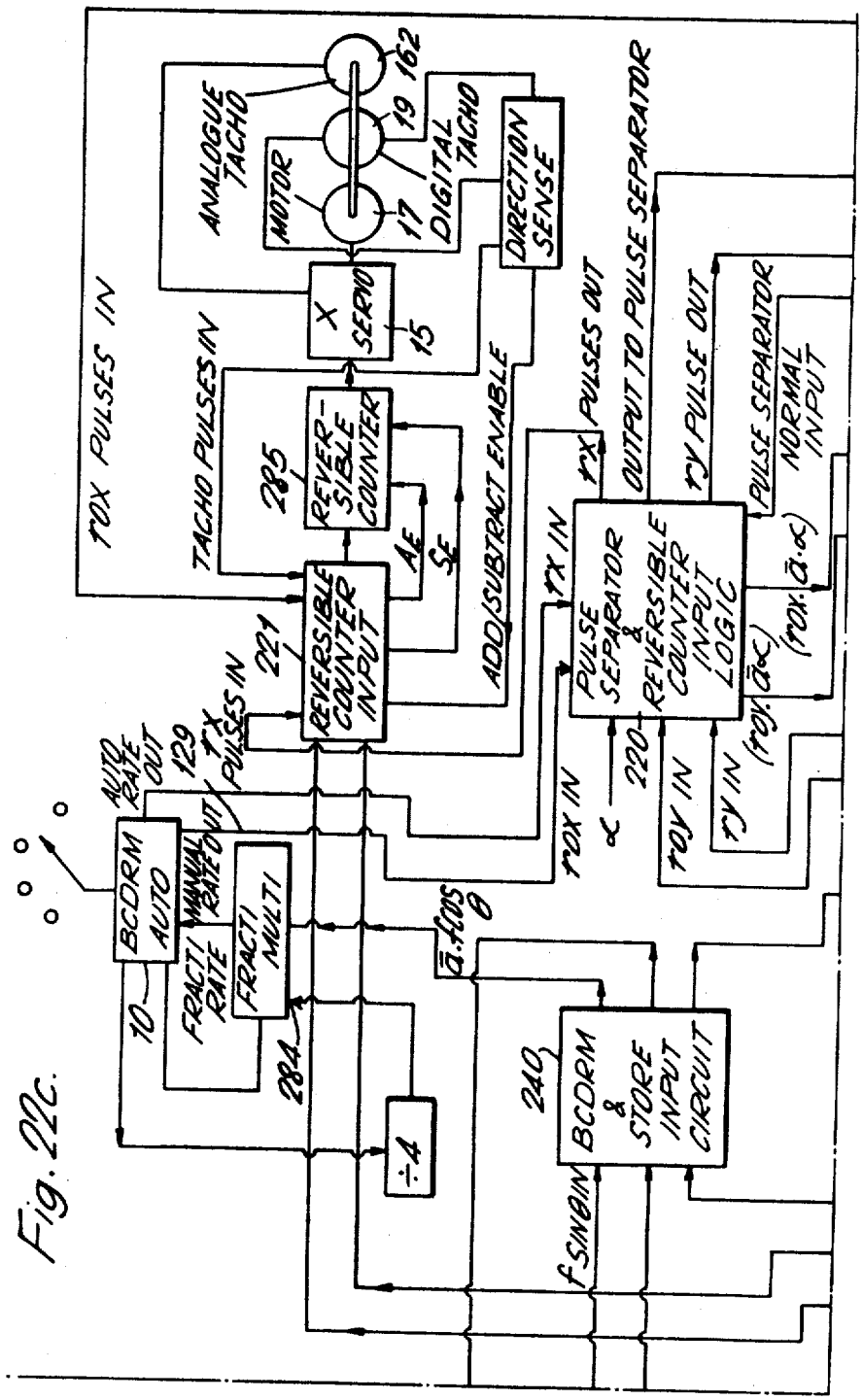
Figure 22D:
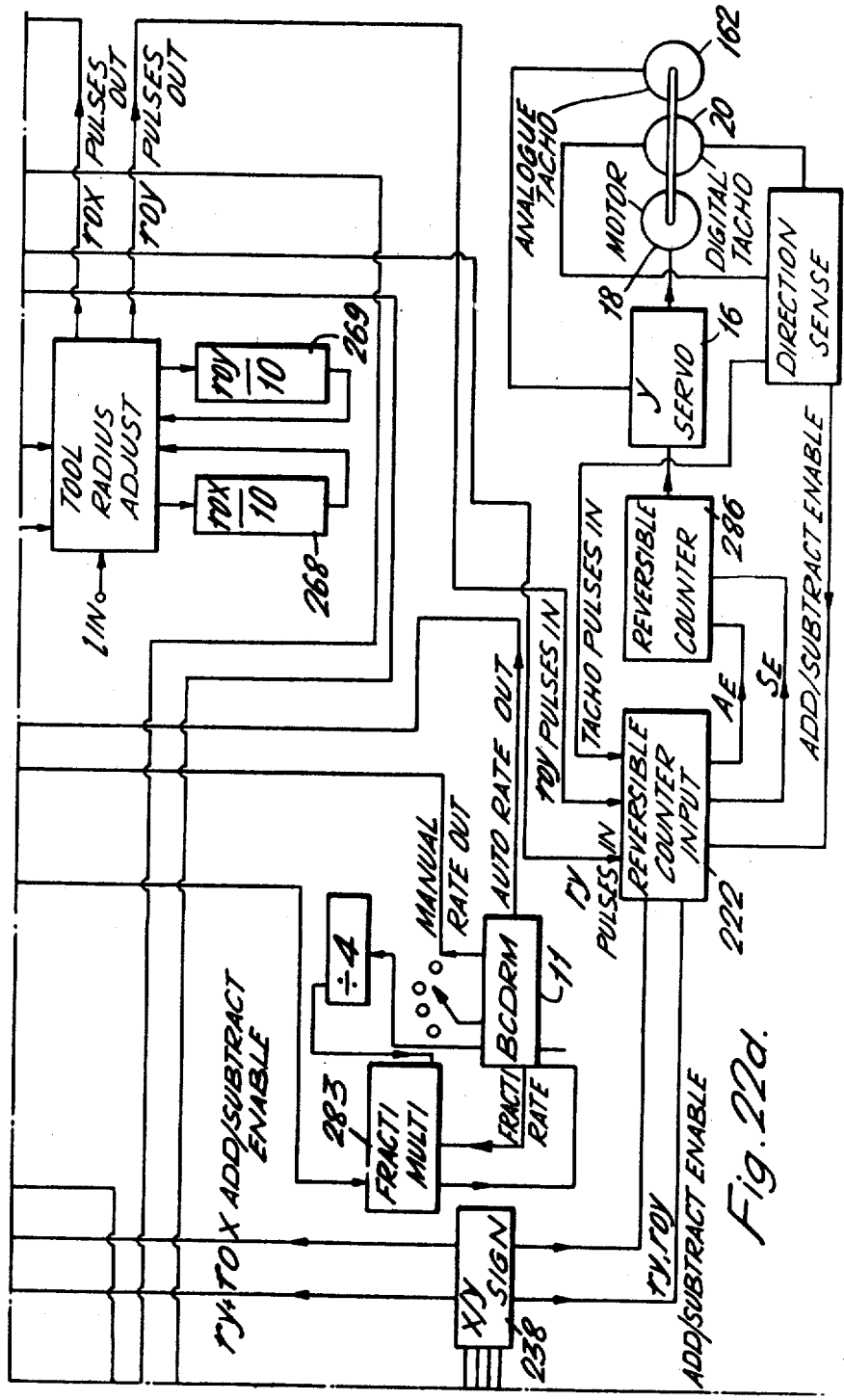
Figure 27:
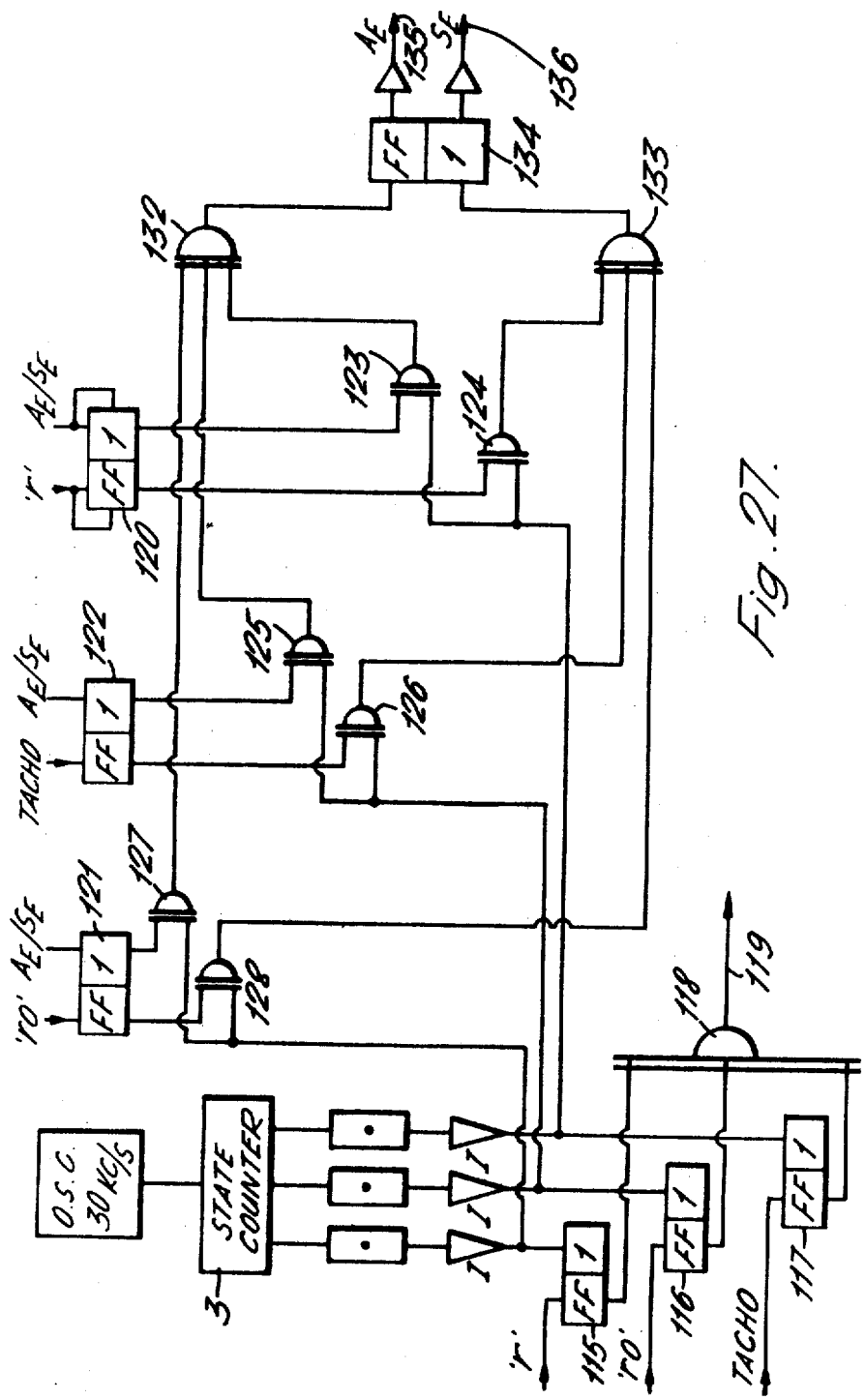
Figures 29A, 29B:
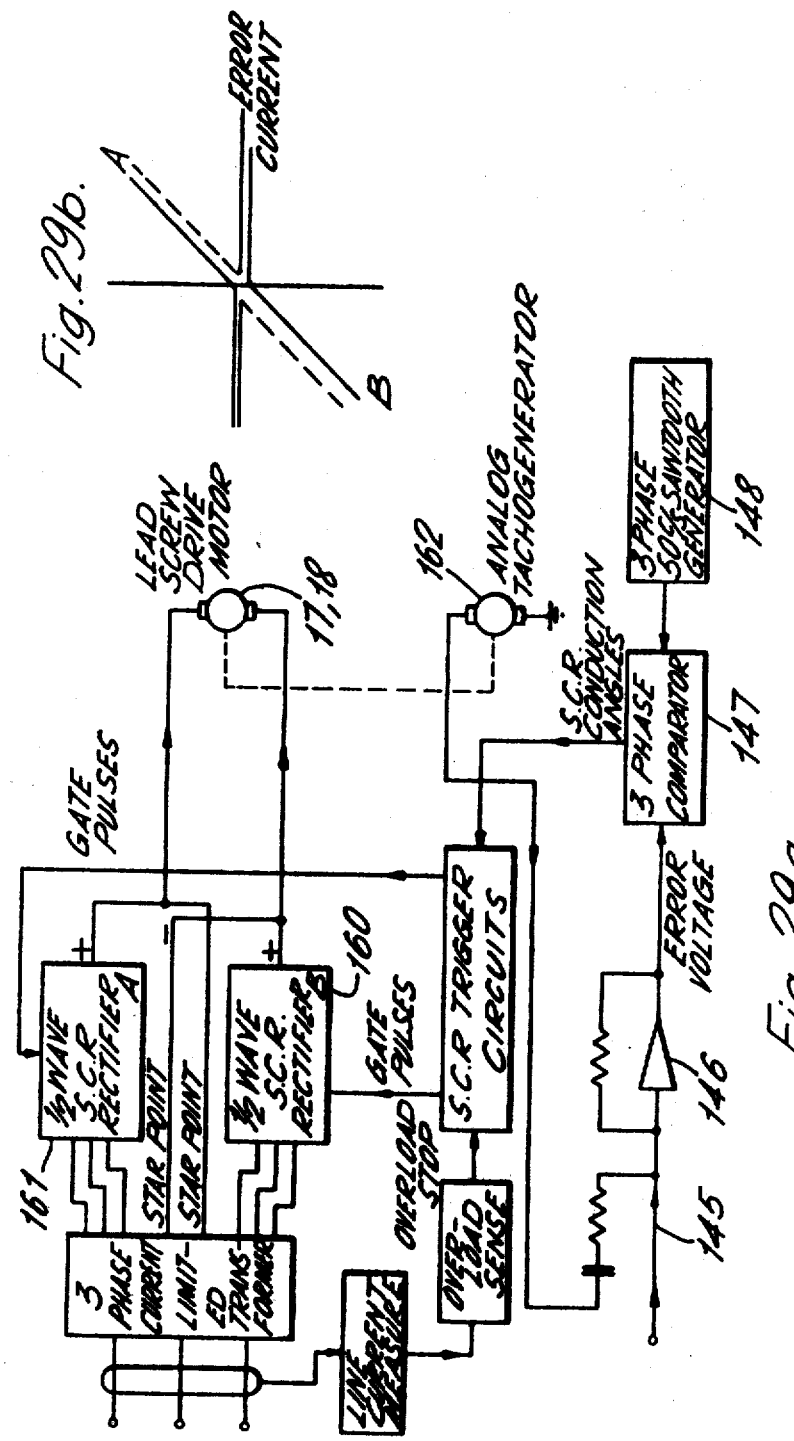
Figure 31:
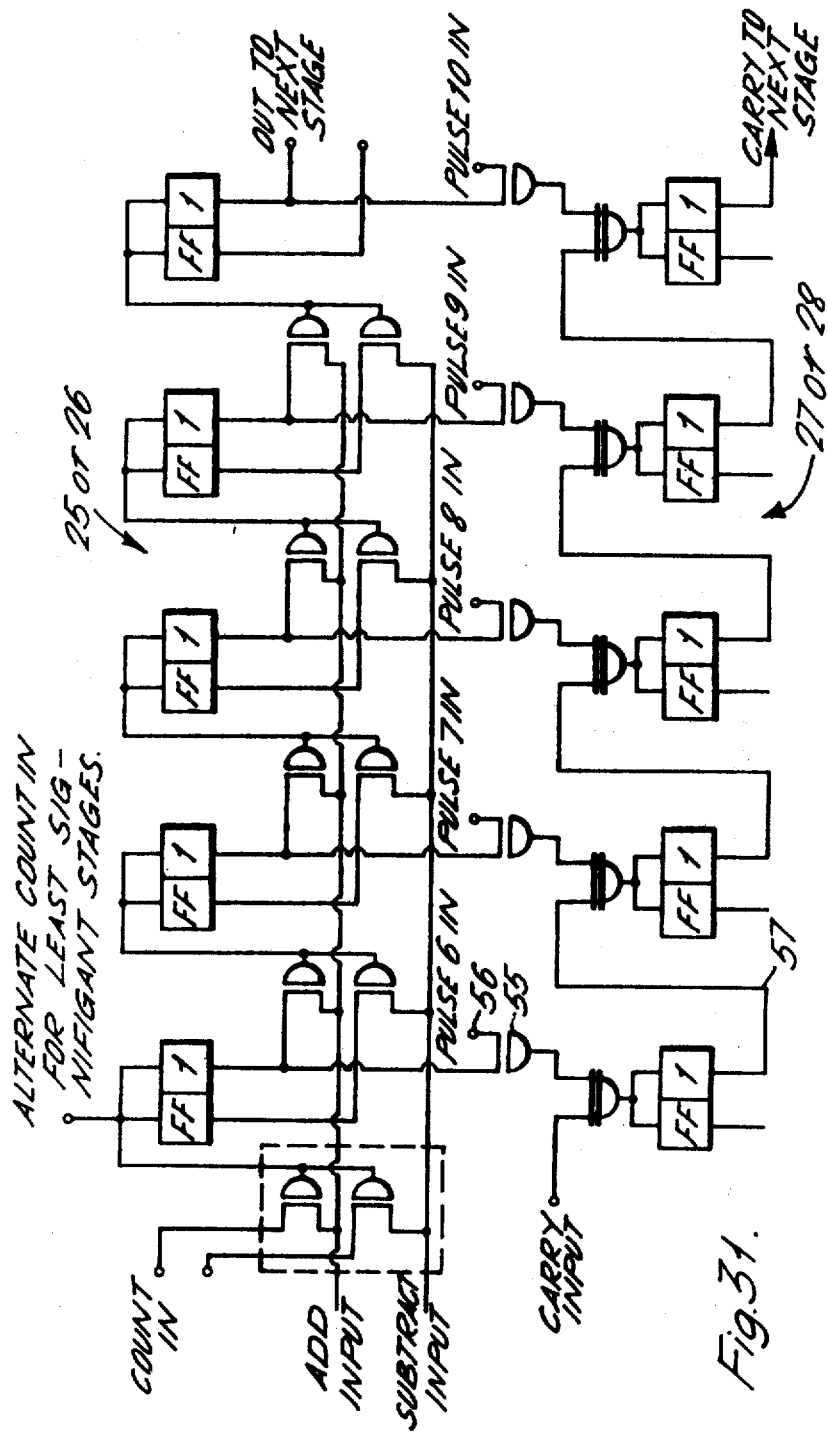
Figure 32:
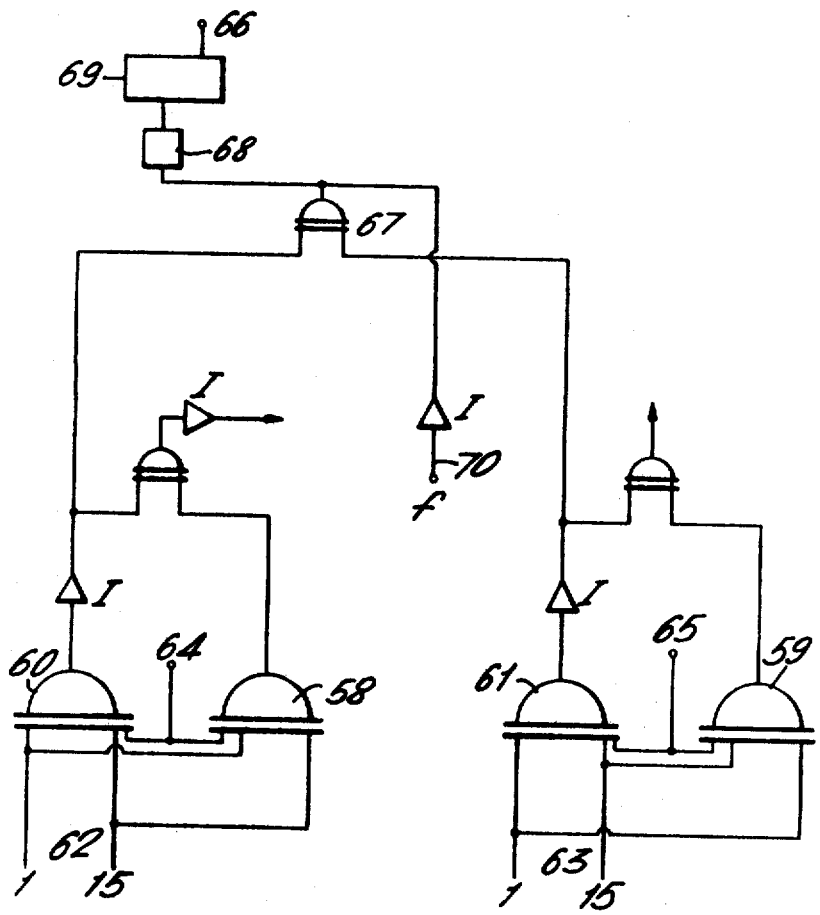
Figure 34:
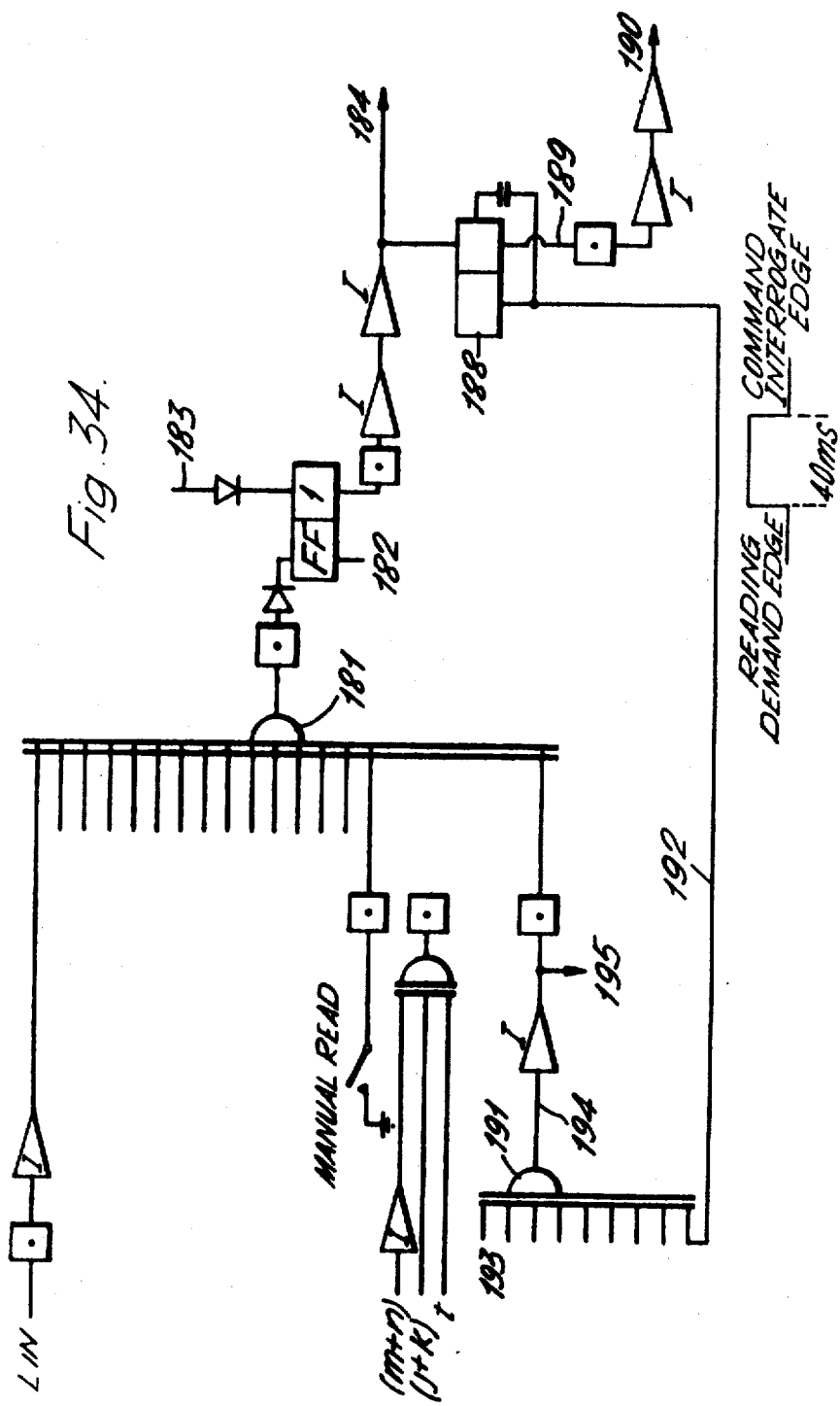

FIG. 12 explains the conventions and symbols used,

In particular FIGS. 12a and 12b show binary stages of two types, FF1 and FF2 extensively used and explains the inputs and outputs for these, FIG. 12c gives the symbol of an inverted amplifier, FIG. 12d gives the symbol for an emitter follower, FIG. 12e gives the symbol for an "and" gate, FIG. 12f gives the symbol for an "or" gate, FIG. 12g gives the symbol for a differentiating circuit, FIG. 12h gives the symbol for an indicator lamp, FIG. 12i explains the inputs and outputs of a monostable multivibrator, FIG. 13 shows block diagram of an "Auto Angle" System, FIG. 14 shows block diagram of an "Auto Angle" Circuits, FIGS. 15a to 15d show block diagram of "Set Tool Radius" System, FIG. 16 shows a block diagram of "Set Tool Radius" Circuits, FIGS. 17a to 17d show a block diagram of "Straight Cut" System, FIG. 18 shows a block diagram of L Pulse Generator and Slowing Logic Circuits, FIG. 19 shows a block diagram of "Straight Cut" Circuits, FIG. 20 shows a block diagram of "Radius Commands" System, FIG. 21 shows a block diagram of "Radius Commands" Circiuts, FIG. 22 shows a block diagram of clockwise and anticlockwise Rotation System, FIG. 23 shows a block diagram of BCDRM and also showing fixed outputs for the fractional multiplier, FIG. 24a shows a block diagram of the "X" Fractional Multiplier, FIG. 24b shows a block diagram of the "Y" Fractional Multiplier, FIGS. 25a and 25b shows a block diagram of X and Y Sign Circuits, FIG. 26a shows a block diagram of clockwise and anticlockwise Rotation Circuits, FIG. 26b gives the conditions for add and subtract levels of the two sine/cosine registers, FIG. 27 shows a block diagram of Reversible Counter Input Circuits, FIG. 28 shows a block diagram of Reversible Counter Circuits, FIG. 29a shows a block diagram of the Servo System, FIG. 29b shows the D.C. characteristic of the Servo System, FIG. 30 shows a block diagram of Direction Sense Circuits, FIG. 31 shows a block diagram of a one third section of either a sine or cosine register and its associated tail, FIG. 32 shows block diagram of $\theta$ and $\pi/2$ Recognition Circuits, FIG. 33a shows a block diagram of Quadrant Counter, FIG. 33b and FIG. 33c relate to the initial setting of the sine and cosine registers, FIG. 34 shows a block diagram of Reading Demand and Command Interrogate Circuits, and FIG. 35 shows a block diagram of Complete System.

At this place it is appropriate to note the meaning of the following Boolean expressions which occur on the drawings.

$$A+B=A \text{ or } B$$

$$A \cdot B = A \text{ and } B$$

$$\overline{A} = \text{not } A$$

$$A(B+C) = A \text{ and } B \text{ or } C$$

THEORY

Figure 1:
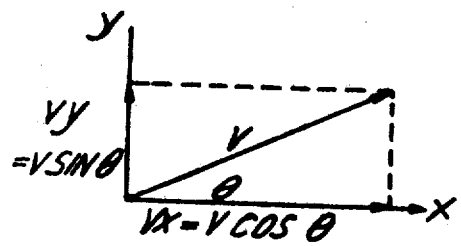
FIG. 1 shows the components of resolution of a velocity V at an angle $\theta$ to the X axis of X and Y cartesian axes.

Consider movement of the workpiece in relation to a cutting tool (or vice versa) at a velocity V. This velocity can be resolved along perpendicular X and Y cartesian axes. Thus if the direction of movement is at an angle $\theta$ to the X axis the two mutually perpendicular components of velocity are (as reference to FIG. 1 will show)

$$V_X = V \cos \theta \quad (1)$$

$$V_Y = V \sin \theta \quad (2)$$

Now if the workpiece is to be moved in a straight line with respect to the tool at a velocity V making an angle $\theta$ with an arbitrary X axis this could be achieved by simultaneously driving the workpiece table in the X direction at a velocity $V_X = V \cos \theta$ and in a Y direction at a velocity $V_Y = V \sin \theta$. The motion would be stopped after a period when the desired length of cut had been made.

It is necessary to select an analogue of velocity which is an electrical quantity able to be electrically manipulated. The analogue chosen is the frequency $f$ of a series of electrical pulses.

Thus $$V = K_1 f \quad (3)$$

where $K_1$ is a constant having the dimensions of length.

The number of pulses will control the length of cut and we can arrange things so that the cut stops after a certain number of pulses has been generated. It is, of course, easier to count an actual number of pulses to determine path length than it is to generate pulses for a certain time interval as in the latter case the pulse generator would need to be very stable in frequency.

It is convenient to have a maximum cutting velocity V of about one-tenth inch per second. As mentioned $K_1$ has the dimensions of length and as its value determines the smallest increment of motion (corresponding to one pulse) it is desirable to select $K_1$ as $0.00025''$. This then necessitates (by substitution in Equation 3 that the maximum pulse frequency which is to be converted into movement of the workpiece table be 400 p./s. Alteration of the pulse frequency alters the cutting velocity and it will be explained later how the operator is able to manually control frequency independently of the programme.

Now the great majority of profiles which are to be machined are composed of portions of circular arc and straight line portions. Any other profile such as an elliptical profile can be approximated by combinations of arcs and straight lines although in this case some computer calculations may have to be done to enable the machine to be programmed. However, these last mentioned cases are so few in practice that they can be neglected for all purposes. We have seen the basic idea underlying movement control in a straight line and it remains to consider control when the relative motion between tool and workpiece is circular.

Figure 2:
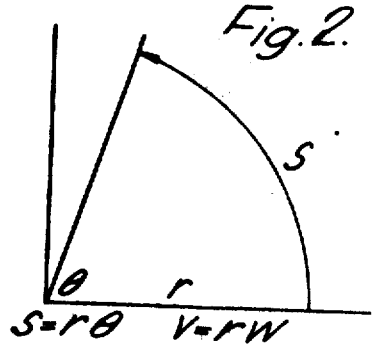
FIG. 2 shows the inter-relations between V, the radius of arc $r$, are length S, angle of arc $\theta$ and angular velocity $\omega$.

Now $$V = r\omega \quad (4)$$

where $r$ is the radius of the cut FIG. 2 and $\omega$ the angular velocity of the cut, i.e.

$$\omega = d\theta/dt \quad (5)$$

Now if the analogue of $\omega$ is also a pulse frequency $f_0$ we have $$\omega = K_2 f_0 \quad (6)$$

where $K_2$ is a constant having the dimensions of radians.

Thus from Equation 4

$$r = V/\omega$$

and therefore $$r = K_1 f / K_2 f_0 \quad (7)$$

Now if the pulse frequency $f_0$ is equal to $f$ a very desirable result is obtained:

$$r = K_1/K_2 \quad (8)$$

and $r$ is independent of the cutting velocity. A similar effect could be obtained if say $f_0 = 2f$ but this would be an added complication as two generators would be needed locked together if $r$ was to be accurately controlled.

Now $K_2 = \omega/f$ radians per pulse from Equation 6 and for sufficient accuracy $K_2$ is chosen to be $2^{15}$, i.e., there needs to be $2^{15}$ pulses before an angle increment of 1 radian is obtained. The precise significance of the figure $2^{15}$ will become apparent when we consider how $\sin \theta$ and $\cos \theta$ are obtained and it will also then be realised that it is impracticable to alter $K_2$ once its value has been chosen. Therefore to cut arcs of varying radii $K_1$ must be varied from its value of 0.00025" which it has when straight lines are to be cut.

Now imagine that an initial cut is to be made on a workpiece and that cut is to be arcuate. The tangent to the arc at the starting point will make an angle $\theta$ say with the base line or X coordinate but as the arc is machined $\theta$ will change at a rate $\omega = d\theta/dt$. We have already seen that if the cutting velocity is V at an angle $\theta$ to the X axis we can achieve a cut in the desired direction by driving the table at a velocity $V_X = K_1 f \cos \theta$ and $V_Y = K_1 f \sin \theta$ and this also holds true for an arcuate cut which can be considered to be a number of short straight line cuts each at a slight angle to those adjacent. The difference is that $\theta$ is varying steadily (as $\omega = K_2 f$) and therefore $\cos \theta$ and $\sin \theta$ are steadily changing.

We therefore need some way of obtaining varying values of $\sin \theta$ and $\cos \theta$ and the method used will now be described.

From expressions of the type $$\sin (A+B) = \sin A \cos B + \cos A \sin B \qquad (9)$$

we can derive $$\sin(\theta + \Delta) = \sin \theta + \Delta \cos \theta \qquad (10)$$

$$\cos(\theta + \Delta) = \cos \theta - \Delta \sin \theta \qquad (11)$$

where $\Delta$ is a very small angle.

Now if we have two registers containing the values of $\sin \theta$ and $\cos \theta$ then $\sin (\theta + \Delta)$ can be obtained by adding $\Delta$ of the contents of the $\cos \theta$ register to the $\sin \theta$ register and so on.

Now for sufficient accuracy $\Delta$ is chosen to be equal to the value of $K_2$, i.e., $2^{15}$ radians.

BROAD OUTLINE OF CONTROL SYSTEM

Figure 3:
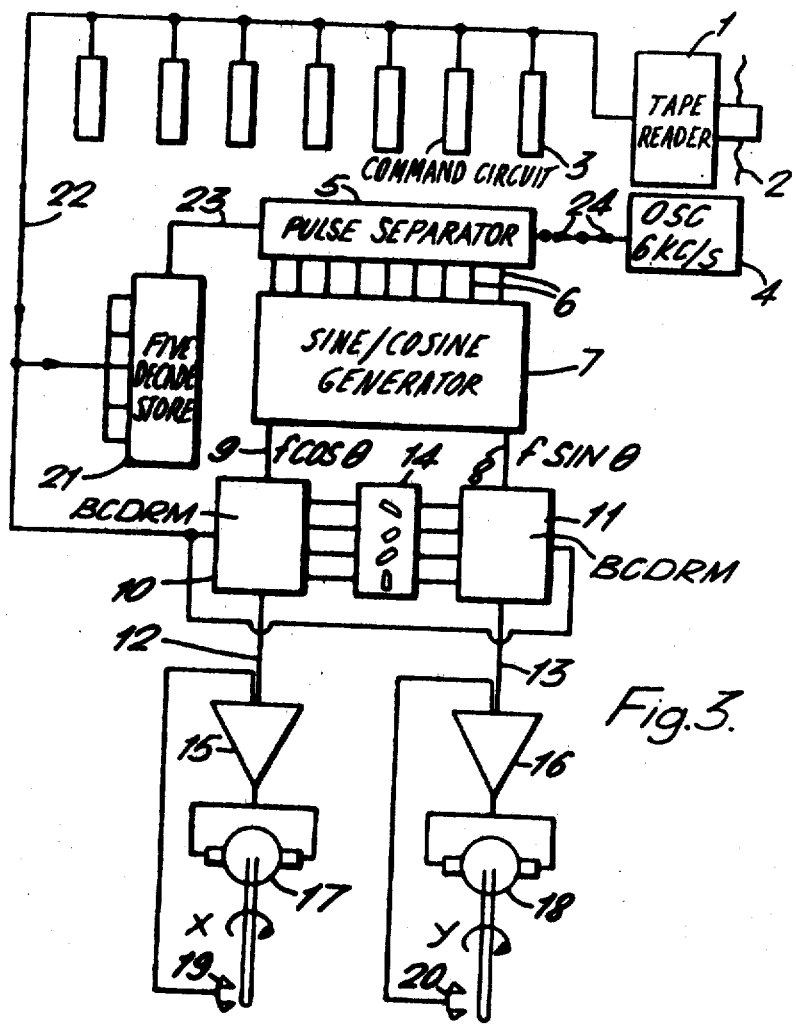
FIG. 3 shows in broad outline the most basic units in the control system apart from the frequency fractional multipliers.

Before going on to describe the sine/cosine generator it is appropriate to refer to FIG. 3 which is explanatory of the contents of paragraph two of this specification.

FIG. 3 shows a medium speed tape reader 1 which reads commands which have been typed in Algol or Elliott language on an 8 hole paper tape 2. One of seventeen command circuits 3 (of which only a few are shown) is able to be selected in accordance with the command read from the tape, and subsequent data read enables the selected command circuit to cause various modifications to the remaining circuitry in the system.

The output of an oscillator 4 having a maximum output of 6 kc./s. may be fed to a pulse separator 5 which has a number of outputs 6 on to which successive pulses from the generator are directed in sequence. Each output therefore has pulses appearing on it at a frequency $f$ and controls the state of circuitry within a sine/cosine generator 7 which produces two output pulse trains on leads 8 and 9, the frequencies being $f \sin \theta$ and $f \cos \theta$ where $\theta$ may be fixed or steadily variable. $\theta$ corresponds with the angle the cut must make with the X axis. For arcuate cuts the pulse trains on leads 8 and 9 are led to binary coded decimal rate multipliers (BCDRM's) 10 and 11, where the frequencies are further altered to enable variation of cutting radius. The BCDRM's 10 and 11 are each double units comprising manually and tape-set units. The tape-set units are set from instructions on tape 2 via a command circuit 3 and lead 22. The input frequencies on leads 8 and 9 are reduced by some fraction, constant for both leads, and appear on output leads 12 and 13 as further pulse trains. A series of switches 14 enables the operator also to set the manually controlled units of the BCDRM's 10 and 11 to produce another series of pulses on leads not shown, which are added to, or subtracted from, the pulse trains on leads 12 and 13, non coincidentally to cater for tool radius when external and internal radii are made.

When straight cuts are to be made the BCDRM's 10 and 11 are bypassed.

The two pulse trains on each lead 12 and 13 are fed into servo amplifiers 15 and 16 which control the velocity of rotation of motors 17 and 18 driving, via lead screws, the workpiece table (in the case of a milling machine) in the X and Y directions. Slotted discs (not shown) attached to the motor shafts actuate vane switched oscillators 19 and 20 which produce feedback pulse trains to the servos 15 and 16 to correct error between actual and demanded table positions.

A five decade store 21 counts pulses from the pulse separator 5 via a pulse divider (not shown) and lead 23, and is set to a desired state from the tape 2 via a command circuit 3 and lead 22 or from the BCDRM 10 in a manner later described. When the store 21 achieves a certain state the oscillator input to the pulse separator 5 is broken via switch 24.

The detailed operation of the system is described under the following headings listed in the order in which they appear.

(1) Sine/cosine generator
(2) Oscillators
(3) Binary Controlled Decimal Rate Multipliers and the Five Decade Store
(4) Servos
(5) Fractional multiplier
(6) Quadrant Counter
(7) Tape Reading Equipment
(8) Control System Details
(9) Manual Angle Command
(10) Auto Angle Command
(11) Set Tool Radium Command
(12) Straight Cut Command
(13) Radius Commands
(14) Clockwise and Anticlockwise Rotation Commands
(15) Further Command Circuits
(16) Further Details.

SINE/COSINE GENERATOR

The sine/cosine generator will be described in broad detail with reference to FIG. 4.

We have earlier seen that the maximum pulse frequency, $f$, which is to be converted via the servos and motors into velocity of the workpiece table is 400 p./s. for a desired maximum cutting speed and accuracy.

FIG. 4 shows a frequency of $15f$ (i.e., 6 kp./s.) supplied to the pulse separator 5 which has 15 output leads 6 and which has as indicated earlier, the property that if a train of 15 pulses is fed to the input they will emerge on 15 separate wires, the 16th pulse coming out on the first wire again and so on. Pulse separators are well known and their operation will not be described here. Before describing the uses to which these pulses are put it is necessary to describe in some detail the sine and cosine registers 25 and 26 and tails 27 and 28 shown in FIG. 4.

The sine and cosine registers 25 and 26 are 15-stage reversible binary counters, i.e., the least significant stage or bit in each register is capable of recording a value of 0 or 1, the next most significant bit a value of 0 or 2, the next a value of 0 or 4 and so on with the 15th stage recording a value of 0 or $2^{14}$. Thus the maximum number which can be recorded in a register is $2^{15} - 1$ as the $2^{15}$th pulse will cause a carry pulse from the 15th stage and will cause the whole register to reset to its zero state. The number recorded in each register is able to be decoded as explained later and is represented by the states of flip-flop circuits in each stage. Note that it is possible to substract numbers from each register as they are reversible.

The sine and cosine tails 27 and 28 are also 15 stage binary counters (not reversible as the errors introduced thereby are insignificant) so modified that to the binary numbers in any stage can be added another binary number with the consequent propagation of any carry pulses along the chain (i.e., to the left as shown in FIG. 4).

Let us consider the position where we wish to cut a straight line at an angle $\theta$ to the X axis. We have already seen that to achieve this the X velocity of the workpiece table $V_X$ must equal $K_1 f \cos \theta$ and $V_Y$ must equal $K_1 f \sin \theta$, from Equations 1, 2 and 3 and so we want two pulse trains from the sine/cosine generator. The one which will be used to control the X movement must have a frequency of $f \cos \theta$ and the other a frequency of $f \sin \theta$. When we convert these back to table velocities we will introduce the factor $K_1 = 0.00025''$ for a straight cut. These pulse trains are obtained as follows:

Assume a number corersponding to $\sin \theta$ and a number corresponding to $\cos \theta$ are already entered in their respective registers (we shall return to this point under other headings to discuss how this may be accomplished). The 1st pulse from the pulse separator 5 is made to do two things—it must cause the least significant number in the sine register 25 to be added to the least significant number in the cosine tail 28 and it must cause the least significant number in the cosine register 26 to be added to the least significant number in the sine tail 27. Any carry pulses in the tails carry through to the next most significant stages. The second pulse from the separator 5 emerges from the second pulse wire 6 and adds the second least significant number from a register into the second least significant number in the corresponding tail. Thus, after 15 pulses have emerged from the separator 5 the whole of the number in the sine register 25 has been added to the cosine tail 28 and similarly the whole of the number in the cosine register 26 has been added to the sine tail 27. Now when a tail is full an output pulse is produced from the 15th stage. Obviously if $\sin \theta = 1$ and thus the sine register is full with a count of $2^{15} - 1$ then after a train of 15 pulses has emerged from the separator 5 the cosine tail will be full and the 16th pulse from the separator must cause a carry pulse from the 15th stage of the cosine tail. But for $2^{15}$ cycles of the pulse separator there would be obtained only $2^{15} - 1$ pulses from the output of the cosine tail. This would represent an error of 1 part in $2^{15}$ of 0.001 inch in a cut length of 32 inches and is overcome by adding the carry pulses from the cosine tail back into the count input of its least significant stage and similarly for the sine tail. This, it may be shown, completely cancels the error but can only be done when $\theta$ is stationary if angular errors are not to be introduced, as will be apparent later. Thus the pulse train from the cosine tail would have a frequency one-fifteenth that of the oscillator input to the pulse separator when $\sin \theta = 1$. This then shows why the number of lines 6 from the pulse separator 5 is chosen to equal the number of stages in a register 25 or 26 and why the number of stages in a register is equal to that of a tail 27 or 28. The significance of choosing 15 as the number will be explained a little later when we consider how we achieve variation of $\theta$ with respect to time.

Now if $\sin \theta = 0$ there are never any additions made to the cosine tail 28 no matter how many pulses merge from the separator 5 and a little consideration will show that if $\sin \theta$ lies between 0 and 1 then carry pulses will emerge from the 15th stage of the cosine tail on lead 8 at a frequency $f_c = f \sin \theta$ where $15f$ is the oscillator frequency. Similarly the output of the sine tail on lead 9 is $f_s = f \cos \theta$.

We thus have obtained our two pulse trains which may be used to control table motion to effect a straight cut. Now obviously $f_c$ and $f_s$ can both be varied by varying $f$ and this facility enables the operator to manually control the velocity of cutting from Equation 3 without altering the direction or length of cut. Means to be described later enable the operator to control the pulse frequency of oscillator 4 into the pulse separator 5 from the normal maximum of 6 kp./s. to a lesser number.

Let us now consider how we achieve a circular cut and how Equations 10 and 11 are implemented. Assume that the sine register 25 is initially empty. The circuits are arranged so that the cosine register 26 would be full as in this case $\theta$ would be 0° (or 180°). If now the output from the cosine register 26 is added to the sine tail 27 a pulse from the sine tail will be produced on the 16th pulse from the separator 5 but the pulse from the tail 27 is now directed via switch 29 to the least significant stage in the sine register 25 which thus records an increment in $\theta$. These increments are actually $2^{15}$ radians. The next train of pulses issuing from the separator causes the number now in the sine register 25 to be added by adders 31 to the number in the cosine tail 28. A carry pulse may thus go from the cosine tail and is directed by switch 30 to the cosine register 26 where it is subtracted from the number in that register. Now carry pulses from the most significant stage in the tails have to pass through 15 binary stages before they reach the most significant stage in the corresponding register and so also for the other stages, i.e., the pulses from a stage in the tail are divided by $2^{15}$ before they reach the equivalent place on the register and thus we are continually adding (or subtracting) $2^{15}$ (which equals $\Delta$ or $K_2$) of the contents of one register to the contents of the other and the contents of each register are continually added to the contents of the corresponding tail. We have fulfilled the requirements of Equations 10 and 11. Now $\Delta = K_2$ was chosen to be $2^{15}$ radians for the desired accuracy of cut as mathematical analysis shows that the error in this method of generation is $\pm \Delta$ and this is why we have selected 15 stages in each register and so on. It will now also be apparent why we do not alter $K_2$ to vary the radius of arcuate cut. It will also be apparent that addition or subtraction of the increments from the registers must depend on the quadrant in which $\theta$ lies.

It can be seen that by this means the value of sine and cosine $\theta$ stored in the registers is steadily changed and of course the frequency of the carry pulses from say the sine tail $f_S = f \cos \theta$ as it did before when $\theta$ did not change only now $f_S$ changes as $\theta$ changes. These pulses may be used to control X movement of the workpiece table as well as the contents of the sine register. As we have previously shown the result of changing $\theta$ at a constant rate (and the rate is constant as $\omega = d\theta/dt = f/2\ 15$ and $f$ is constant) is to cause the cut to be arcuate. Now we can control the length of the arcuate cut very simply just as we are able to control the length of a straight cut by, in effect, counting the number of pulses from one of the lines 6 of the pulse separator 5 but this will be discussed later in detail.

We will also discuss under other headings how the radius of cut is set. A more detailed block diagram of a one-third section of a sine or cosine register and tail is shown in FIG. 31. The symbols used are explained in FIG. 12. The circuitry within dotted lines on FIG. 31 is omitted on the two least significant stages. FIG. 31 is explained together with FIGS. 32 and 33 under the heading "Further Details."

OSCILLATORS

There are two oscillators. These are shown on FIG. 35 the block diagram for the complete system. One produces a frequency of 60 kp./s. and is used solely for setting the numbers sine and cosine $\theta$ into the sine and cosine registers as will be discussed under later headings. When discussing FIG. 3 previously we have assumed that we had a 6 kilocycle per second oscillator 4. However, in practice it is more convenient to have as a second oscillator one of 6 kp./s. from which we can select frequencies which are fractions of the output before applying them to the pulse separator. The necessity for this arises when we are machining arcs of small radius because necessarily $\omega$ is a constant and therefore from the relation $V = r\omega$ we see that where $r$ is very small the cutting velocity V is very small. This is overcome by using another Binary Coded Decimal Rate Multiplier which is called the Fast Corner BCDRM. The output frequency from this BCDRM which is supplied from the 60 kilocycle per second oscillator is determined by Fast Corner logic circuits as will be described later which make allowances for the radius. As has been previously explained the function of a BCDRM is to allow a frequency output to be obtained which is a fraction of the frequency input. A detailed explanation of the functioning of a BCDRM is given under the heading Binary Coded Decimal Rate Multipliers. When the radius is small a higher frequency output comes from the Fast Corner BCDRM. The Fast Corner BCDRM is, of course, operative in such a manner only when arcuate cuts are being made. When straight cuts are being made its output is one-tenth of the input or 6 kilo pulses per second, and this pulse train forms the input of another BCDRM called the Machine Rate BCDRM. Neither the fast corner BCDRM nor the machine rate BCDRM is shown in FIG. 3 but they and the oscillators will be discussed under headings dealing with the various commands.

By means of various switches the machine operator is able to vary the setting of the machine rate BCDRM at any time to control the cutting velocity in speeds having ratios 0.9, 0.5, 0.3 and zero of the maximum and there are also circuits, associated with the Machine Rate BCDRM which ensure automatically that the start and finish of a cut are made at a slower rate. The output frequency of the Machine Rate BCDRM, which is determined by the operator and also by the slowing circuits, is applied to the pulse separator.

BINARY CODED DECIMAL RATE MULTIPLIERS AND THE FIVE DECADE STORE

Binary Code Decimal Rate Multipliers (BCDRM's) are well known devices (see for example, G. A. Clark and C. A. Lang, Electronic Engineering, vol. 35, No. 428, p. 670). The rate multipliers will therefore be described only briefly with reference to FIGS. 5 and 7. For the notation used in FIG. 5 refer to FIG. 12.

In a rate multiplier the input signal 32, comprising a pulse train, is fed to a chain of binary stage dividers 33. From the alternate outputs 34–37 of each stage in the chain, that is, the output not coupled to the succeeding stage, a pulse train is derivable which is non-coincident with any other train taken from an alternate output in the chain. These pulses may be simply combined in an "or" gate 38 to give a pulse train on output lead 39 that has an average frequency which is a fraction of the input. In one decade of a binary coded decimal rate multiplier these are four non-coincident pulse trains available with average frequencies that are 0.4, 0.2, 0.2 and 0.1 of the input frequency and these appear after differentiation of the voltage levels on leads 37, 36, 35 and 34 respectively. These pulse trains may be selected by switches 40 and gates and then combined to give any frequency from 0.1 to 0.9 of the input.

Figure 7:
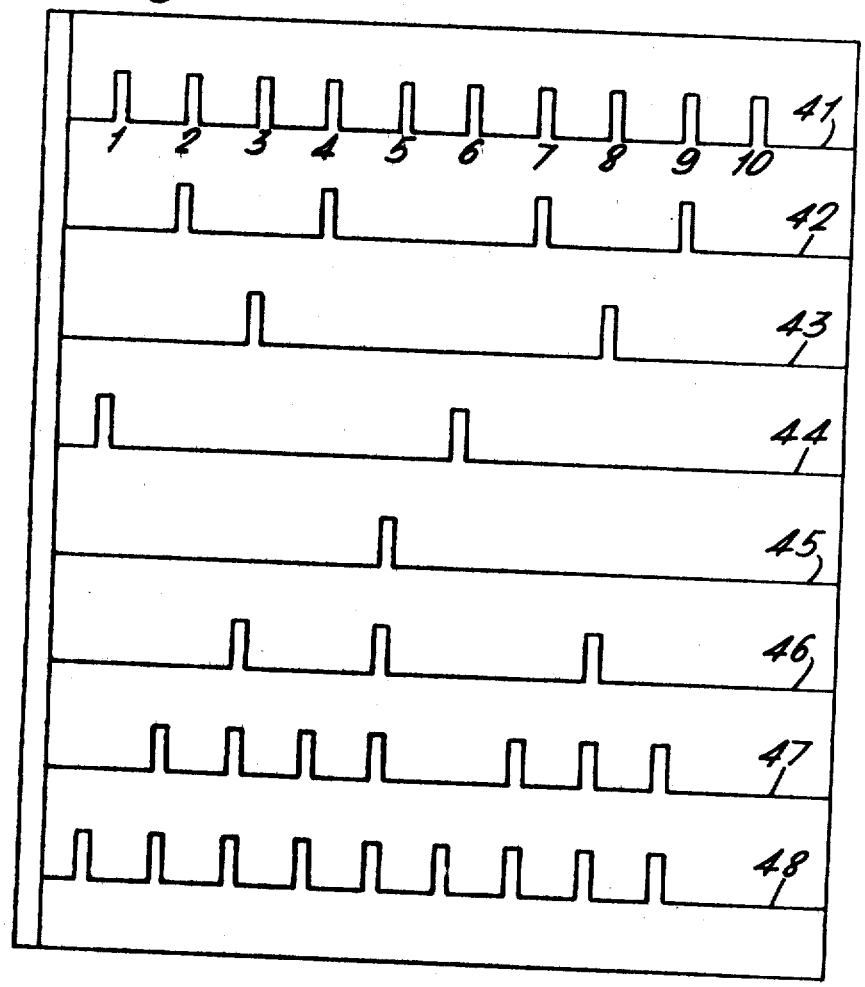
FIG. 7 shows some possible pulse outputs from the BCDRM shown in FIG. 4, FIG. 8 explains the effect of the command "manual angle,"

To further illustrate the operation of a BCDRM see FIG. 7. Graph 41 illustrates an input pulse train of 10 pulses and frequency $f$ say applied on lead 32 to a BCDRM. Graph 42 shows the pulse train of frequency $0.4f$ derivable from lead 37, Graph 43 shows the pulse train of frequenfy $0.2f$ derivable from lead 36. Graph 44 shows the pulse train of frequency $0.2f$ derivable from lead 35, and Graph 45 shows the pulse train of frequency $0.1f$ derivable from lead 34. Graph 46 shows the result of combining the outputs from leads 36 and 34, and shows a train of frequency $0.3f$. Graph 47 shows the result of combining the outputs from leads 37, 36 and 34 to give a train of frequency $0.7f$, and Graph 48 shows the result of combining all the outputs from leads 34, 35, 36 and 37 to get a pulse train of frequency $0.9f$. By cascading four BCDRM's as is done in the machine here described to obtain a unit of the X or Y BCDRM's or 11 there can be obtained any fraction between 0.0001 and 0.9999 of the input frequency in 0.0001 steps. The output pulse frequency of one decade on lead 49 is actually one tenth of the input frequency on lead 32 of that decade and is connected to the input lead 32 of the next decade and so on. It is important to realise that each of the BCDRM's 10 and 11 shown in FIG. 3 comprises two four decade units as mentioned above, one of which is instructed automatically from the tape and one of which is instructed manually in each case.

At this stage we will only outline the broad functions of the BCDRM's 10 and 11 as their detailed functions will become more apparent in discussions under the sub-headings dealing with each of the seventeen commands.

Note that the BCDRM's are not used when a straight cut is being made, that is, the output pulse trains $f_c$ and $f_s$ do not pass through the BCDRM's but they do when a circle is to be cut and their function then is to produce an alteration of the factor $K_1$. Thus the setting of the BCDRM's 10 and 11 determines the radius of cut.

The pulse trains $f_c$ and $f_s$ are able to be passed simultaneously through both the manually and tape controlled units of each BCDRM 10 or 11. When they pass through the tape controlled unit the output frequency is altered in accordance with the desired alteration of $K_1$ thus enabling the radius of the cut to be altered. When the pulse trains pass through the manually set units of the BCDRM's the frequencies are able to be altered to cope with the fact that the cutting tool has a finite radius. Ultimately the "tool radius pulse trains" are either added to or subtracted from the "cut radius pulse trains" depending on whether an external or internal cut is being made but this will be described in more detail later.

Now the BCDRM 10 which relates to the "X" direction is also used when it is wished to set the value of $\theta$ in the sine or cosine registers. We know that we need $2^{15}$ pulses from an output 6 of the pulse separator 5 if we are to increase the angle $\theta$ by one radian. This then requires that we have $15 \times 2^{15}$ pulses to the input of the pulse separator. In order to achieve a sufficiently high rate of the variation of $\theta$ the high frequency oscillator of 60 kilocycles per second is used as has been mentioned. In order to simplify the programming of the angle $\theta$ this high input frequency is not fed directly into the pulse separator, but instead is fed into the "X" BCDRM, the particular unit of the "X" BCDRM depending on whether the instructions to set the angle $\theta$ comes from the tape or from manual commands initiated by the machine operator, as will be discussed fully under the heading "Manual Angle."

The high freqeuncy of 60 kilocycles per second is fed into an appropriate unit of the BCDRM and it is arranged that these pulses are counted by the five decade store 21. However, the arrangement is such that only 1,000 pulses are counted into the five decade store 21 for every 10,000 pulses put into the BCDRM. It is appropriate now to describe the functions of the store in a litle more detail. This type of store is well known and will not be described. A number which is required to be counted by the store is turned by a decoding matrix into the nine's complement of that number before it entered into the store because it is arranged that the store will indicate that that number of pulses has been produced when its count reaches 99,999. The reason for doing this is that it is easier to make a five decade store to count in a forward direction than one to count in the reverse direction. When the count of 99,999 is reached it is recognised by a circuit which terminates the production of pulses which are being counted. We now return to the use of the store when $\theta$ is set into the register 25 and 26. Because $$\frac{\pi}{2} \times 2^{15}$$

pulses are required at an output 6 of the pulse separator 5 to give an increment of $\theta$ of 90°, then $$15 \times \frac{\pi}{2} \times 2^{15}$$

pulses are required at the input of the pulse separator five. Now if we arrange things so that when either the auto or manual unit of the X BCDRM 10 is set to 90.00° we obtain 9,000 pulses out, for every 10,000 in, then we will require $$\frac{10,000}{9,000} \times \frac{15\pi}{2} \times 2^{15}$$

pulses into the BCDRM before $\theta$ is changed by 90°. This number comes to 857,860 (6 being the least significant figure) and seeing that we are counting 1/1000 of this number of input pulses into the store then we will require, if $\theta$ is to be changed by 90°, to set the store to 14,213 (99999−85786) so that when 85,786 pulses have been counted the store terminates the input from the high frequency oscillator to the BCDRM. Now if we want to set $\theta$ to an angle other than 90° then all we need do is select combinations of other outputs of the BCDRM's so that instead of getting 9,000 pulses out for every 10,000 in, we get 3,000 out for an angle of 30° or 4,500 out for an angle of 45° and so on. It will be appreciated that what is being done is to supply a fixed number of input pulses to the BCDRM every time an angle is required to be set into the register. This number (857,860) is actually the number of pulses required to be fed into the input of the pulse separator to get a change of $\theta$ of 100° and to get any other angle we simply take a suitable proportion of this pulse number for application to the pulse counter input. This overcomes the problem of having to do a separate calculation or look up tables of the number of pulses to be counted every time an angle is set into the system. The maximum angle which can be set into the register by this means is of course 99.99°. It is important to realise that circuit conditions described above only apply when we are setting up $\theta$ in the registers and do not apply where we are using the store to determine the length of an arc $s$ (or its angle $\theta$ by the relationship $s = r\theta$). This will be discussed later.

We will now describe how the store is used to determine the length of a straight cut.

From Equation 3 we have seen that $V = K_1 f$ and that therefore for every pulse on an output lead 6 of the pulse separator where a straight cut is being machined, the table will be moved 0.00025 inch. If we count every fourth pulse than the count will represent the distance the table has been moved in terms of 0.001 in. As has been previously described the store will terminate a process when it reaches its 99999 condition, and therefore we programme on tape the length of cut in terms of one-thousandths of an inch and set this number as the 9's complement into the store and arrange a times 4 divider so that we only count every fourth pulse from an output lead 6 into the store. The store is arranged to terminate the input into the pulse separator when it reaches its 99999 condition and this will ensure that the length of cut is terminated according to the programme. Of course if the drawings to be programmed were always dimensioned in centimeters it would be desirable to change $K_1$ from 0.00025 in. per pulse to say 0.0005 cm. per pulse and count every second pulse, the programming being done in increments of 0.001 cm. When the store is used to determine the length of arc, $s$, of an arcuate cut a calculation must be made. If the angle of the arc $\theta$ then the number which must be punched on tape is $$\frac{\theta}{90} \times \pi \times 2^{12}$$

as will be explained later when the frequency fractional multiplier is described.

A more detailed block diagram of the X and Y BCDRM is shown in FIG. 23 which illustrates in particular the auto and manual units of each BCDRM, the reference numerals to the manual unit including a superscript (1). In FIG. 23 the setting and re-setting of the auto unit flip flops 33 is done via leads 50 and 51.

SERVOS

Figure 6:
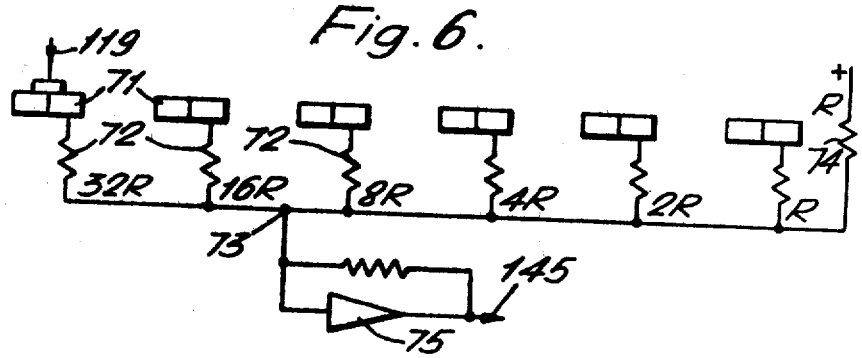
FIG. 6 shows in broad outline a reversible counter and digital to analogue converter.

From each BCDRM 10 or 11 there are two pulse trains representing the "cut" radius and the "tool" radius, these are taken to the servo input circuits. When a straight cut is being made, the BCDRM's are bypassed, and there are only two pulse trains from the sine or cosine generator and these are fed to the servos 15 and 16. Another input to each servo comes from the digital tachometer. This is a toothed wheel mounted on the servo-motor shaft. The teeth enter the aperture of a vane switched oscillator (VSO) producing at its output a pulse train with a frequency which is proportional to the shaft speed. To enable the direction of rotation to be determined two VSO's are used on each toothed wheel spaced at one quarter of a tooth pitch. These three input pulse trains, cut radius tool radius, and digital tachometer are applied to the add and the subtract inputs of a reversible counter in a combination which is determined by (a) the quadrant the machine is working in, (b) whether the circular segment, if one is being cut, has an internal or an external radius and (c) whether the table motion is positive or negative. The reversible counter which is of a well known type (see FIG. 6) is used to turn the digital signals, with which the control circuits have worked, into pulsating direct current, which after power amplification, is suitable for controlling the servo motors. The counter is reversible binary counter of six stages 71 (interconnections not shown) with a maximum count of 63 ($2^6-1$). A digital to analogue convertor consisting of 6 resistors 72 with values arranged in a binary sequency is connected to the output lead of each stage 71. One end of the resistors is common and is taken to a low impedance summing point 73. As the count in the counter increases so does the current into the summing point. An offset current is also supplied to the point 73 via resistance 74 and this is arranged to be equal in magnitude and of the opposite sign to the current from the counter, when in counting state 31. In this manner a servo input current is obtained whose magnitude and sign depend on the departure of the count, in magnitude and sign, from the count of 31. The servo amplifiers 15 and 16 ensure that the speed and the direction of the motors 17 and 18 follow this current in such a manner as to return the count to 31. The amplifier 75 ensures that the point 73 is a virtual earth.

Special low inertia 1/8 H.P. D.C. servo motors 17 and 18 are used to drive the machine table. These are each powered by two 3-phase controlled rectifiers working back to back to give a fully reversing drive. The Silicon Controlled Rectifier trigger circuits are of a well known type. The parameters of these circuits are chosen so as to ensure that they will contribute less than one bit of error to the system. Acceleration feedback, derived from a D.C. tachometer also coupled to each motor shaft is used to stabilise the servos. A more detailed block diagram of the reversible counter is shown in FIG. 28. FIG. 27 shows the various inputs to the counter, FIG. 29a gives a block diagram of the servo system, and FIG. 29b shows its D.C. characteristics. FIG. 30 shows the direction sensing circuits. Further discussion of these figures is under the heading "Further Details."

FRACTIONAL MULTIPLIERS

The purpose of the fractional multiplier circuits of which there are two, designated X and Y fractional multipliers, is to increase the pulse rate at the input to the BCDRM's 10 and 11 to enable easy programming and manual setting of the radius of cut and tool radius on the BCDRM's. When a circular path is being cut the two pulse trains $f_s$ and $f_c$ are thus multiplied by some fraction in the Rate Multiplier to increase the input frequencies to the BCDRM's. The radius to be cut expressed as a four figure number in thousandths of an inch is set into the auto units of the BCDRM's from the tape and allowance is made for tool radius by an operator who sets tool radius into the manual units of the BCDRM's on four decade switches in thousandths of an inch. Now we have already seen that to achieve an angle increment of 1 radian during an arcuate cut $2^{15}$ pulses must appear on an output lead 6 of the pulse separator. From Equation 8 we have $r=K_1/K_2$ and $K_2=2^{-15}$. We also know that $K_1$ can have a maximum value of 0.00025 inch per pulse when a straight line is being cut. This would give a maximum value for $r$ of approximately 8.192 inches taking into account that there is an error due to the fact that the capacity of a register 25 or 26 is only $2^{-15}-1$. Now what we desire is to be able to set the BCDRM's to 9999 or some other four figure number and to have this figure as the actual radius of the cut, in thousandths of an inch. Taking our value of $K_1$ as 0.00025'' as before, we see from FIG. 2 that for a radius of 10 inches and an arc of included angle 1 radian that 40,000 pulses are required from an output lead 6 of the pulse separator for this arc length to be cut. This then is the input rate to the BCDRM which we require for a radius of 10 in., but we have only got the number 32,767 (this figure taking into account the error mentioned above and being approximately $2^{15}$). The discrepancy which we are short expressed as a fraction of 40,000 is 0.180825. The fractional multiplier produces this fraction of the input pulses, delays them in time to be non-coincident with the original input pulses, and adds them to the original pulse stream so that the number of pulses into each BCDRM is brought up to 40,000 for a radius of 10 inches. This feature allows simple binary arithmetic to be used with the sine/cosine generator and allows four quadrant operation to be achieved with the minimum of complexity.

FIG. 23 shows how a fraction 0.180825 of an input frequency $f_x$ (which may be either $f_c$ or $f_s$) is obtained from various flip flop outputs of the BCDRM's. The 0.0001 $f_x$ output is further divided by four to yield 0.000025 $f_x$. All the outputs are combined in an "and" gate and emerge on leads 81 or 82 for X and Y BCDRM's respectively. The X and Y fractional multipliers are shown on block diagrams 24a and 24b respectively. Dealing firstly with the Y multiplier shown in FIG. 24b, the pulse train of frequency 0.180825 $f_s$ on lead 82 is amplified in amplifier 83, delayed by 120 microseconds in time delay multivibrator 84, differentiated at 85, amplified again by amplifier 86 and passed through an "or" gate 87 into the input lead 9 of the Y BCDRM 11 (FIG. 3). The same thing happens with the X fractional multiplier shown in FIG. 24a. The input frequency of lead 81 is 0.180825 $f_c$. This is amplified, delayed for 120 microseconds and differentiated by circuits 88, 89 and 90 respectively. However, after being differentiated the pulse train passes through "and" gate 91 which enables the X fractional multiplier to be inhibited when the X BCDRM 10 is used for setting $\theta$ into the registers as has been earlier explained. If the train passes through the gate 91 it is amplified by amplifier 92 and added to the input lead 8 of the BCDRM 10 via "or" gate 93.

QUADRANT COUNTER

This system is operable in all four quadrants and a 2-stage reversible binary counter is used as a quadrant counter. The value recorded in the quadrant counter determines the initial value recorded, for example, in a sine or cosine register 25 or 26 as either 0 or 1. The full operation of the quadrant counter will be apparent as the various commands are discussed, and it is also discussed later under the heading "Further Details" with reference to FIGS. 32 and 33.

TAPE READING EQUIPMENT AND COMMAND SYSTEM

The tape reader which accepts 8-hole tape is a standard mechanical reader in which holes in the tape are sensed by feeler pins. It will be appreciated that various combinations of the presence or absence of holes can represent numbers; in fact four of the eight levels may be used to represent the numbers 0 to 9. Similarly various code letters can be represented by various combinations of the presence or absence of holes and each command, of which there are seventeen, is designated by a particular code letter from the seventeen letters $a$ to $q$. These commands are in the form of instructions such as "straight cut," "internal radius," etc. When a particular command has been received this is indicated by the lighting of a lamp on a control panel facing the operator. In cases where operator action is required, as for instance, when he has to set the tool radius, this is indicated by a labelled, red lamp. These lamps have pushbuttons associated with them and after the operator has taken the relevant action he presses the button the lamp is extinguished and the control sequence can be resumed; otherwise the lamp is white. When certain commands are received such as the two mentioned above, the tape reader is instructed to take a further five readings. In these tape locations it will read the numerical information which gives, in these two cases, the length of the cut and the radius respectively. When a pin of the tape reader enters a hole it makes an electrical contact and this sets a memory flip flop to its "1" condition. There are eight flip flops both outputs of which drive buffer amplifiers. Tape commands and numerical information are presented on the 16 output wires from these amplifiers as voltage levels. Selected levels are permanently wired to the command recognition circuits of the 17 tape command circuits 3. The 8 wires required to define numerical information are permanently wired to two decoding matrices. Unlike some other systems of numerical control there are no buffer stores into which the tape information is read. Instead readings are taken as required and the information directed to its correct location. Reading demands originate in the reading demand and command interrogate pulse generator circuits, see FIG. 34. These circuits provide timed demand signals to the tape reader circuits and also generate the command interrogate pulses which go to all the command circuits. Reading demands may be initiated from fourteen different sources and as a number of these can occur at random time they have to be brought into synchronism with the slow clock pulse generator which controls the timing of the reading demand generator. All the reading demand signals are presented to a 17 input "or" gate 181 (FIG. 34) the output of which is coupled to the D.C. set input of a memory flip flop 182. Pulses on lead 183 delayed by 3 milliseconds with respect to the main show clock pulse train are coupled to the A.C. reset input of the same flip flop. If in the 100 millisecond interval between two delayed slow clock pulses the memory flip flop receives a reading demand signal it will be set to its "1" condition. The arrival of the next delayed slow clock pulse will reset it to its "0" condition and from this transition the reading demand pulse on lead 184 is produced by differentiation and amplification. It is necessary to use delayed clock pulses to interrogate the flip flop because a number of the reading demand inputs are pulses from the "slow pulse separator" which derives its inputs from the "slow clock pulse" generator and time must be allowed for these pulses to set the memory flip flop before it is interrogated. The reading demand pulse on lead 184 also triggers a time delay multivibrator 188 with a delay period of 40 milliseconds. The transition which occurs at the output 189 of the delay multivibrator at the end of the 40 millisecond period is differentiated and amplified to become the command interrogate pulse on lead 190. This pulse, occurring 40 milliseconds after the reading demand pulse, interrogates all the recognition gates of the tape command circuits and if the tape reading was a command one of these circuits will then be energised. The 40 millisecond delay period is necessary to allow the tape reader to take a reading and for the reading to be stored in the memory flip flops of the tape reader circuits. A 9 input "and" gate 191 is also interrogated via lead 192 40 milliseconds after a reading demand pulse has occurred. The other 8 inputs 193 of this "and" gate are supplied by the "true" levels of the eight tape reader memory flip flops. If a complete row of 8 holes is sensed indicating that an error code has been punched an output on lead 194 is produced by this "and" gate. The output of the "and" gate is amplified and differentiated, and supplied as one input to the reading demand "or" gate 181. In this way an error code always demands a new tape reading. The amplified output of the "and" gate 191 is also used via lead 195 to inhibit the input to the slow pulse separator for one pulse interval thus ensuring that the levels of the error code are not steered to a matrix. When the next true input is received from the tape the pulse separator carries on from the position it had at the completion of the last true reading. The three milliseconds delay between the slow clock pulse and the delayed slow clock pulse also serves another purpose. When numerical information is being read from the tape it is the "slow clock pulses" which demand the tape readings and it is "gated slow clock pulses" which insert these readings into their location. If, for instance, numerical information is being read into the store of the machine then the z pulse from the slow pulse separator will demand the most significant reading but it is the pulse P $(i+m+n)$ which will direct that most significant reading to the most significant decade of the store. The delayed P pulse 3 milliseconds later will demand another tape reading to acquire the next most significant figure and when this occurs it cancels the previous reading held in the memory flip flops of the tape reader. Thus the information contained in the memory flip flops is used 97 milliseconds after it was demanded and 3 milliseconds before it is cancelled.

CONTROL SYSTEM DETAILS

The control system will now be described in sufficient detail to enable a complete understanding of its operation. Because the units of the control system can be interconnected in a variety of ways depending on the commands received from the input tape it is convenient to have several descriptions each one dealing with one pattern of interconnections. Because a particular pattern of interconnections is defined by a command signal received from the tape these separate descriptions will be headed by the title of that command. The block diagrams of the command system are all taken from FIG. 35 which shows a completely worded block diagram of the complete system, but only the parts relevant to a particular command are reproduced on the command system block diagrams, and these parts are not generally accompanied by descriptive wording.

MANUAL ANGLE COMMAND

Figure 8:
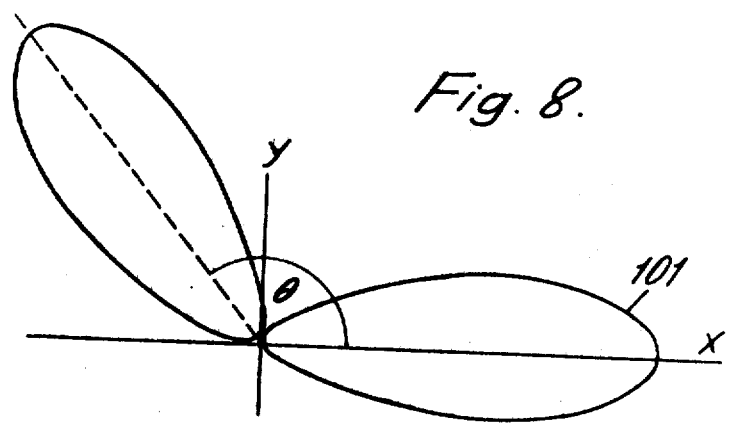

The facility provided by this command is, it is believed, unique in numerical control systems. Its use enables the machine operator to rotate the angular co-ordinates of a programme to any given angle. Reference to FIG. 8 will show what is meant by this statement.

Figure 9:
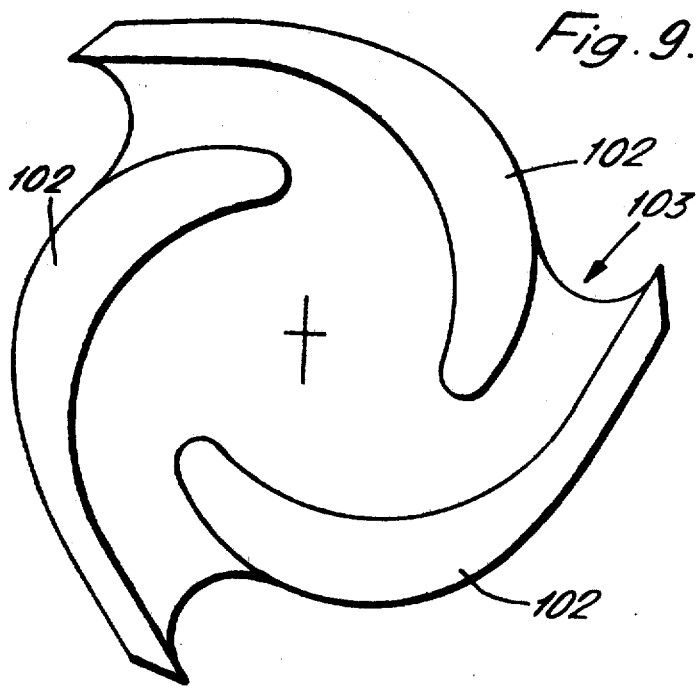
FIG. 9 shows an example where the manual angle facility is useful.
Figure 10B:
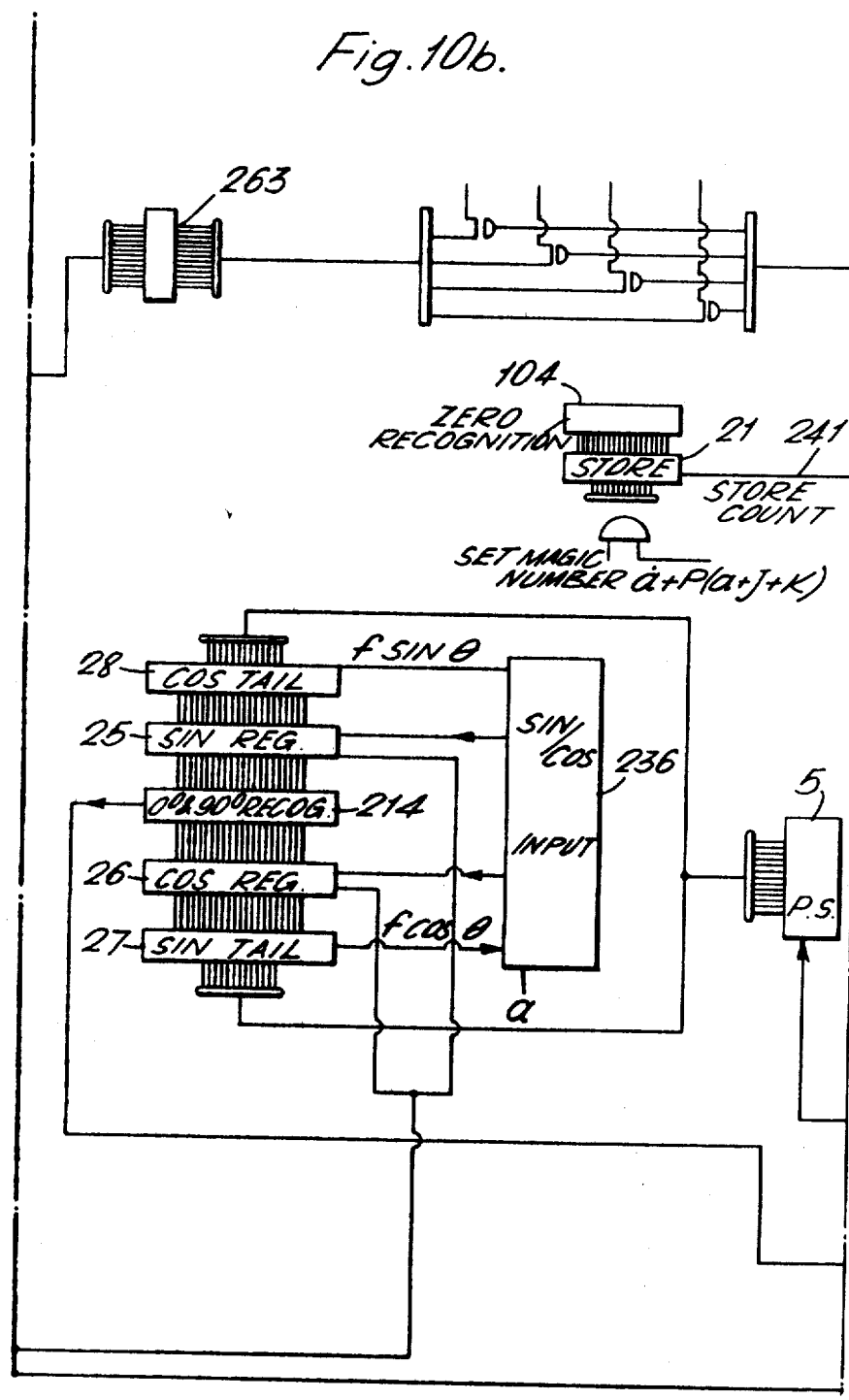
FIG. 10 shows a block diagram of "Manual Angle" System.

In FIG. 8 a symmetrical profile 101 has been programmed on tape so that its central axis will be the X axis. Suppose, however, for some reason that it is wished to make the central axis of this profile at an angle $\theta$ to the X axis. The manual angle facility enables the operator to adjust the initial conditions so that when the cut is started the profile is formed in the required direction. As an example of the application of this see FIG. 9 where there are three blades 102 on a pump impeller 103, all the blades being of the same profile but angularly displaced with respect to each other by 120°. By using the manual angle command the tape need only be prepared for the profile of one blade 102 and the operator can rotate the angular co-ordinates by 120° to enable the successive blades to be machined. The command is useful in particular if the workpiece cannot be secured to the machine table with its reference axis parallel to one of the table axes. This condition frequently occurs when the workpieces are castings. In such a case it might have been assumed when programming that an axis on the casting would be located parallel to the X axis of the machine table, but for some reason it is found that it is necessary to locate it at an angle of 30°. Provided that the command "manual angle" has been inserted on the tape programme then the operator is given the opportunity to make correction for this discrepancy in initial angle. The command manual angle is identified by the letter $a$ in this machine. By means which are well known in the Electronic Engineering profession and which have been briefly described this command is read from the tape and identified by electronic circuits which energise the manual angle command circuits. These circuits set up the paths shown in FIG. 10. Reference will be made to FIG. 10 and FIG. 11 in what follows.

Receipt of this command is indicated by 3 lamps as shown in FIG. 11, the white manual angle lamp 106, the red "quadrant" lamp 107 and the red "angle" lamp 108. The latter two show that operator action is required. The operator now sets the quadrant switch 109 (FIG. 10) to the desired position, that is, $$0, \frac{\pi}{2}, \pi, 3\frac{\pi}{2}$$

or no action. When this is done he pushes the "Enter Quadrant" button 110 and the "quadrant" lamp 107 is extinguished. A pulse is generated which interrogates the quadrant switch and sets the quadrant counter 111 to the value selected by the switch. If the switch was on the "no action" position the condition of the quadrant counter remains unaltered. The operator now sets the manual angle required, for instance, if the machine is to be set to 120° he would first have set $\pi/2$ on the quadrant switch 109 and now 30.00° on the manual angle switches 112 of the X BCDRM 10 (see FIG. 3). When this is done he pushes the "enter angle" button 113 and the "angle" lamp 108 is extinguished. The manual angle switches 112 control the operation of the manual section of the BCDRM 10. The setting of the switches indicates the fraction of the input pulses which will appear on the manual rate output line of the X BCDRM 10, as has been described. Thus if the switches are set to 5000, five thousand pulses will appear on the manual rate output for each ten thousand pulses delivered to the input of the BCDRM. When the operator presses his "enter angle" button 113 he changes a level K from flip flop K (FIG. 9) causing pulses at a nominal 60 kp./s. rate to enter the BCDRM 10. The oscillator 114 producing these runs at a constant rate and has been briefly described earlier. The pulses are denoted by the letters "$f_h$" for frequency high. The fraction of the input pulses, selected by the manual angle switch 112 emerges from the BCDRM 10 on the "manual rate" output line 129 and is directed by the levels a and M to the input of the pulse separator 5. The action of the pulse separator causes the value of $\theta$ to increase, as described under the heading sine/cosine generator, from the initial conditions set by the quadrant counter 111. Thus if the quadrant counter 111 was set to an angle $\pi/2$ the initial state of the sine register 25 would be "1" and that of the cosine register 26 "0." The value of $\theta$ will continue to increase so long as pulses are supplied to the BCDRM 10 input. The number of pulses supplied to the BCDRM is under the control of the 5 decade store 130. When the command "manual angle" was energised a particular number (14213) was set into the store. This number is now counted out of the store and when it returns to its empty, or 99,999 condition the flow of "$f_h$" pulses to the BCDRM 10 is interrupted and the values of sin $\theta$ and cos $\theta$ for the chosen value of $\theta$ remain constant.

We have previously described how the number referred to (14213) was ascertained. The decoding of the store 130 is so arranged that front panel meters facing the operator and indicating the count in the store show the number 85,786. When the store has counted to a count of 99,999 this is recognised by logic circuits 104 and a "store empty" pulse is generated this is called an L pulse and reverses the state of the flip flop K in the manual angle circuits via lead 105. This in turn interrupts the flow of $f_h$ pulses through to the input of the BCDRM 10. That the correct value of $\theta$ has been set into the sine/cosine generator may be verified from lamps on the sine and cosine registers. These read the values of sine and cosine in binary notation and are only used in servicing the equipment. The switching of flip flop K to the $\overline{K}$ condition switches flip flop M to the $\overline{M}$ condition. This transfers the input of the pulse separator 5 from the "manual rate" output of the BCDRM 10 to the "auto rate" output. This output is governed by the setting of the BCDRM registers which in turn are set up by a tape reading. The M to $\overline{M}$ transition also demands a five figure tape reading, the first four figures of which must contain the "tape angle" in degrees. The maximum angle which may be set is 99.99°. The fifth figure is not used and is normally a zero. This reading is decoded and steered to the BCDRM 10 register, which is now set up to contain the auto angle reading. The last reading pulse reverses the state of flip flop K setting it once more the state K. This opens the gate on the BCDRM input and allows $f_h$ pulses to flow again. The number 14,213 was also re-entered in the store 130 by one of the reading pulses $P(a+j+k)$ and the value of $\theta$ continues to increase until this number is counted from the store as before. The increase of $\theta$ is determined in this case by the number set in the BCDRM 10 "auto" register. When the store 130 has emptied an 1 pulse is generated. This stops the flow of $f_h$ pulses to the BCDRM 10 input. It also cancels the "manual angle" command and this in turn by means of gates returns the auto and manual rate outputs of the X BCDRM to the X reversible counter input. The 1 pulse also demands a fresh tape reading so enabling the next command to be acquired. The voltage levels $a$, $k$, $m$ which perform the necessary switching and gating actions for the command manual angle are generated by the manual angle circuits. A block diagram of these circuits which employ conventional electronic techniques is given in FIG. 11. This figure also shows the Boolean algebraic expressions which govern the setting of these levels.

AUTO ANGLE COMMAND

The comand auto angle is used when it is desired to change the angle set in the sine and cosine generator either initially when setting up the machine and before cutting is commenced, or at any time during a programme.

Five separate tape comands can energise the auto angle circuits (FIGS. 13 and 14). The command used depends on the quadrant angle to be set into the machine. In addition to the quadrant points $$0, \frac{\pi}{2}, \pi, \text{ and } \frac{3\pi}{2}$$

there is an additional command available, no quadrant action. These commands are identified by the letters $b$, $c$, $d$, $e$ and $o$ respectively, and when one of them is identified, the command interrogate pulse will set the quadrant counter 111 to the particular quadrant angle demanded, except of course in the case of command $o$. It also sets a memory flip flop "beta" 201 which lights the auto angle lamp 202. In addition, a pulse is returned via lead 203 to the "manual angle" command circuitry where it sets up the flip flops in a particular condition, namely, a $\overline{F}$ $\overline{B}$ $\overline{K}$ $\overline{M}$. These flip flops are then in the condition which they have at the completion of the insertion of a manual angle from the manual angle switches and before the tape angle reading is taken. As is the case when the manual angle command is used a 5 figure tape angle reading is now taken and the angle reading in degrees inserted in the register of the BCDRM 10. The setting of the five flip flops in the manual angle command circuitry ensures that the appropriate connections are made between the BCDRM 10, the sine/cosine generator, and the store 130. The computation of sin $\theta$ and cos $\theta$ now proceeds as before and is terminated when the store counts to its zero condition. This cancels the "manual angle" command which in turn cancels the "auto angle" command. Both the "manual angle" and the "auto angle" lamps 106 and 202 are extinguished and a new reading is demanded from the tape. The auto angle circuits are conventional and a block diagram of them is given in FIG. 14.

SET TOOL RADIUS COMMAND

The facility offered by this command, that of enabling the operator to set on the control console the exact radius of the tool which he is going to use, distinguishes this system of machine tool control from most other systems. This command is identified by the letter $f$ and is used to tell the operator by means of a red panel lamp 211 (FIG. 16) to set the radius of the cutter on the tool radius switches. This set of four switches 112 is the same as is used for setting in the "manual angle" and controls the manual rate outputs of the X and Y BCDRM's 10 and 11. The command is also used to make the necessary off-set of the tool to allow for its radius, $r$. When the switches have been set (any radius up to 9.999 inches can be accommodated), the operator presses the "tool radius" button 212, the red lamp 211 is extinguished, and the table of the machine is displaced at an angle $(90+\theta)$ to bring the axis of the tool a distance $r$ from its original position. $\theta$ is the angle initially sorted in the sine/cosine register. When this motion is completed the white "set tool radius" lamp 213 is extinguished and another tape reading demanded. The way in which this movement is effected will now be considered in some detail.

As stated above, the tool has to move at an angle $(90+\theta)$ and a distance equal to $r_o$, the radius set on the tool radius switches. It is thus necessary to change from an angle of $\theta$ to an angle $(90+\theta)$. This could have been done by advancing $\theta$ by 90° in the normal manner and then subtracting this again after the tool had been off-set. Instead, use is made of the identities sin $(90+\theta)=$ cos $\theta$ and cos $(90+\theta)=-$sin $\theta$. To do this it is necessary to interchange the two outputs of the sine/cosine generator, $f$ sin $\theta$ and $f$ cos $\theta$ on leads 8 and 9 so that $f$ sin $\theta$ now goes to the X servo and $f$ cos $\theta$ goes to the Y servo. In addition, the quadrant counter 111 is advanced by 1 count to make the signs of the X and Y displacements correct for any value of $\theta$. At the conclusion of the tool displacement the quadrant counter is stepped back one count. These actions are accomplished as follows. When the set tool radius command is received an $f$ level is used to inhibit the action of the 0° and 90° recognition circuits 214 which form part of the sine/cosine generator. A pulse from the $f$ level is used to step the quadrant counter 111 one by one. Thus if it was initially on quadrant 2 it will then be on quadrant 3. The $f$ and $\overline{f}$ levels are used to transpose the $f$ sin $\theta$ and $f$ cos $\theta$ leads in a system of gates. When the operator sets the radius on the tool radius switches, he sets up, by means of four extra banks on each switch, the nines complement of the number set on that switch, in the code used by the store counter 130. These levels are also inverted in unity gain amplifiers so that for each switch we now have 8 wires containing information on the number to be inserted into the store. These levels are passed to "and" gates where they are interrogated by a pulse termed "sigma" on lead 221, this pulse is derived from the sigma flip flop 215 when the operator presses the "set tool radius" button 212. The interrogated levels now enter the store 130 through "or" gates and set into the four least significant stages of the store 130, the nines complement of the number set on the tool radius switch 112. The level sigma on lead 222 also changes the state of the "eta" flip flop (FIG. 26) setting it to the clockwise state. This in turn ensures that the next pulse entering the quadrant counter 111 will subtract one count from the state of that counter. When the quadrant counter was advanced one count at the beginning of the $f$ command it ensured through the XY sign circuits (FIG. 25) that $f \sin \theta$ and $f \cos \theta$ would be entered into the X and Y reversible counter inputs, with the right sign. "Sigma" also sets the most significant decade of the store 130 to 9 and opens the gate which allows the 60 kp./s. train from the variable oscillator 216 to flow to the fast corner BCDRM 217 and hence to the machine rate BCDRM 218 through the fast corner logic circuits 219 via lead 218a (see FIGS. 15a and 15b). Because neither commands $m$ or $n$, which relate to clockwise and anticlockwise rotation are energised the fast corner logic is inoperative and only the carry signal from the fast corner BCDRM 217 is passed to the machine rate BCDRM 218. This means that the rate to this BCDRM is $\frac{1}{10}$ of 60 kp./s. or 6 kp./s. This rate may be modified in the machine rate BCDRM 218, by the machine rate switch 10a (FIGS. 10c and 10b) on the front panel, before being passed to the pulse separator input logic 220. The pulses are gated by the $\bar{a}$ level in this circuitry and go to the 15 stage pulse separator 5, which controls the action of the sine and cosine generator. Because the levels $a$, $m$ and $n$ are absent from the pulse separator input logic the value of $\theta$ remains stationary. The pulse trains $f \sin \theta$ and $f \cos \theta$ are interchanged by the $f$ level before they go to the reversible counter input logic. Because the "alpha" flip flop in the "straight cut" command circuits (FIG. 19) is set to 1 the pulse train $f \sin \theta$ and $f \cos \theta$ are selected and passed to the reversible counter inputs. From here they operate the servos in the manner previously described. The X and Y servos will offset the machine table at velocities $V_x$ and $V_y$ which are proportional to these rates $f \sin \theta$ and $f \cos \theta$. This process will continue while the complement of the tool radius, inserted into the store 130, is being counted out. The store is counted to the 99,999 condition by counting cycles of the 15 stage pulse separator 5 when making a straight cut as in $f$ or $i$. Each complete cycle of this pulse separator will produce a tool movement of 0.00025 in. As the number inserted in the store is in one thousandths of an inch it is necessary to divide the number of cycles of the 15 stage pulse separator by 4 by use of the divider 239 (FIG. 35) before they are counted. The divided pulse separator cycles are gated by a level $\bar{a}$ in the store input circuits and this directs them to the input of the store counter. When the store comes to its 99,999 condition and L pulse is generated, which cuts off the flow of pulses thus stopping the servo motors. It resets the $f$ flip flop and through a delayed gate it sets the "eta" flip flop 130 (FIG. 26b) to its 1 or anticlockwise state.

A pulse labelled $\bar{f}$ goes to the quadrant counter 111 and set it back 1 count. The inhibition due to the level $f$ is removed from the 0 and 90° recognition circuits, and the control system is back to its original condition with the exception that the tool is now displaced from its original position by an amount equal to the radius at an angle of (90+$\theta$) to the X axis. The $f$ command circuits use conventional techniques and a block diagram of them is given in FIG. 16. Also given are the Boolean algebraic expressions defining their operation.

STRAIGHT CUT COMMAND

The straight cut command, as its name implies, is used when it is desired to make a straight cut on the workpiece. The command, identified by the letter $i$, is invariably followed by a five figure tape reading giving the length of the cut in thousandths of an inch. The cut will be made at whatever angle is already set into the sine cosine generator. When this command is recognised by the straight cut command circuits the $i$ flip flop 231 (FIG. 19) is set to its 1 state which in turn sets the "alpha" flip flop 232a to state 1. The level "alpha" selects the pulse trains $f \sin \theta$ and $f \cos \theta$ in the reversible counter logic and routes them to the inputs of the reversible counters. The $i$ level also initiates one cycle of the slow pulse separator 232 (FIG. 17a) through the action of the gated 10 p./s. oscillator. The pulses from the slow pulse separator 232 demand a five figure tape reading and this is decoded into the nines complement store code in a conventional matrix 233. The outputs of this matrix are directed in "and" gates 234 by the pulses from the slow pulse separator, into the correct store decades which they reach by way of the "or" gates 235 which allow information from 4 sources to reach the store 130. The last pulse from the pulse separator 232 is selected by the level $i$ and opens a gate to allow the variable rate 60 kp./s. oscillator 216 to start. Starting at a low frequency and building up over a period of one second to its normal rate the oscillator delivers pulses to the "fast corner" BCDRM 217 and hence the "fast corner" logic circuits 219 and so to the machine rate BCDRM 218. Because commands $m$ and $n$ are not energised only the $\frac{1}{10}$ carry signal from the "fast corner" BCDRM 217 is passed to the machine rate BCDRM 218 and so the maximum rate at the input of BCDRM 218 is 6 kp./s. In the machine rate BCDRM 218 the operator is able to select, by means of the front panel "machine gate" switch, either 0.9, 0.5, 0.3, 0.1 or 0.0 of the input rate to this circuit. The selected rate now goes to the pulse separator input logic 220 and then through an "or" gate to the input of the 15 stage pulse separator 5. The pulses from the pulse separator perform the additional passes from sine register 25 to cosine tail 28 and from cosine register 26 to sine tail 27, but because the levels $a$, $m$ or $n$ are absent from the sine/cosine input logic 236 the quantities $f \sin \theta$ and $f \cos \theta$ are not added back into the corresponding registers so that the value of $\theta$ remains constant. However, the two pulse trains $f \sin \theta$ and $f \cos \theta$ are produced and are gated through the sine/cosine input logic 236 by the level $\bar{a}$. They are gated by the level $\bar{f}$ in the interchange gates 237 and then by the levels $\bar{a}$ and "alpha" in the reversible counter logic 220 before reaching the reversible counter inputs 221 and 222. In the reversible counter input boards they are time multiplexed with the digital tacho pulses. The direction of the motion produced by these pulses is decided in the XY sign circuits 238. These in turn derive their inputs from the quadrant counter 111. The length of the cut is determined by the number inserted into the store 130 from the tape and this number is counted out by the divided cycles of the 15 stage pulse separator 5. As previously mentioned for each cycle of this pulse separator the tool will travel 0.00025 inch. Now the length of the cut is given to 0.001" so that it is necessary to divide the number of cycles of the pulse separator by four in divider 239. The divided cycles are selected by level $\bar{a}$ in the store input logic 240 and passed to the store "count" input 241. The "state of 9" count is recognised in each store decade and produces a level. These levels are taken to the slowing logic circuits 242 where they are combined to progressively reduce the machining rate to zero by means of the machine rate BCDRM 218. When decades 1, 2 and 3, where 1 is the most significant store decade, have reached the count of 9, the machining rate is reduced to 0.5. When decades 1, 2, 3 and 4 have reached count 9, the machining rate is reduced to 0.01 and then when decades 1, 2, 3, 4 and 5 reach count 9, the machine rate is reduced to zero. Simultaneously, an L pulse is produced on lead 105 which cuts off the flow of pulses from the oscillator 216 and resets $i$ to 0 and demands a new tape reading. The L pulse generator and slowing logic use conventional circuits and a block diagram of these is given in FIG. 18. The error due to the register count of $2^{15}-1$ is overcome by gating the signals, being added to the least significant stages of the tails 27 and 28 with the level $i$. The straight cut command circuits use conventional techniques and a block diagram of them is given in FIG. 19.

RADIUS COMMANDS

Figure 35B:
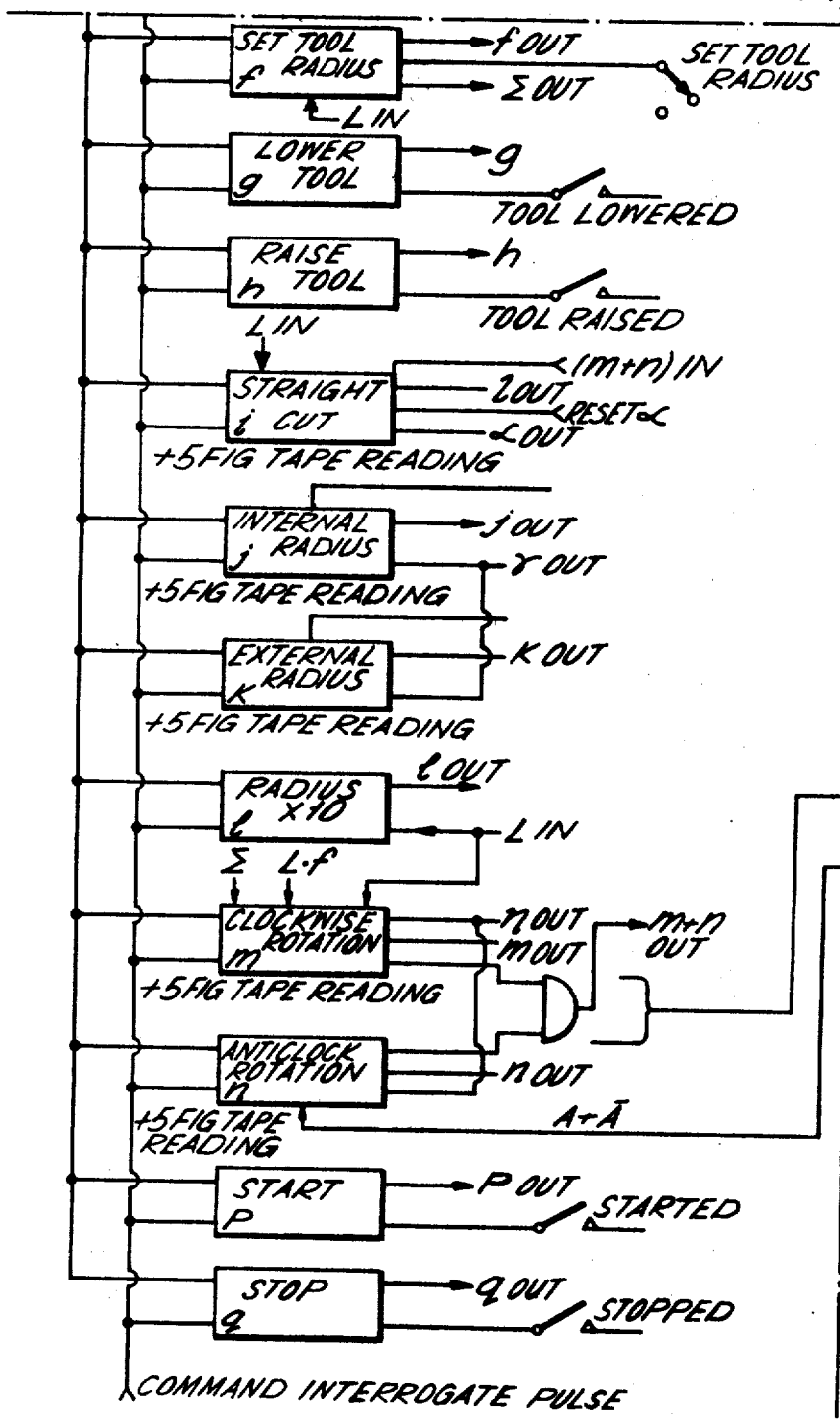
Figure 35D:
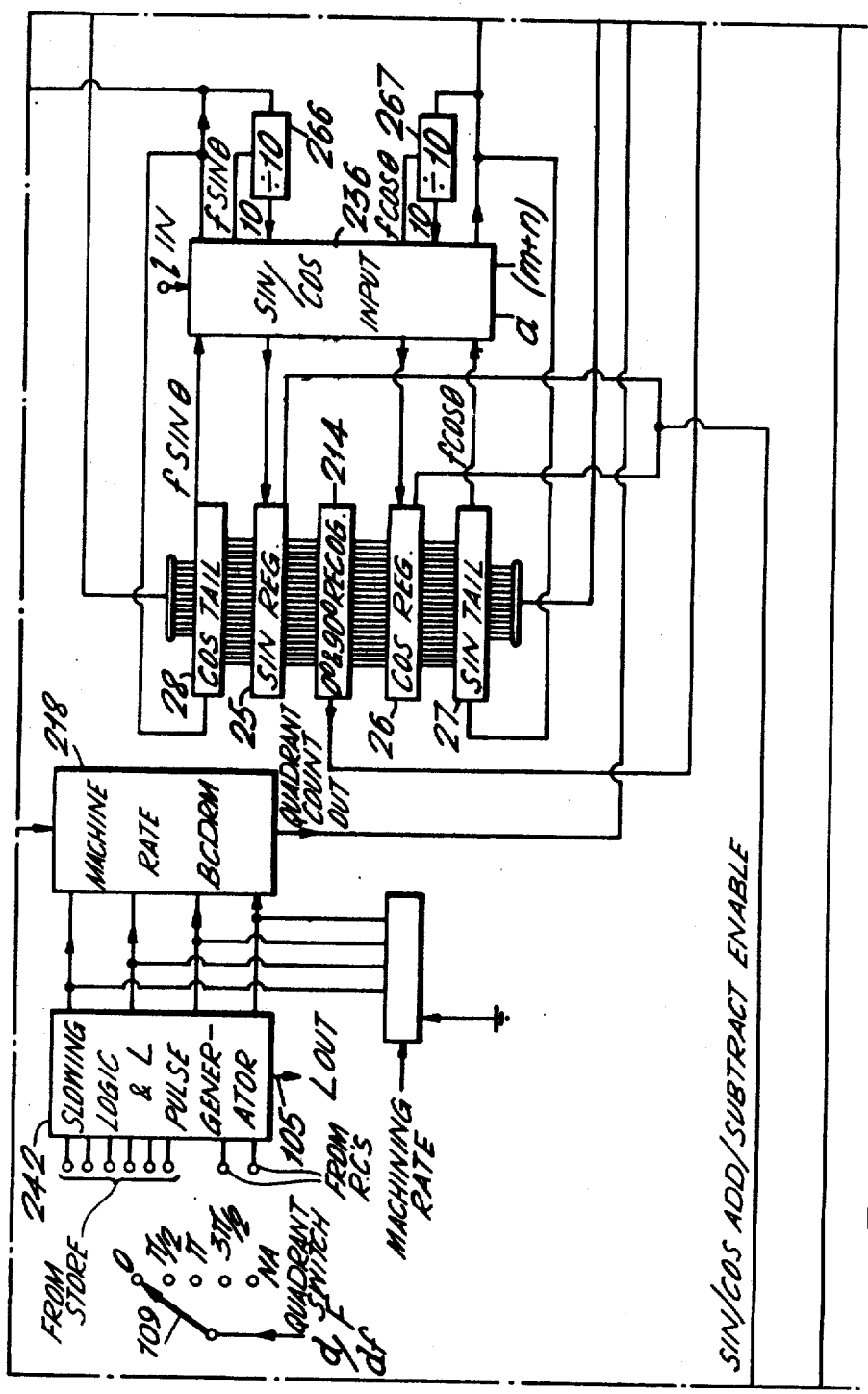
Figure 35F:
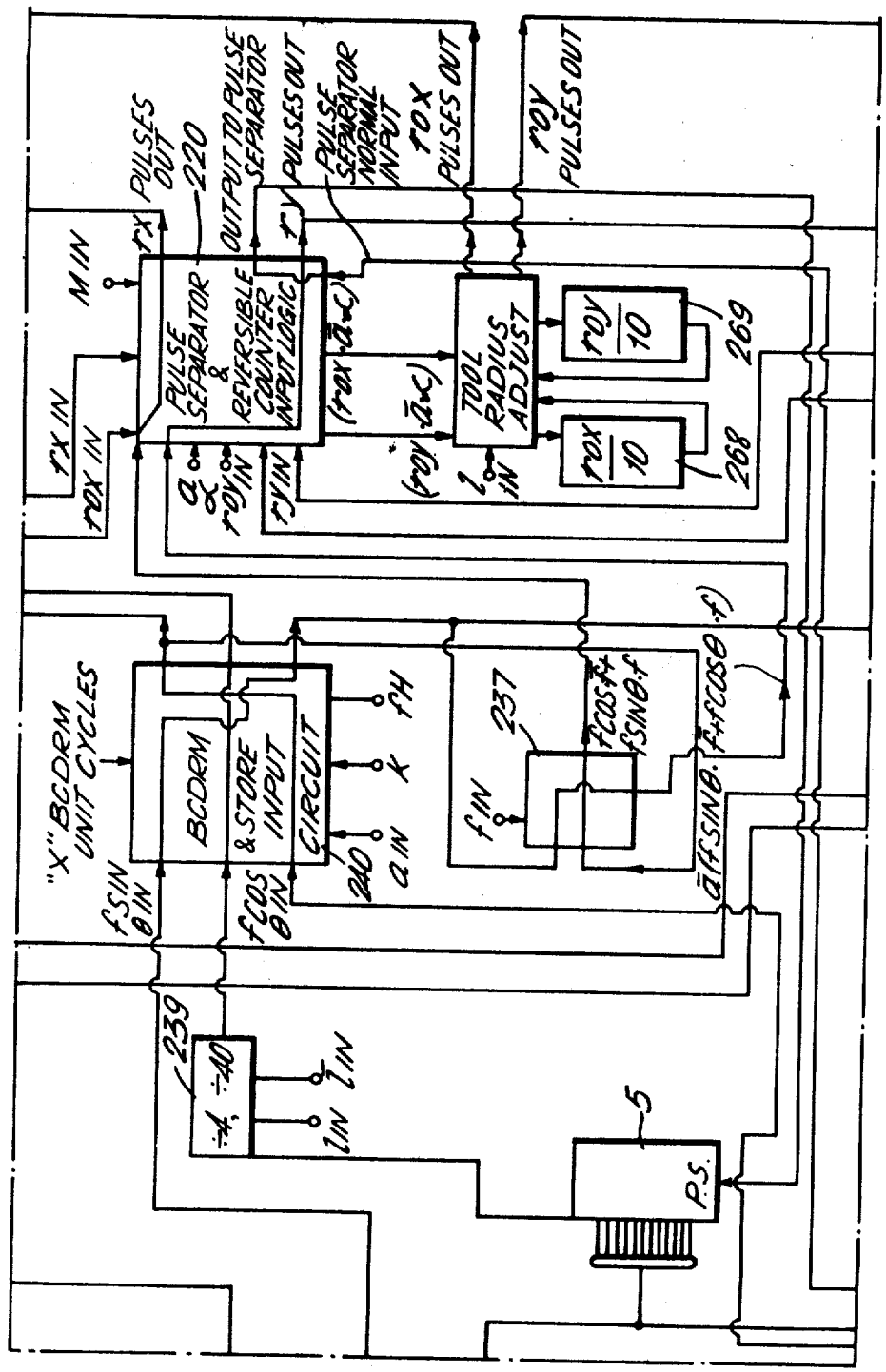
Figure 35G:
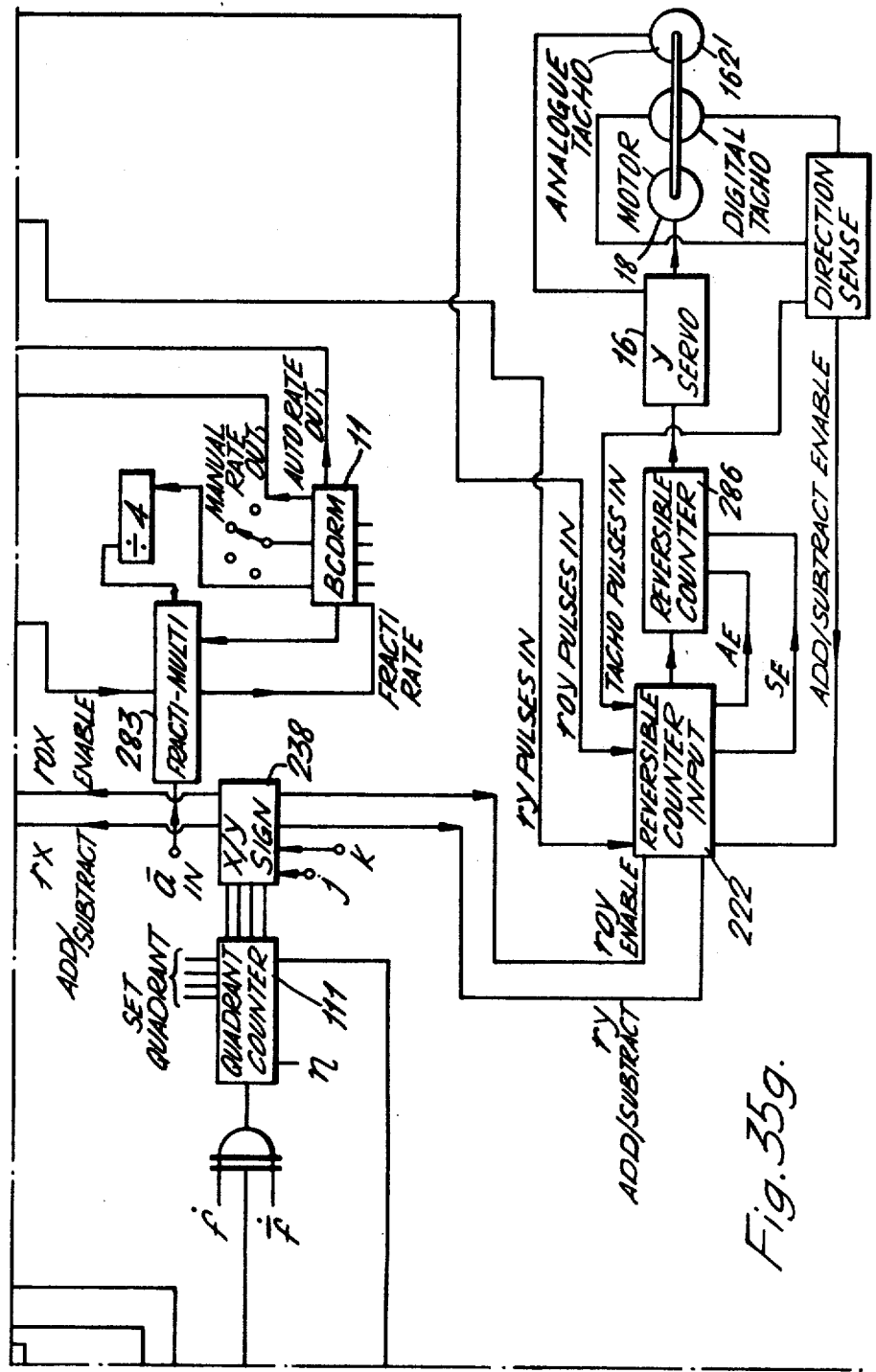

There are three radius commands identified by the letters $j$, $k$ and $l$. The first two, external and internal radius, enable radii of up to 9.999 in. to be cut. For radii greater than this the multiplier command $l$ is used which increases this limit by a factor of 10. When the command $l$ is used the radius can only be set to 0.010 in., but when it is not used the radius may be set to 0.001 in. When the tape codes for either $j$ or $k$ appear and have been interrogated by the command interrogate pulse one of the flip flops $j$ or $k$ 261 or 262 (FIG. 21) will be set to the 1 condition. The arrival of either the $j$ or $k$ levels at the oscillator section initiates a cycle of the "slow pulse separator." This demands a five figure tape reading the first four figures of which contain the cut radius. This reading is decoded by the "tape code to BCDRM matrix" 263 (FIG. 35c) and directed to the correct decade of the BCDRM in "and" gates 264 by pulses from the slow pulse separator 232. The first four readings set up the registers of the four decades of the BCDRM. The fifth reading is not used and is filled by a zero on the tape. The $j$ or $k$ levels are gated by the quadrant level in the XY sign circuits 238 where they determine whether the "tool radius" or "$r_o$" pulses are added to, or subtracted from, the cut radius or $r$ pulses. The final or T pulse from the slow pulse separator 232 is gated by the level "$(j+k)$ and $(m+n)$" to demand a further tape reading in unit 265. If this reading is an $l$, denoting that the radius must be multiplied by 10, the $l$ level is supplied to the sine/cosine input circuits 236 where it sets up paths to ensure that the $f \sin \theta$ and $f \cos \theta$ signals, which will be produced when $m$ or $n$ are commanded, will be divided by 10 in decade dividers 226, 267 before being returned to the $\cos \theta$ register 26 and the $\sin \theta$ register 25 respectively (FIG. 35d). In a similar manner the level $l$ ensures that the tool radius pulse trains, $r_o x$ and $r_o y$, are divided by ten in divider 268, 269 before they are routed to the reversible counter inputs. The $l$ level also gates the cycles of the 15 stage pulse separator 5 through another decade divider incorporated in 239 before they go to the store input circuits 240 and hence to the store count input 241. The $l$ pulse if it was used, now demands a further reading. The programme of this machine demands that $j$ or $k$ are followed by either $l$ or $m$ or $n$, or if $l$ was used that this is followed by either $m$ or $n$ where $m$ and $n$ are the command identifications for clockwise and anticlockwise rotation of the path of the tool when cutting a circular arc. The commands $m$ and $n$ will be considered under the next heading. It should be noted that unlike all the other commands so far described the $j$, $k$ and $l$ command circuits are left in their energised conditions prior to the demanding of $m$ or $n$. The $j$ or $k$ transition is used to set the "alpha" flip flop 232a (FIG. 19) in the straight cut command circuits to its 0 state. This selects the cut radius and the tool radius pulse trains from both the X and Y BCDRM's 10 and 11 for transmission to the reversible counter inputs 221, 222. The radius command circuits use conventional techniques and a block diagram of them is given in FIG. 21.

CLOCKWISE AND ANTICLOCKWISE ROTATION COMMAND

These commands determine the sense of rotation of the path of the tool when making circular cuts. Clockwise-rotation is identified by the letter $m$ and anticlockwise rotation by $n$ and when they are recognised by their command circuits the relevant flip flop 281, 282 (FIG. 26) is set to its 1 condition, the $m$ and $n$ flip flops 281, 282 do not directly determine the sense of rotation themselves but in turn set a third flip flop referred to herein as "eta" into one of its two states. "Eta" is set to its 1 state by the $n$ flip flop 282 or by an L or reset pulse. It is set to its 0 state by a command $m$ or a "sigma" pulse on lead 222 from the $f$ command circuits (FIG. 16). The "$(m+n)$" level is also used to couple the $f \sin \theta$ and $f \cos \theta$ signals back to the cosine and sine registers 26 and 25 respectively by means of gates in the sine/cosine input circuits 236 (FIG. 22). In the oscillator circuits it initiates a cycle of the slow pulse separator 232. This demands a five figure tape reading which contains the angle which the tool path subtends at a radius which was determined at the time the $j$ or $k$ commands were entered. In the case of the $m$ and $n$ commands the angle is not entered on the tape directly in degrees; instead the angle must first by multiplied by a number $$\frac{\pi \times 2^{12}}{90}$$

This number is read and decoded in the "tape to store code" matrix 233. It is then inserted into the store decades, a decade at a time, by the interrogating pulses $P(i+m+n)Q(i+m+n)$ etc. in the "and" gates 234 and finally through the "or" gates 235 into the store 130. The last interrogating pulse $T(i+m+n)$ is used to start the 60 kp./s. variable rate oscillator 216 and thus start the machining operation. The pulses from this oscillator go to the "fast corner" BCDRM 217 the rate of which is under the control of the "fast corner" logic 219. This in turn is controlled by the radius set into the register of the X BCDRM 10. The purpose of these circuits is to keep the machining velocity independent of the radius of the circle being cut. This is done by taking an increasing fraction of the input frequency of the "fast corner" BCDRM 217 as the demanded radius is decreased. This correction is only applied over the range of 1-9 in. of cut radius. The machining rate at the two extremes being the same, although at a radius of 5 in. the machining rate is reduced to 0.6 to the maximum. After going through the "fast corner" logic 219 the pulses go to the "machine rate" BCDRM 218 where the feed rate may be controlled by the operator by means of the "machine rate" switch on the front panel. The pulses then go to the pulse separator input logic 220 and so to the 15 stage pulse separator 5. Under the control of the pulse separator, increments are added to the sine and cosine registers 25 and 26 and the value of $\theta$ is either increased or decreased. Cycles of the pulse separator 5 are counted by the store 130 after having been divided by 40 or 4 in unit 239 depending on whether 1 or $\bar{1}$ is present and having been gated by $\bar{a}$ in the store input circuits 240 and so directed to the store "count" input 241. The pulse trains $f \sin \theta$ and $f \cos \theta$ also go to the BCDRM input circuits, are gated by $\bar{a}$ and are directed to the Y and X fractional multipliers 283, 284.

Both the X and Y BCDRM's 10 and 11 are double in the sense that they have two sets of gates, one set is under the control of the tool radius switches 14 (FIG. 3), the other set is under the control of the cut radius registers. Thus each BCDRM produces a cut radius pulse train and a tool radius pulse train. These are directed by the level "not alpha" in the reversible counter input logic 220 to their respective reversible counter input circuits 221 or 222. There is an exception in that if the one level equals 1 then the tool radius pulse trains are divided by 10 in units 268, 269 before going to the reversible counter inputs. In the reversible counter input circuitry 221 and 222 the cut radius and the tool radius pulse trains are time multiplexed with the tacho pulses. The signs with which they are delivered to the reversible counter 285 or 286 are under the control of the XY sign circuits 238 which depend on the state of the quadrant counter 111 and on whether levels $j$ or $k$ are present. The block diagram of the XY sign circuits is given in FIG. 25 on which are stated the conditions which these circuits must fulfil. The sign of the tacho pulses is under the control of the "direction sense" circuits which are described elsewhere. As the count in the store comes up to the 99,999 condition the "slowing logic" circuit 242 described in the section on the "straigth cut" command comes into operation and the machine rate decreases, finally ceasing at the instant an L pulse is generated which cuts off the flow of pulses from the oscillator 216, resets any of the $j$, $k$, $l$, $m$ or $n$ flip flops 261, 262, 287, 281, 282 which are energised and demand a new tape reading. The circuits of the clockwise and anticlockwise commands use conventional techniques and a block diagram of them is given in FIG. 26 together with the logic statements that define them.

FURTHER COMMAND CIRCUITS

An examination of FIG. 35 will show the remaining of the 17 command circuits not yet discussed. These are "Lower Tool" and "Raise Tool" and "start" and "stop" which are self explanatory.

FURTHER DETAILS

With the particular system used for adding the contents of the sine register to the cosine tail and cosine register to the sine tail addition is commenced at the least significant bit of the register and this number is added to the number in the least significant stage of the cosine tail say, by means of a gate 55 which is interrogated by a pulse on lead 56 from the first output lead 6 of the pulse separator 5 (FIG. 4). Time is allowed for any carry signal to propagate from the least significant bit of the tail to the next most significant bit via lead 57 before another pulse is supplied to the separator. This emerges from the second output lead 6 of the separator and adds the second least significant number in the sine register to the number in the second least significant stage of the tail. This process is continued for the 15 stages of the register and tail by which time a complete addition has been made to the number in the tail.

If the value of $\theta$ was initially 0 and it is now increasing, then the value of the number in the cosine register will be decreasing towards 0 and the number in the sine register will be increasing towards 1. If the cross addition process is continued until both of these conditions are satisfied, namely sin $\theta$ equals 1 and cos $\theta$ equals 0, two sets of "and" gates 58–61 (FIG. 32) on the outputs of each register will detect these conditions. These are a 15 input, positive level "and" gate 58 or 59, and a 15 input, negative level "and" gate 60 or 61. The gates 58 and 60 are associated with the sine register. The two sets of 15 inputs are connected together in pairs and taken to the outputs of the register flip flops via leads 62. There is a further input 64 on each gate and this is taken to the "add enable" line of the register to which the inputs on the gates are attached. The purpose of this extra input will be described later. Now consider the case when $\theta$ is running towards $\pi/2$, sin $\theta$ is going towards 1, and the number in the sine register is going towards $2^{15}-1$. Cosine $\theta$ is running towards 0, i.e., all the flip flops in the cosine register are going towards their 0 condition. Now the sine $\theta$ register are going towards their 0 condition. Now the sine $\theta$ register will reach its "full" condition or its count of $2^{15}-1$ before the cosine register has reached a count of 0. In fact, when the sine register reaches $2^{15}-1$ there will still be a count of approximately $2^7$ in the cosine register. This means that it must be the cosine register which determines when an angle of $\pi/2$ radians has been reached. Thus it is the set of "and" gates which recognise when either of the registers has reached the "0" condition which determines that a quadrant point has been reached. A pulse is then produced which goes via lead 66 to the quadrant counter (see FIG. 33) and either increases or decreases the number in that counter by 1. It will be seen from FIG. 32 that the output of the "0" level "and" gate 60 or 61 is inverted in an amplifier 66 and after passing an "or" gate 67 and a delay 68 operates a Schmidt trigger 69 to produce the pulse which goes to the quadrant counter. It is important that the register which ran to its full condition before the quadrant point was reached, should not receive any extra pulses while the other register is running to its zero condition. To ensure this, it is arranged that when the "1" level 15 input "and" gate 58 or 59 is energised the input to that register is inhibited. A means of breaking this inhibition must be provided, otherwise once a register had reached "1" it could never leave this condition as the input has now been disconnected. The means of breaking the inhibition is supplied by the extra input 64, 65 on each gate mentioned previously. These are taken to the sine and cosine "add enable" lines and once the quadrant condition has been recognised and a quadrant pulse produced, the quadrant counter changes its state and in so doing reverses the levels of the sine and cosine "add enable" lines thus the "and" condition for the 15 input gates is no longer fulfilled and the inhibition is removed from the input of the sine or cosine register. The extra inputs 64, 65 on each "and" gate also fulfill another necessary function. They enable the quadrant counter to jump from one quadrant to another without a change of $\theta$ when the direction of rotation is reversed and $\theta$ is already at a quadrant point. For instance, if $\theta$ equals 90°, Sine $\theta$ equals 1 and cosine $\theta$ equals 0 then it is equally correct for the quadrant counter to indicate either quadrant 1 or 2. However, if $\theta$ is to be increased then the counter should indicate quadrant 2, whereas if $\theta$ is to be decreased the quadrant counter should indicate quadrant 1, otherwise the state of the quadrant counter will become incorrect. It will be seen that the sine and cosine add enable levels which depend not only on the state of the quadrant counter but also on the state of the flip flop "eta" (direction of rotation 130) in FIG. 22 will enable this change in quadrant to occur without any change in the values of sin $\theta$ or cos $\theta$. When the state of the counter "eta" is reversed, this reverses the subtract and add enable lines of the quadrant counter, but a time must be left for these levels to become established in the quadrant counter before it is presented with a quadrant pulse. This time is typically 20 microseconds and for this purpose the delay 68 is inserted before the input of the Schmidt trigger 69 (FIG. 32) so that the quadrant pulse is delayed by about this time after one of the zero level "and" gates has become energised. Where the state of the quadrant counter is deliberately interfered with as is done in the case of the "$f$" command," it is necessary to inhibit the action of the quadrant recognition circuits. This is done by clamping to ground the input of the trigger 69 by means of a transistor which is turned on by an "$f$" level on lead 70.

The quadrant counter (FIG. 33) is a two stage reversible binary counter. The add and subtract enable levels for the quadrant counter are supplied by the "eta" flip flop of FIG. 26. This is the flip flop 130 which decides the direction of angular rotation. For positive angular direction that is anticlockwise rotation eta flip flop 130 is in its "1" condition. This condition makes the quadrant counter add. When the levels are reversed the quadrant counter subtracts. The same levels are combined with the output levels of the first flip flop of the quadrant counter of determine the "add and subtract enable" levels for the sine and cosine registers (FIG. 31). The initial state of the quadrant counter and the initial values of sin $\theta$ and cos $\theta$ are set from the "auto angle" command circuits FIG. 14. The conditions for the "add and subtract" levels of the two sine/cosine registers are given in FIG. 26b the rotation sin $A_e$ standing for Sine Add Enable and so on.

The truth table of the quadrant counter is as follows:

TRUTH TABLE

| Quadrant | A | $\bar{A}$ | B | $\bar{B}$ |
|---|---|---|---|---|
| 1 | 0 | 1 | 0 | 1 |
| 2 | 1 | 0 | 0 | 1 |
| 3 | 0 | 1 | 1 | 0 |
| 4 | 1 | 0 | 1 | 0 |

Each servo system takes as its input demand two pulse trains, either or both of which may have zero frequency. It is the function of the servo system to take the sum or the difference of these two pulse trains depending on the sign information which is also presented to it, and to equate the frequency of the resultant to the frequency of a pulse train generated by a digital tachometer, mounted on the motor shaft, which drives the machine table. In addition, it has to be able to sense the direction of the motor shaft and ensure that the tacho pulses are given the correct sign. It has to be able to handle a maximum input rate of 400 pulses per second which corresponds to a table rate of 0.1 in. per second. The summation of the three pulse trains is done in a reversible counter as has already been described but firstly the three separate pulse trains have to be organised in time, as the pulses of these trains, as received, may be coincident. Although the two demand pulse trains do not have a uniform frequency, the minimum interval between any two pulses of a particular pulse train is known. This enables a sampling system to be employed. The criterion for determining the sample interval is that it must always be less than the minimum interval between two pulses of a train. It has been arranged that a complete interval of 100 microseconds is short enough to ensure that two pulses cannot arrive on one line in one sampling period. As there are three inputs to be sampled this sets the period of the sampling oscillator at 33 microseconds. If the logic diagram, FIG. 27, is examined, it will be seen that the three pulse trains, the $r$ pulses, the $r_o$ pulses and the tacho pulses, are stored in flip flops 115–117 which are interrogated once per complete sampling interval. If a pulse has arrived and been stored as a "1" state in the flip flop, then the flip flop is restored to its "0" state by the interrogating pulse and in so doing it delivers an output pulse to an "or" gate 118 where it is combined with pulses from the other channels and thence goes to the counting input of the reversible counter via lead 119. Sign information on these three pulse trains is delivered in the form of levels and pulses and these also set up three flip flops 120–122. The output of each flip flop is examined in two "and" gates 123–128 by sampling pulses and each sampling period a sign pulse is delivered from one of these "and" gates. For each input either an "add" or "subtract" pulse will be produced once per sampling interval, these go through "or" gates 132 and 133 to an "add" or "subtract" enabling flip flop 134 where the add or subtract information of the pulse is stored for one-third of the sampling interval. The outputs of the flip flop go to the "add and subtract enable" lines 135 and 136 of the reversible counter. The incoming pulse trains are always examined in a particular order running "$r$," "$r_o$" and "tacho" and the circuit is such that the add and subtract enable levels for these pulse trains are sampled in the order "$r_o$," "tacho" and "$r$" with the "$r$" pulse memory flip flop 115 being interrogated at the instant the "$r_o$" add/subtract enable flip flop 121 is examined. This ensures that there is one-third of a sampling period available for the "add and subtract enable" lines 135 and 136 in the reversible counter to settle before the pulse they are to control is delivered. Although the "$r_o$" add/subtract enable flip flop 121 is examined at the same instant that the "$r$" pulse flip flop 115 is interrogated, there is sufficient memory in the time constant of the "add and subtract enable" lines of the reversible counter to ensure that the "$r$" pulse is added with the correct sign into the reversible counter.

The reversible counters (see FIG. 28) work in binary notation and have six stages giving a total count of 63. The "add and subtract enable" lines 135 and and 136 determine from which output 137 or 138 of a flip flop 71 a pulse is counted into the next stage. A, resistive, digital to analogue converter with resistors 72 having a binary weighting, is taken from one output of each stage. These resistors are adjusted to give a linear relation between output current and the state of the count and an offsetting resistor 74 is included to give net zero output current at the mid count of 31. In addition, small indicator lamps (not shown) are connected to one output of each stage to enable a visual check to be made of the state of the counter. Two sets of "and" gates (not shown) are included which give a negative signal when the counter is either full or empty, i.e., either state 0 or 63. These levels go back to the slowing logic and "L" pulse generator, and if either level appears, it immediately cuts off the flow of pulses from the "machine rate" BCDRM, thus halting the control signals. As a count of 31 from the mid position of the reversible counter is sufficient to bring the machine to a halt it means that if for any reason the table gets 0.008 in. away from its demand position the machine comes to a stop.

The analogue output of the reversible counter is taken on line 145 to the servos (see FIG. 29) where it is amplified by amplifier 146 and used to control the phasing of a three phase, pulse generator system comprising three phase comparators 147 and three phase 50 c./s. sawtooth generator 148 which is used to fire the silicon controlled rectifiers which control the power to the servo motors 17 or 18. Two, three phase, half wave, controlled, rectifier bridges 160, 161 are connected back to back and used to control the speed and direction of the servo motors. These are 0.125 horsepower low inertia motors with a short time overload rating of 1.25 horsepower. This large overload capacity and their very low inertia makes it easy to achieve good performance from the servo system. In addition to the digital tachometer, there is an analogue tachometer 162 whose output is differentiated to give acceleration feedback which is used to stabilise the servo system.

The digital tachometer consists of a toothed wheel on the motor shaft and two vane switched oscillators. The two vane switched oscillators are necessary to determine the direction of rotation of the shaft. The digital tacho signals from each tachometer are taken back to its associated direction sense circuits (see FIG. 30) on leads 173, 174 where they are combined in such a way as to produce positive or negative rotation levels, which go to the reversible counter input circuits. Tacho pulses are also produced which go to the reversible counter inputs. The circuits in the direction sense diagram, FIG. 30, are complicated by the necessity to include hysteresis to avoid any dither of either the direction sense signals or the tacho pulses as the toothed wheel rotates. The conditions required to achieve this are specified algebraically in FIG. 30. If this is not done vibration on the motor shaft especially when at rest, due to the pulsating nature of the drive current can produce spurious pulses.

By means of a front panel switch, the servos may be converted from digital to manual control. In the manual condition a demand voltage generated by a potentiometer mounted on the machine, as an operator control, is compared with the voltage from the analogue tachometer 162 and the resulting difference used to drive the servo motors by means of the amplifier 146, phase shifter and the silicon controlled rectifiers already mentioned. This facility is used for positioning the table prior to a machining operation.

What we claim is:

1. A method of automatically controlling a machining operation where two pulse trains of frequencies $K_1 f$ cosine $\theta$ and $K_1 f$ sine $\theta$ are required for ultimate conversion into mutually perpendicular velocities V cosine $\theta$ and V sine $\theta$ wherein $\theta$ is constant, said method comprising the steps of:

dividing a pulse train of frequency $nf$ in dividing means having $n$ output leads on each of which appear non-coincident pulse trains of frequency $f$;

storing in $n$-stage "sine $\theta$" and "cosine $\theta$" binary registers the value of sine $\theta$ and cosine $\theta$ in binary form;

using successive pules on said output leads to cause successive additions of the binary numbers stored in the stages of the "sine $\theta$" and "cosine $\theta$" registers to $n$-stage binary "cosine tail" and "sine tail" registers respectively such that the first addition is the addition of the number recorded in the least significant stage of the register to the least significant stage of its associated tail, any carry pulses passing to the next most significant stage in the tail before the next addition is made, the method being such that any carry pulses from the most significant stage of the "sine tail" and the "cosine tail" have frequencies $fs \doteq f \cos \theta$ and $fc \doteq f \sin \theta$ respectively.

2. A method as claimed in claim 1 wherein any output pulses from the $n$th stage of each "sine" or "cosine tail" are applied to the least significant stage in that tail so that any output pulse train from the $n$th stage has a frequency $f_s = f$ cosine $\theta$ or $f_c = f$ sine $\theta$ respectively.

3. A method as claimed in claim 1 wherein the length of a straight cut is determined by counting the number of additions made between any stage in a "sine $\theta$" or "cosine $\theta$" register and its associated "cosine tail" or "sine tail" and when a certain number is reached, corresponding to a desired length of cut, said additions are terminated.

4. Apparatus for automatic control of a milling operation where two pulse trains of frequency $K_1 f$ cosine $\theta$ and $K_1 f$ sine $\theta$ are required for ultimate conversion into mutually perpendicular velocities V cosine $\theta$ and V sine $\theta$, $K_1$ being a parameter having the dimensions of length, $f$ being a pulse rate and V cosine $\theta$ and sine $\theta$ being resolved components of a cutting velocity vector V which is the relative velocity between a cutting tool and a workpiece to be machined, vector V making an angle $\theta$ with respect to an arbitrary axis, the system being such that $\omega$, the time rate of variation of $\theta$, when and if $\theta$ varies, is also proportional to the frequency $f$ thus making the radius of cut independent of the magnitude of said cutting velocity V; said apparatus including a sine cosine generator to convert a pulse train frequency of $nf$ into two pulse trains of frequencies $f_c = f$ cosine $\theta$ and $f_s = f$ sine $\theta$, said sine cosine generator comprising: four $n$-stage binary coded registers each with a capacity of $2^n - 1$, two of which named the "sine $\theta$" and "cosine $\theta$" registers are reversible and store the values of sine $\theta$ and cosine $\theta$ therein in binary notation so that when all stages are in their "1" states in a said "sine $\theta$" or "cosine $\theta$" register the value of sine $\theta$ or cosine $\theta$ is 1 and when all stages are in their "0" states the value of sine $\theta$ or cosine $\theta$ is zero, the other two registers being named the "sine tail" and "cosine tail"; adding means which enable any binary number stored in a "sine $\theta$" or "cosine $\theta$" register to be added to the "cosine tail" or the "sine tail" respectively, said adding means being operable by a pulse train of frequency $nf$, the first pulse of a bundle of $n$ pulses causing any number in the least significant stage of both "sine $\theta$" and "cosine $\theta$" registers to be added to the least significant stage of the "cosine tail" and "sine tails" respectively, the second pulse of $n$ causing any number in the second least significant stage of both "sine $\theta$" and "cosine $\theta$" registers to be added to the second least significant stage in the "cosine tail" and "sine tail" respectively and so on, any carry pulses from the stages of the "tails" being carried to the next most significant stages before the next addition is made, any carry pulse emerging from the $n$th stages of the "sine tail" and the "cosine tail" being applied by switch means, when a straight cut is being made, to the least significant stage of that tail so that the output pulse train from the $n$th stage of the tail has a frequency $fs = f$ cosine $\theta$ or $fc = f$ sine $\theta$ respectively and when arcuate cuts are being made coupling means enable the output pulse trains from the $n$th stages of the "cosine tail" and "sine tail" to be added to or subtracted from the least significant stage of the "cosine " and "sine $\theta$" registers respectively to increase or decrease the value of $\theta$ stored therein at a constant rate $\omega = 2^{-n} f$, said apparatus also including two multi-stage binary coded decimal rate multipliers into which input pulse trains having frequencies proportional to sine $\theta$ and cosine $\theta$ may be applied when arcuate cuts are being made to yield output pulse trains which have frequencies an equal variable fraction of the input frequencies, said apparatus also including frequency fractional multiplier means which enable correction pulse trains, having frequencies which are equal fixed fractions of desired input pulse train frequencies to said binary coded decimal rate multipliers, to be delayed and combined with the pulse trains of frequencies $f_c$ and $f_s$ to yield input pulse trains of the desired frequencies so that the multinumeral decimal number being the ratio of the output pulse train frequency of each binary coded decimal rate multiplier to its input pulse train frequency bears a simple relation to the desired radius of cut, said output pulse trains then being converted into velocities of either the tool or the workpiece, said binary coded decimal rate multipliers being set by a programme read from tape to determine the radius of cut.

5. Apparatus as claimed in claim 4 wherein two additional manually settable binary coded decimal rate multipliers are provided into which pulse trains of frequencies proportional to sine $\theta$ and cosine $\theta$ as adjusted by said frequency fractional multiplier may be applied and output pulse trains obtained having frequencies which are both the same fraction of the input frequencies, said output pulse trains ultimately being combined in combining means non-coincidentally in time with the output pulse trains from the other binary coded decimal rate multipliers in a manner to allow for the radius of the milling tool when arcuate cuts are being machined.

6. A method of automatically controlling a machining operation where two pulse trains of frequencies $K_1 f$ cosine $\theta$ and $K_1 f$ sine $\theta$ are required for ultimate conversion into mutually perpendicular velocities V cosine $\theta$ and V sine $\theta$, wherein $\theta$ is variable, said method comprising the steps of:

dividing a pulse train of frequency $nf$ in a pulse dividing means having $n$ output leads on each of which appear non-coincident pulse trains of frequency $f$;

storing in n-stage binary "sine $\theta$" and "cosine $\theta$" registers the value of sine $\theta$ and cosine $\theta$ in binary form;

using successive pulses on said output leads to cause successive addition of the binary numbers stored in the stages of the "sine $\theta$" and "cosine $\theta$" registers to n-stage binary "cosine tail" and "sine tail" registers respectively such that the first addition is the addition of the number recorded in the least significant stage of the register to the least significant stage of its associated tail, any carry pulses passing to the next most significant stage in the tail before the next addition is made, the method being such that any carry pulses from the most significant stage of the "sine tail" and the "cosine tail" have frequencies $fs + f \cos \theta$ and $fc + f \sin \theta$ respectively;

using the output pulse trains from the $n$th stages of the "cosine tail" and "sine tail" to add to or subtract from the least significant stages of the "cosine $\theta$" and "sine $\theta$" registers respectively to change the value of $\theta$ stored therein at a constant rate $\omega = 2^{-n} f$.

7. A method as claimed in claim 6, wherein the number of additions or subtractions made between any stage in a "sine $\theta$" or "cosine $\theta$" register and its associated "cosine tail" or "sine tail" is counted and when a certain amount, corresponding to a desired increment of $\theta$, is received said additions are terminated.

8. A method of effecting controlled relative motion of parts of a machine such as between a tool and a workpiece which motion is the resultant of movement along first and second coordinate axes, said method comprising:

extracting point to point instructions from store information;

generating a pulse train responsive to a single instruction, the number of pulses being proportional to the distance over which the relative motion is to take place between two successive points, with allowance for variation in tool dimensions;

converting said pulse train into two pulse trains which represent components of said motion along said first and second coordinate axes;

storing the values of said components in registers;

supplying respective motors in the machine, arranged to cause relative motion of said parts of said machine in the directions of said first and second coordinate axes, with pulses from said registers;

whereby a single instruction from said stored program causes straight line motion at any desired angle to said first and second coordinate axes and over a predetermined distance or circular motion over a predetermined length of arc, both within the limits of the machine movement, the desired distance of motion or arc causing automatic termination of said pulses and an automatic request for a further instruction which is given before further trains of pulses flow.

9. A method as claimed in claim 8, wherein two pulse trains of frequency $K_1 f$ cosine $\theta$ and $K_1 f$ sine $\theta$ are required for ultimate conversion into mutually perpendicular velocities V cosine $\theta$ and V sine $\theta$, $K_1$ being a parameter having the dimensions of length, $f$ being a pulse rate and V cosine $\theta$ and V sine $\theta$ being resolved components of a cutting velocity vector V which is the relative velocity between a cutting tool and a workpiece to be machined, vector V making an angle $\theta$ with respect to an arbitrary axis, the system being such that $\omega$, the time rate of variation of $\theta$, when and if $\theta$ varies, is also proportional to the frequency $f$ thus making the radius of cut independent of the magnitude of said cutting velocity V, said method including the steps of changing $K_1$ to give a desired radius of cut by passing each of two pulse trains one having a frequency proportional to cosine $\theta$ and the other having a frequency proportional to sine $\theta$ into a binary coded decimal rate multiplier whereby an output pulse train having an output frequency some fraction of the input frequency is taken from each binary coded decimal rate multipliers and both output pulse trains for a simple instruction are converted in the machine into mutually perpendicular distances of travel, said fraction being equal for both binary coded decimal rate multipliers, said fraction being determined by stored instructions.

10. A method as claimed in claim 9 wherein the radius of cut is varied by passing said input pulse train into multi-stage binary coded decimal rate multipliers so that the ratio between the frequencies of the output and input pulse trains is a multi-figure decimal number.

11. A method as claimed in claim 10 wherein the input pulse train frequencies into said binary coded decimal rate multipliers are increased in the same ratio to compensate for the constant of proportionality between $\omega$ and $f$ so that the decimal number which is the ratio between the input and output frequencies of said pulse trains is the same number as the length of the radius of cut in decimal form or bears a simple relationship to said radius of cut.

12. A method as claimed in claim 11, wherein the input pulse train frequencies are increased by taking from each of the binary coded decimal rate multipliers a correction pulse train having a frequency which is a fraction of the desired input pulse train frequency calculated by expressing the difference between available and desired input pulse train frequencies as a fraction of the desired input pulse train frequency, said fraction being the same for each binary coded decimal rate multiplier, said correction pulse train being added non-coincidentally in time to the available input pulse train to yield an input pulse train having the desired frequency.

13. A method as claimed in claim 8 wherein the machining operation is a milling operation and wherein two additional manually controlled binary coded decimal rate multipliers are provided into one of which an input pulse train having a frequency proportional to cosine $\theta$ may be passed and into the other of which a pulse train having a frequency proportional to sine $\theta$ may be passed, to yield tool radius correction output pulse trains having frequencies which are both the same fraction of said input pulse train frequencies said fraction being set by manually operated means to enable allowance to be made for the radius of the milling tool and wherein said tool radius correction output pulse trains are either added to or subtracted from the output pulse train of the other binary coded decimal rate multipliers, depending on whether the cutting tool is external of or internal to the arc to be cut, before any pulse train is converted into a velocity of the tool or workpiece.

14. A method as claimed in claim 8 where two pulse trains of frequencies $K_1 f$ cosine $\theta$ and $K_1 f$ sine $\theta$ are required for ultimate conversion into mutually perpendicular velocities V cosine $\theta$ and V sine $\theta$ wherein $\theta$ is a constant said method including the steps of:

dividing a pulse train of frequency $nf$ in pulse separator means having $n$ output leads on each of which appear pulse trains of frequency $f$ which are non-coincident in time with the pulse trains on any other said lead;

storing in n-stage "sine $\theta$" and "cosine $\theta$" binary registers the value of sine $\theta$ and cosine $\theta$ in binary form;

using pulses on successive output leads to cause successive additions of the binary numbers stored in the stages of the "sine $\theta$" and "cosine $\theta$" registers to n-stage binary "cosine tail" and "sine tail" registers respectively such that the first addition is the addition of the number recorded in the least significant stage of the register to the least significant stage of its associated tail, any carry pulses passing to the next most significant stage in the tail before the next addition is made the method being such that any carry pulses from the most significant stage of the "sine tail" and the "cosine tail" have frequencies $fs+f \cos \theta$ and $fc+f \sin \theta$ respectively.

15. A method as claimed in claim 14 wherein any output pulses from the $n$th stage of each "sine" or "cosine tail" are applied to the least significant stage in that tail so that any output pulse train from the $n$th stage has a frequency $f_s = f$ cosine or $f_c = f$ sine $\theta$ respectively.

16. A method as claimed in claim 14 wherein $\theta$ is variable and said "sine $\theta$" and "cosine $\theta$" registers are reversible and wherein the output pulse trains from the $n$th stages of the "cosine tail" and "sine tail" are added to or subtracted from the least significant stages of the "cosine $\theta$" and "sine $\theta$" registers respectively to increase or decrease the value of $\theta$ stored therein at a constant rate $\omega = 2^{-n} f$.

17. A method as claimed in claim 16 wherein the number of additions made between any stage in a "sine $\theta$" or "cosine $\theta$" register and its associated "cosine tail" or "sine tail" is counted and when a certain count, corresponding to a desired increment of $\theta$, is reached said additions are terminated.

18. A method as claimed in claim 14 wherein the length of a straight cut is determined by counting the number of additions made between any stage in a "sine $\theta$" or "cosine $\theta$" register and its associated "cosine tail" or "sine tail" and when a certain number is reached, corresponding to a desired length of cut, said additions are terminated.

19. Apparatus for effecting controlled relative motion of parts of a machine such as between a tool and a workpiece, which motion is the resultant of movement along first and second coordinate axes, said apparatus comprising means for reading instructions in a stored program thereof, said means extracting point to point instructions from said program; means to generate a pulse train responsive to a single instruction the number of pulses in which determines the distance over which the relative motion is to take place; speed control means controllable by an operator to control the time during which the relative motion covers said distance and setting control means controllable by an operator to allow for variation in cutting tool dimensions; converting means to convert said pulse train into two further pulse trains which represent components of said motion along said first and second coordinate axes; sine and cosine registers adapted to store the values of said components; two motors adapted to cause motion in the direction of said first and second coordinate axes said sine and cosine registers supplying pulses to said motors to cause said motors to make the required motion, a single instruction from said stored program causing straight line motion at any desired angle to said first and second coordinate axes and over a predetermined distance or circular motion over a predetermined length of arc both within the limits of the machine, and feed back means actuated by motion of the machines adapted to feed back information on distance moved to cause automatic termination of said pulses and an automatic request for a further instruction to be given before further trains of pulses flow.

20. Apparatus as claimed in claim 19 wherein to permit movement over a curved path, two pulse trains of frequency $K_1 f$ cosine $\theta$ and $K_1 f$ sine $\theta$ are required for ultimate conversion into mutually perpendicular velocities V cosine $\theta$ and V sine $\theta$, $K_1$ being a parameter having the dimensions of length, $f$ being a pulse rate and V cosine $\theta$ and V sine $\theta$ being resolved components of a cutting velocity vector V which is the relative velocity between a cutting tool and a workpiece to be machined, vector V making an angle $\theta$ with respect to an arbitrary axis, the system being such that $\omega$, the time rate of variation of $\theta$, when and if $\theta$ varies, is also proportional to the frequency $f$ thus making the radius of cut independent of the magnitude of said cutting velocity V; said apparatus including a sine/cosine generator to convert a pulse train of frequency of $nf$ into two pulse trains of frequencies $f_c = f$ cosine $\theta$ and $f_s = f$ sine $\theta$ said sine cosine generator comprising: four n-stage binary coded registered each with a capacity of $2^n - 1$, two of which named the "sine $\theta$" and "cosine $\theta$" registers are reversible and store the values of sine $\theta$ and cosine $\theta$ therein in binary notation so that when all stages are in their "1" states in a said "sine $\theta$" or "cosine $\theta$" register the value of sine $\theta$ or cosine $\theta$ is 1 and when all stages are in their "0" states the value of sine $\theta$ or cosine $\theta$ is zero, the other two registers being named the "sine tail" and "cosine tail"; adding means which enable any binary number stored in a "sine $\theta$" or "cosine $\theta$" register to be added to the "cosine tail" or the "sine tail" respectively, said adding means being operable by a pulse train of frequency $nf$, the first pulse of a bundle of $n$ pulses causing any number in the least significant stage of both "sine $\theta$" and "cosine $\theta$" registers to be added to the least significant stage of the "cosine tail" and "sine tails" respectively, the second pulse of $n$ causing any number in the second least significant stage of both "sine $\theta$" and "cosine $\theta$" registers to be added to the second least significant stage in the "cosine tail" and "sine tail" respectively and so on, any carry pulses from the stages of the "tails" being carried to the next most significant stages before the next addition is made, any carry pulse emerging from the $n$th stages of the "sine tail" and "cosine tail" being applied by switch means, when a straight cut is being made, to the least significant stage of that tail so that the output pulse train from the $n$th stage of the tail has a frequency $fs + f$ cosine $\theta$ or $fc = f$ sine $\theta$ respectively and when arcuate cuts are being made coupling means enable the output pulse trains from the $n$th stages of the "cosine tail" and "sine tail" to be added to or subtracted from the least significant stage of the "cosine $\theta$" and "sine $\theta$" registers respectively to increase or decrease the value of $\theta$ stored therein at a constant rate $\omega = 2^{-n} f$, said apparatus also including two multi-stage binary coded decimal rate multipliers into which input pulse trains having frequencies proportional to sine $\theta$ and cosine $\theta$ may be applied when arcuate cuts are being made to yield output pulse trains which have frequencies an equal variable fraction of the input frequencies said apparatus also including frequency fractional multiplier means which enable correction pulse trains, having frequencies which are equal fixed fractions of desired input pulse train frequencies to said binary coded decimal rate multipliers, to be delayed and combined with the pulse trains of frequencies $f_c$ and $f_s$ to yield input pulse trains of the desired frequencies so that the multi-numeral decimal number being the ratio of the output pulse train frequency of each binary coded decimal rate multiplier to its input pulse train frequency bears a simple relation to the desired radius of cut, said output pulse trains then being converted into velocities of either the tool or the workpiece, said binary coded decimal rate multipliers being set by a program read from tape to determine the radius of cut.

21. Apparatus as claimed in claim 20 wherein two additional manually settable binary coded decimal rate multipliers are provided into which pulse trains of frequencies proportional to sine $\theta$ and cosine $\theta$ as adjusted by said frequency fractional multiplier may be applied and output pulse trains obtained having frequencies which are both the same fraction of the input frequencies said output pulse trains ultimately being combined in combining means non-coincidentally in time with the output pulse trains from the other binary coded decimal rate multipliers in a manner to allow for the radius of the milling tool when arcuate cuts are being machined.

22. Apparatus as claimed in claim 20 which includes a decade store arranged to count the number of additions made between a stage of a "sine $\theta$" or "cosine $\theta$" register and its tail and to terminate further additions when a number programmed into the store is reached.

References Cited

UNITED STATES PATENTS

| | | | |
|---|---|---|---|
| 3,286,085 | 11/1966 | Rado | 235—151.11 |
| 3,348,208 | 10/1967 | Rosener | 340—172.5 |
| 3,375,354 | 3/1968 | McGarrell | 235—151.11 |

PAUL J. HENON, Primary Examiner

R. F. CHAPURAN, Assistant Examiner

U.S. Cl. X.R.

235—151.11